(12) United States Patent
Anton

(10) Patent No.: US 10,077,005 B2
(45) Date of Patent: Sep. 18, 2018

(54) MODULAR MOTOR VEHICLE INTEGRATED CARRIER RACK AND STORAGE SYSTEM WITH UNIVERSAL CONNECTIONS

(71) Applicant: Mark A. Anton, Newport Beach, CA (US)

(72) Inventor: Mark A. Anton, Newport Beach, CA (US)

( * ) Notice: Subject to any disclaimer, the term of this patent is extended or adjusted under 35 U.S.C. 154(b) by 14 days.

(21) Appl. No.: 15/054,001

(22) Filed: Feb. 25, 2016

(65) Prior Publication Data

US 2016/0243996 A1     Aug. 25, 2016

Related U.S. Application Data

(60) Provisional application No. 62/276,144, filed on Jan. 7, 2016, provisional application No. 62/163,638, filed on May 19, 2015, provisional application No. 62/120,825, filed on Feb. 25, 2015.

(51) Int. Cl.
| | |
|---|---|
| *B60R 9/06* | (2006.01) |
| *B60R 9/08* | (2006.01) |
| *A61G 3/08* | (2006.01) |
| *B60R 9/10* | (2006.01) |
| *B60R 9/12* | (2006.01) |
| *B62H 3/00* | (2006.01) |
| *B62J 7/00* | (2006.01) |

(52) U.S. Cl.
CPC .............. *B60R 9/06* (2013.01); *A61G 3/0808* (2013.01); *B60R 9/08* (2013.01); *B60R 9/10* (2013.01); *B60R 9/12* (2013.01); *B62H 3/00* (2013.01); *B62J 7/00* (2013.01)

(58) Field of Classification Search
CPC .... B60R 9/06; B60R 9/08; B60R 9/10; B60R 9/12; A61G 3/0808; B62H 3/00; B62J 7/00
USPC ........................................................ 224/519
See application file for complete search history.

(56) References Cited

U.S. PATENT DOCUMENTS

| | | | |
|---|---|---|---|
| 4,369,902 A | 1/1983 | Lampeas |
| 4,676,414 A | 6/1987 | Deguevara |
| 4,746,263 A | 5/1988 | Cook |
| 5,038,983 A | 8/1991 | Tomososki |
| 5,190,195 A | 3/1993 | Fullhart et al. |
| 5,460,304 A | 10/1995 | Porter et al. |
| 5,469,998 A | 11/1995 | Van Dusen et al. |
| 5,695,103 A | 12/1997 | Duvernay et al. |
| 5,806,737 A | 9/1998 | Clark |
| 5,820,004 A | 10/1998 | Lane |
| 6,662,983 B2 | 12/2003 | Lane et al. |

(Continued)

FOREIGN PATENT DOCUMENTS

DE     29916152 U1     1/2000

OTHER PUBLICATIONS

WO PCT/US2014/029715 ISR, dated Aug. 11, 2014.

(Continued)

*Primary Examiner* — Peter Helvey
(74) *Attorney, Agent, or Firm* — One LLP; Joseph K. Liu

(57) ABSTRACT

A unified carrier cargo rack and storage system for a vehicle including a receiver unit installed in the rear of the vehicle and a modular carrier rack, including a transitional carrier bar, a secondary bar and a cargo carrier bar, wherein the cargo carrier bar is further operable to engage and immobilize cargo; are disclosed as are male and female securing mechanisms.

14 Claims, 102 Drawing Sheets

(56) References Cited

U.S. PATENT DOCUMENTS

| | | |
|---|---|---|
| 6,752,302 B2 | 6/2004 | Anton |
| 7,121,597 B2 | 10/2006 | Chuang |
| 7,213,731 B1 | 5/2007 | Kolda |
| 8,302,829 B2 | 11/2012 | Lee et al. |
| 8,418,902 B2 | 4/2013 | Cha et al. |
| 9,120,429 B2 | 9/2015 | Lungershausen et al. |
| 9,145,095 B2 | 9/2015 | Hubacher et al. |
| 9,174,584 B1 | 11/2015 | Cha et al. |
| 2005/0035168 A1 | 2/2005 | Prescott et al. |
| 2010/0001029 A1 | 1/2010 | Tai |
| 2014/0027484 A1 | 1/2014 | Loken |
| 2014/0263513 A1 | 9/2014 | Anton |

OTHER PUBLICATIONS

WO PCT/US2014/029715 IPRP, dated Sep. 15, 2015.
EP 14762804.4 Supplementary Search Report, dated Feb. 19, 2016.
WO PCT/US2016/019642 ISR and Written Opinion, dated May 6, 2016.

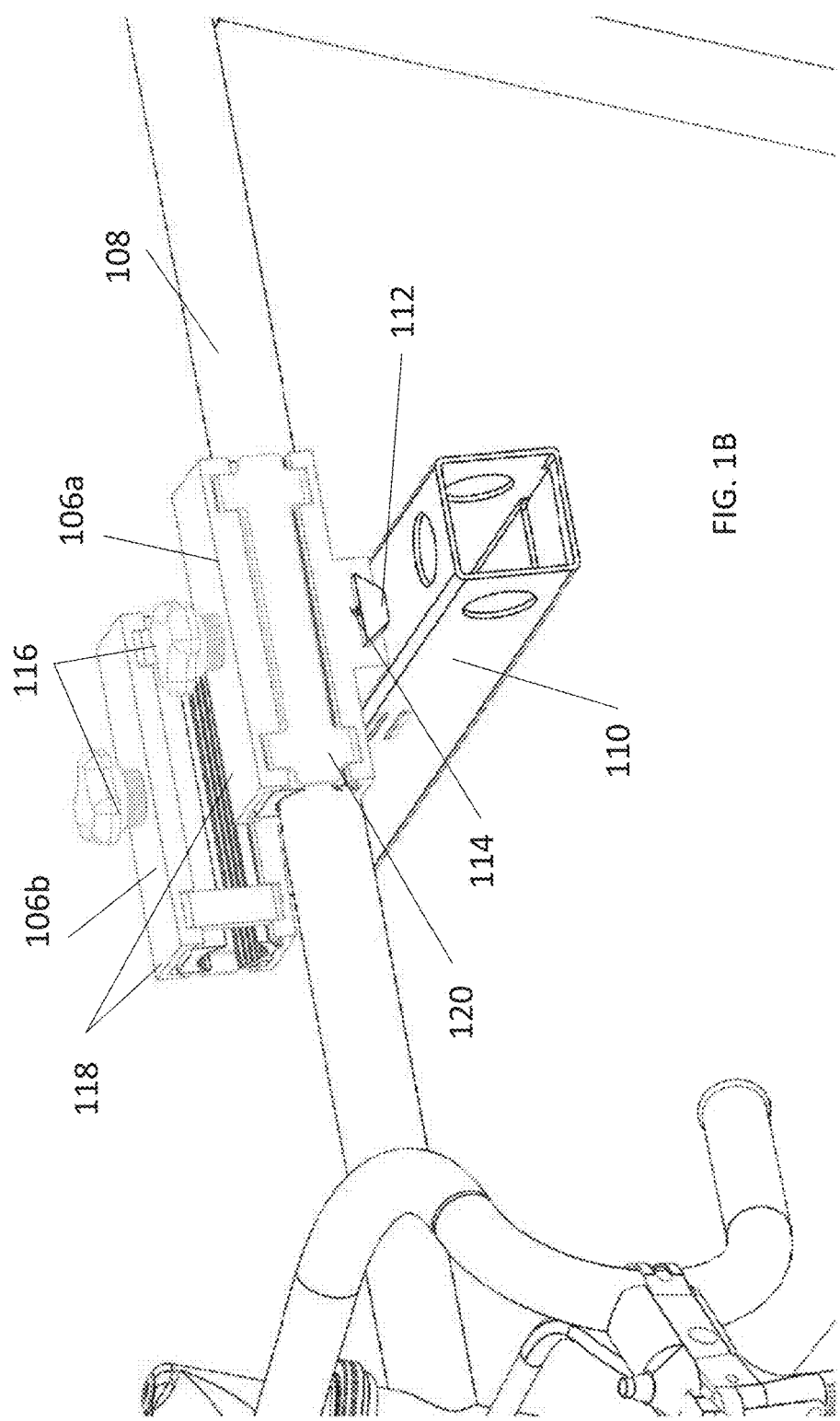

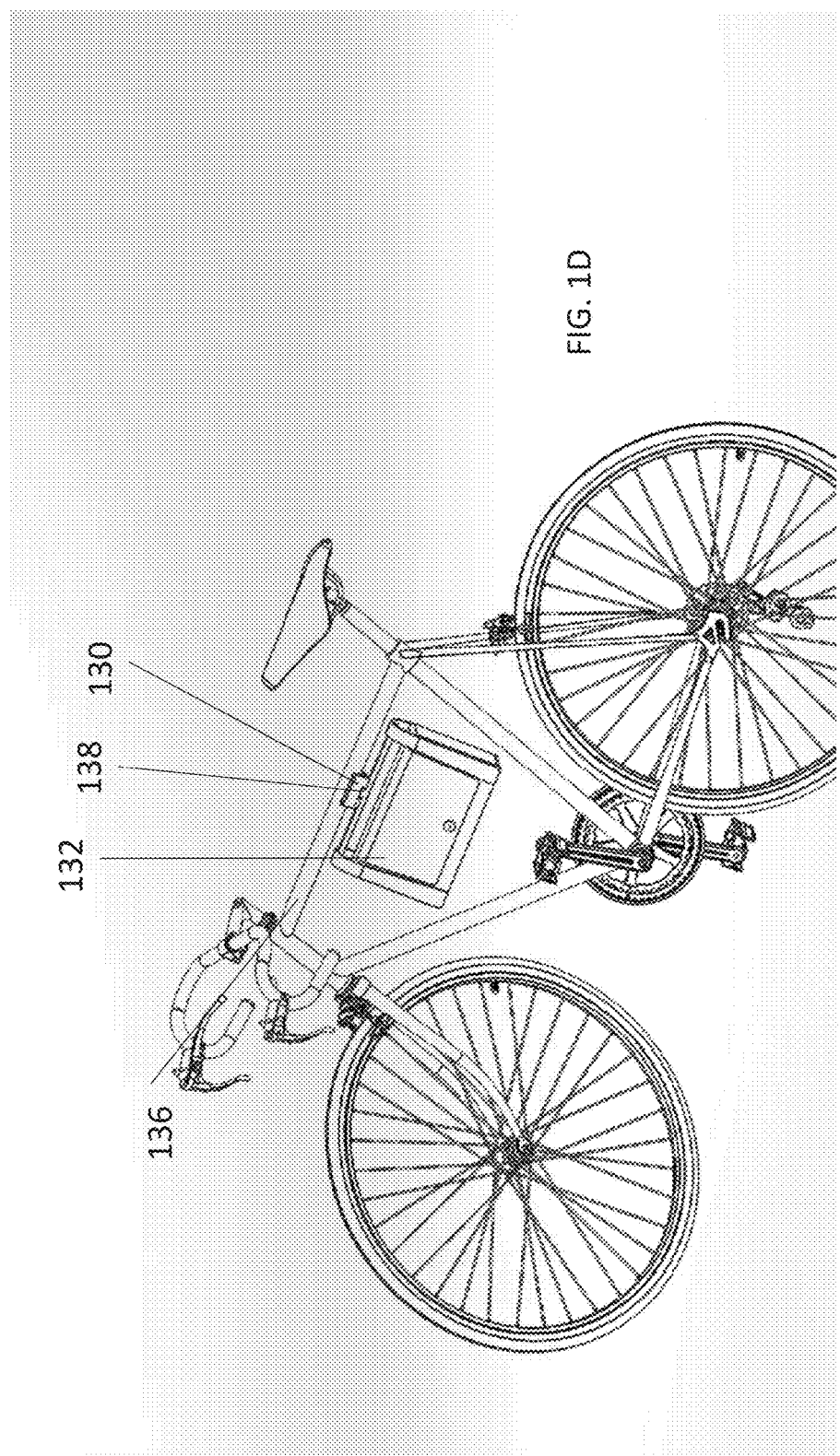

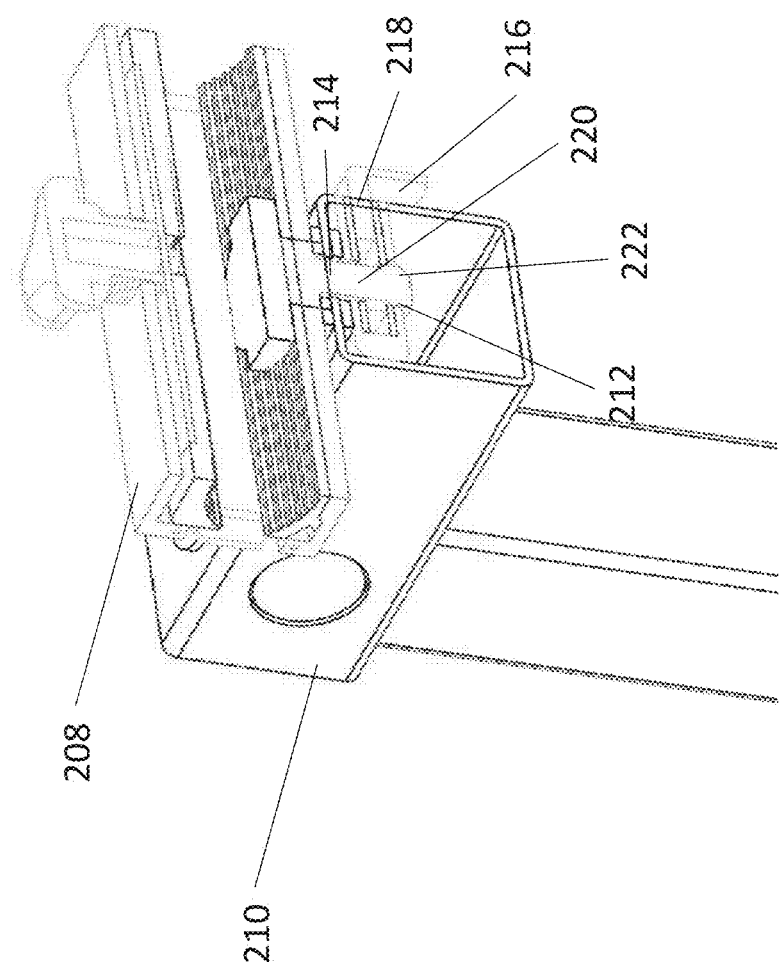

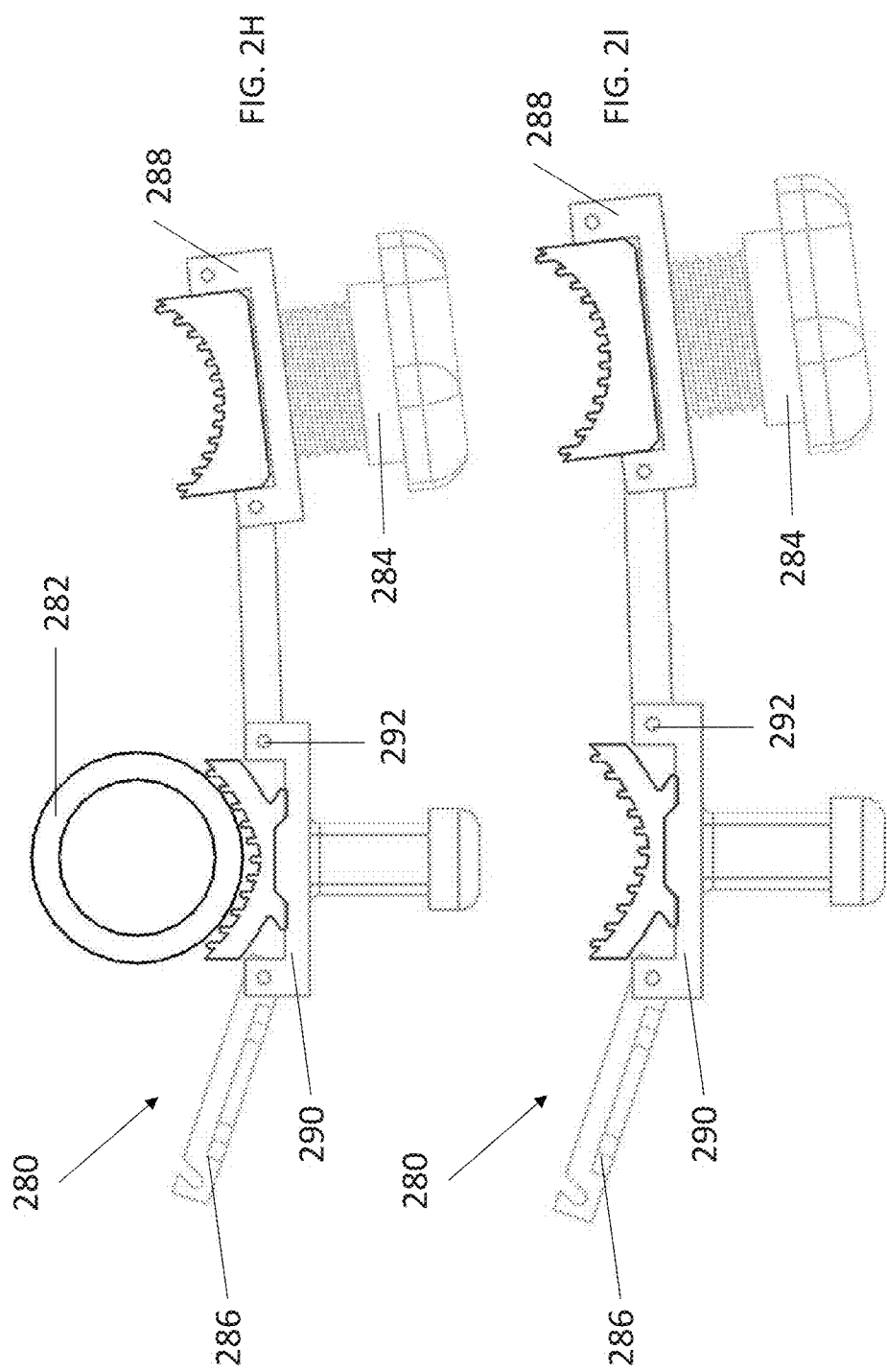

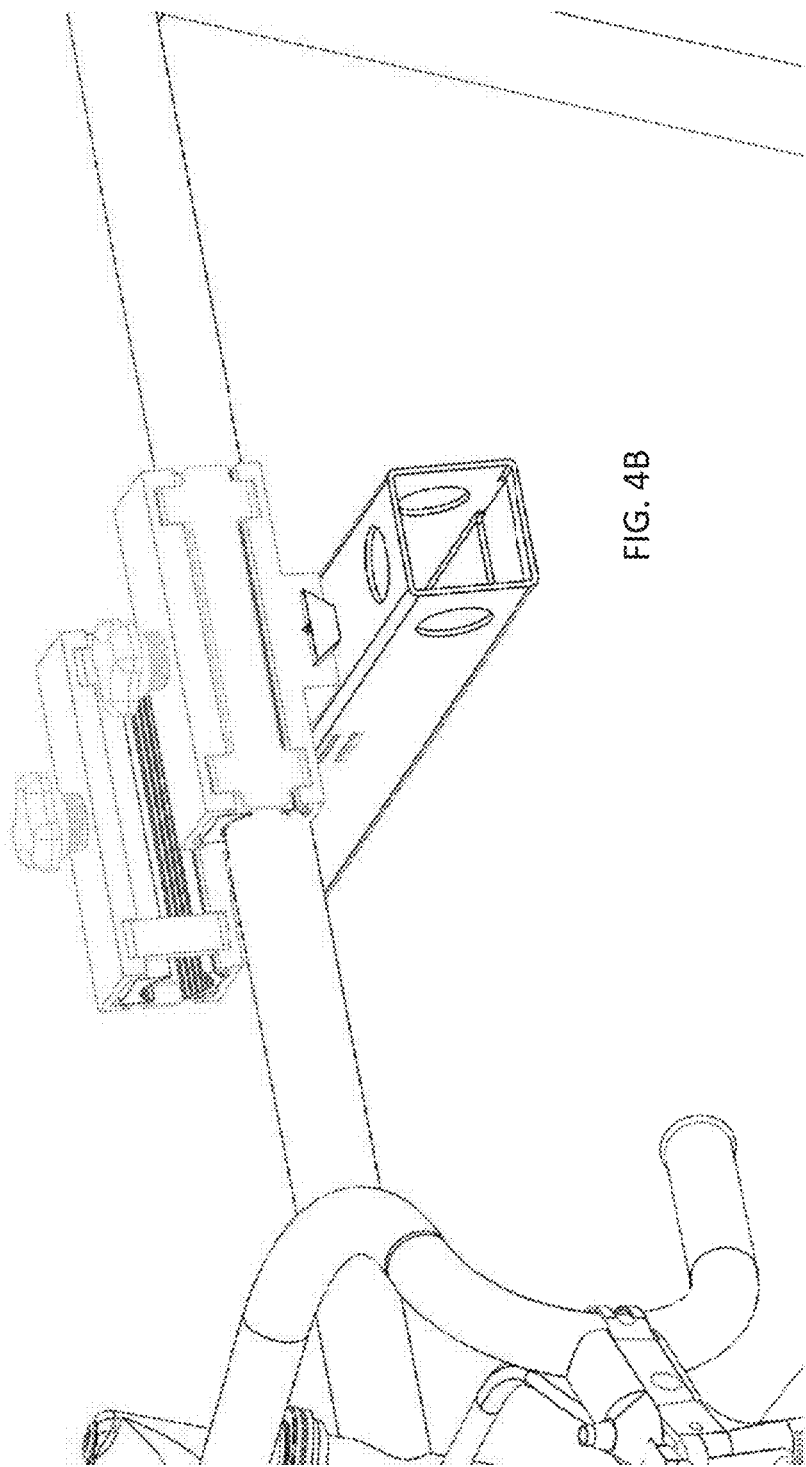

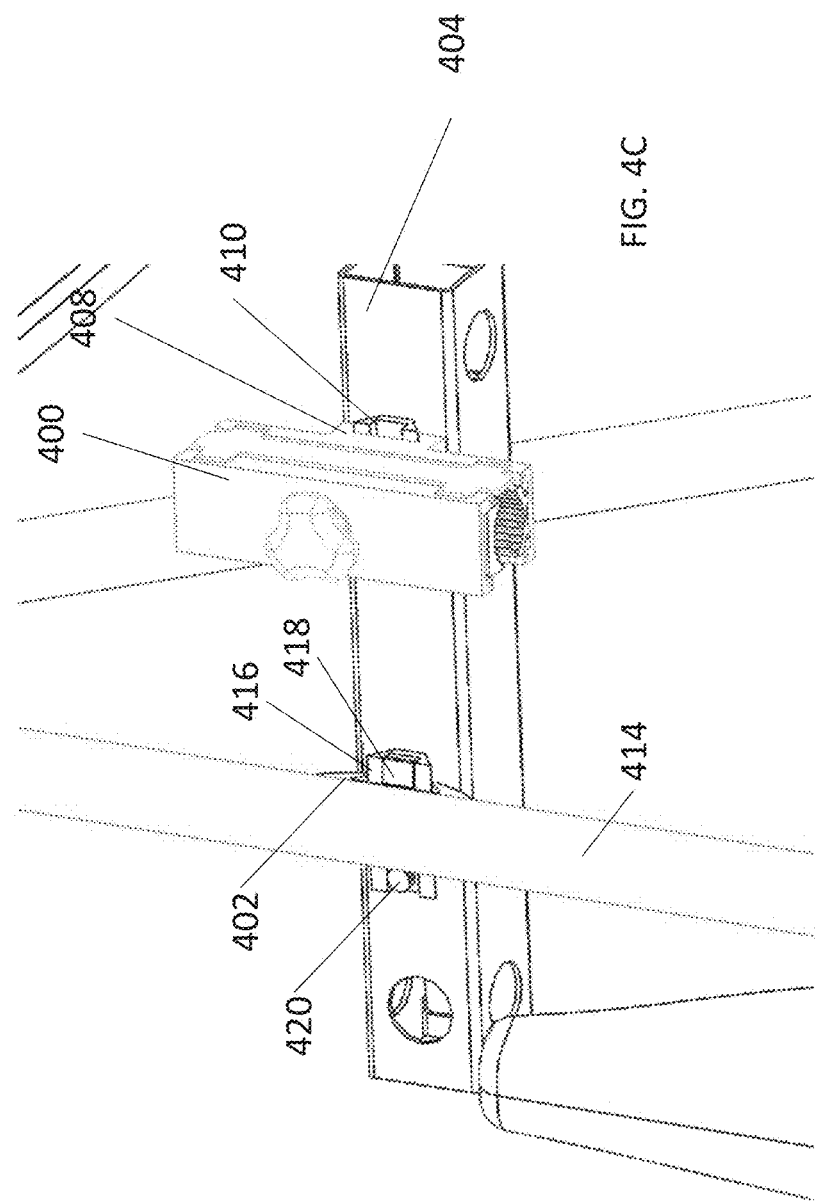

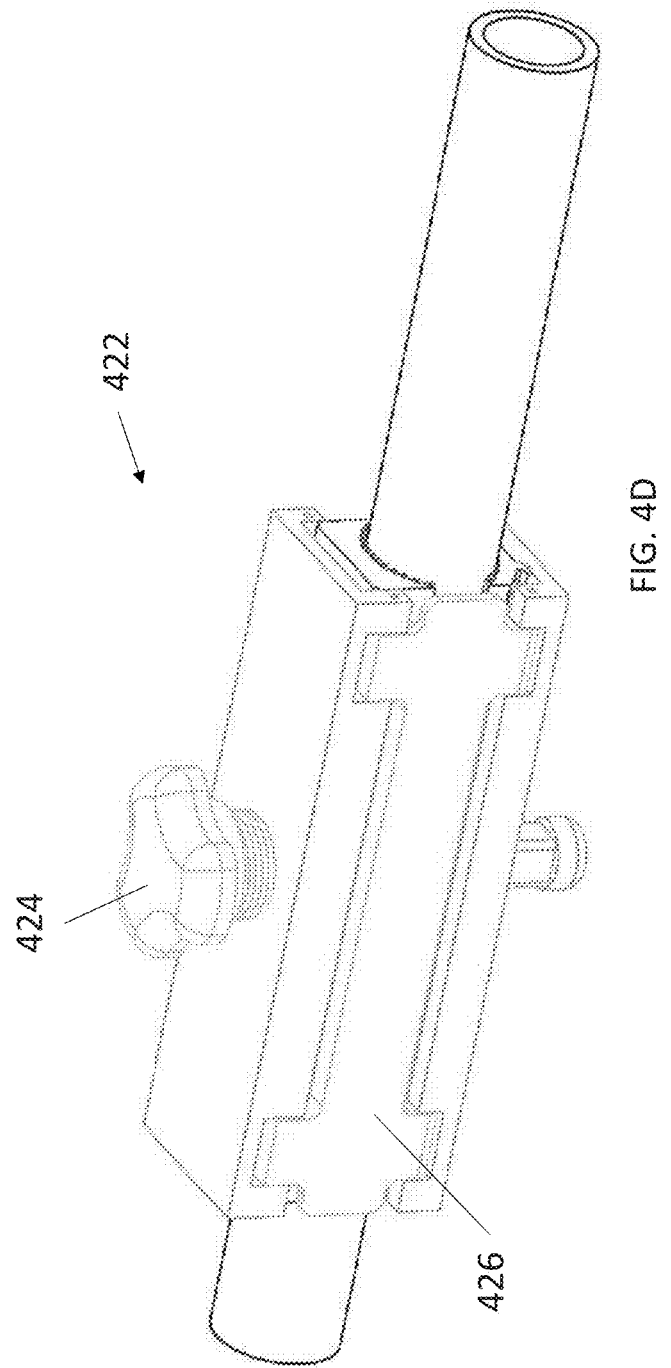

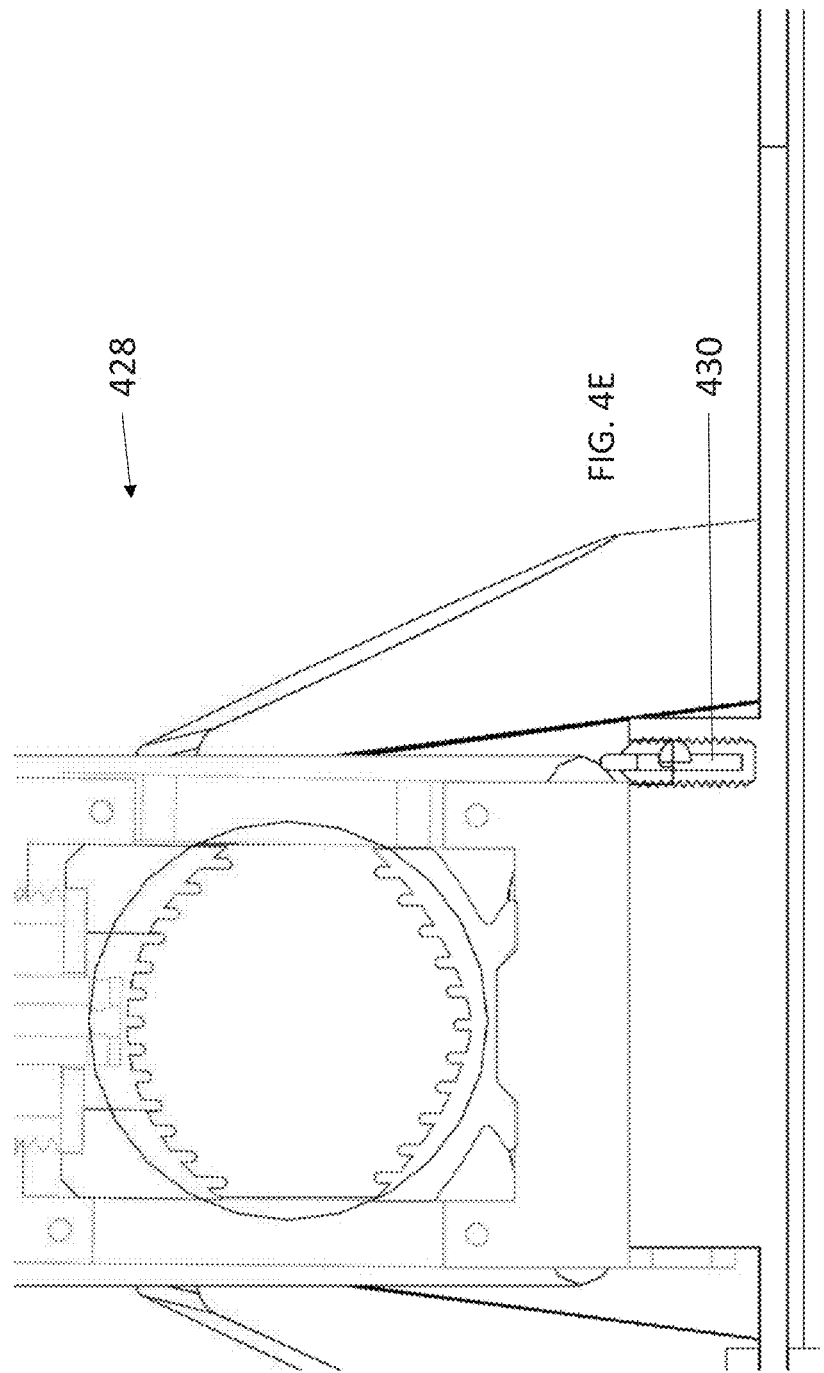

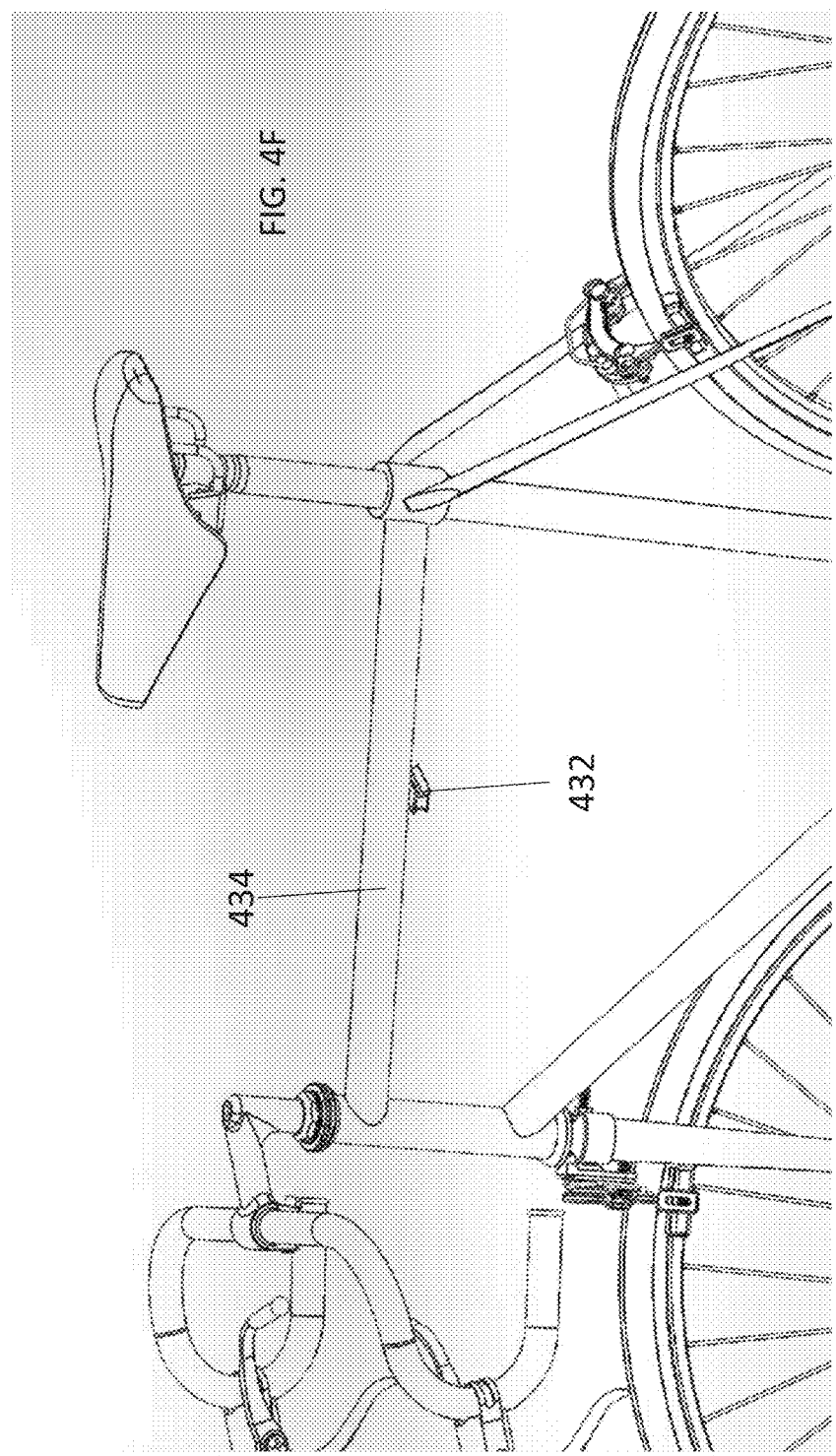

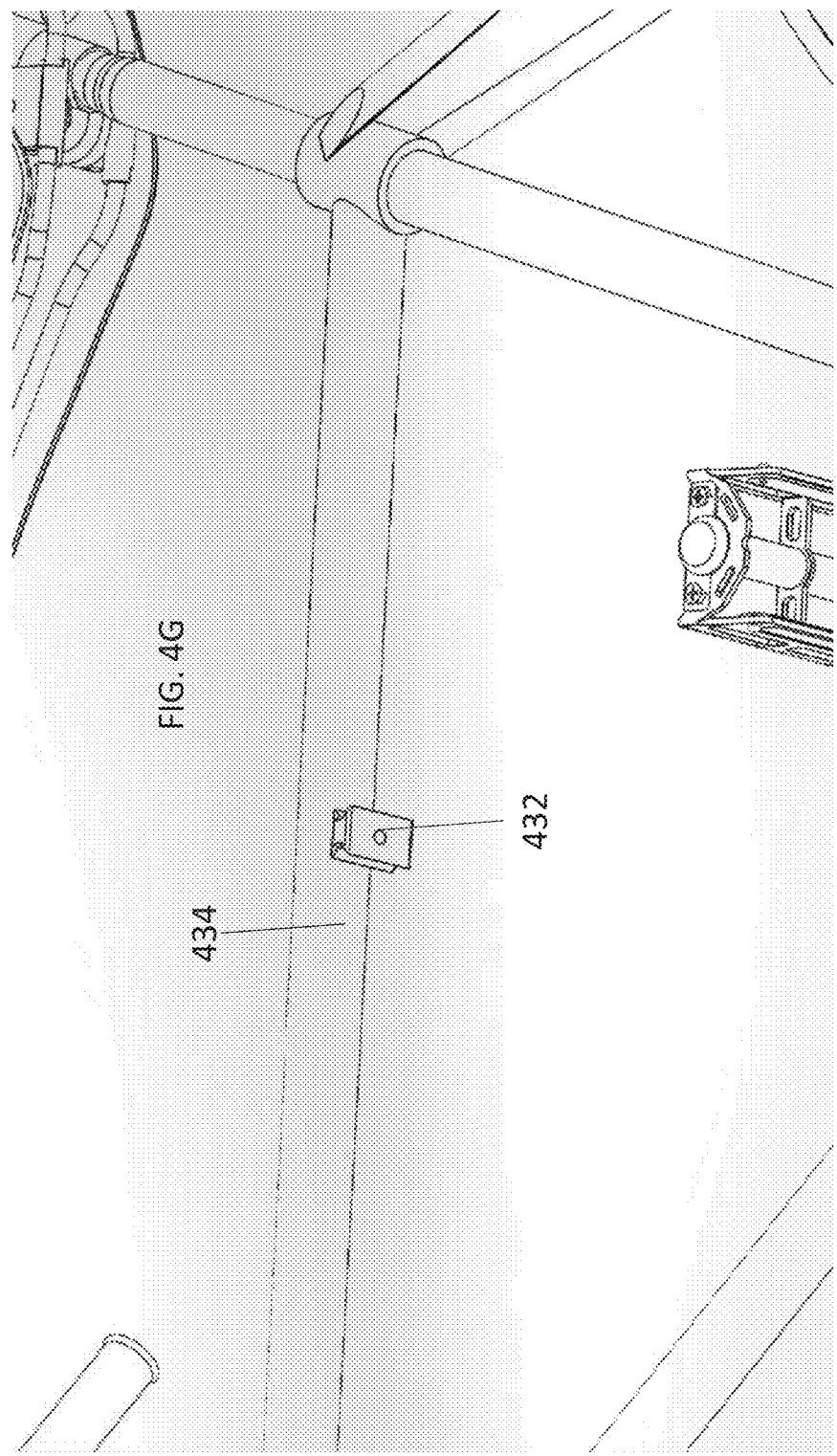

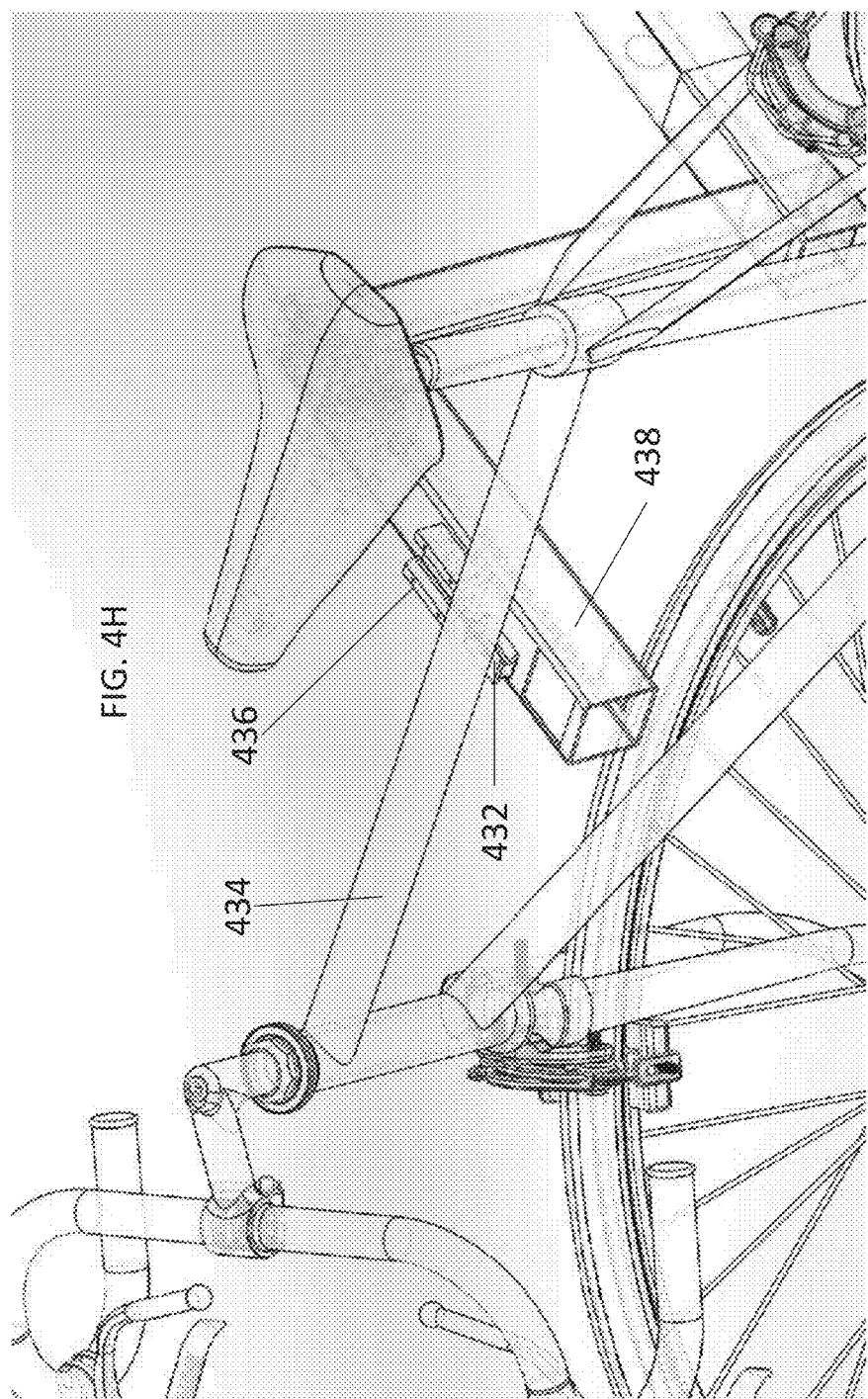

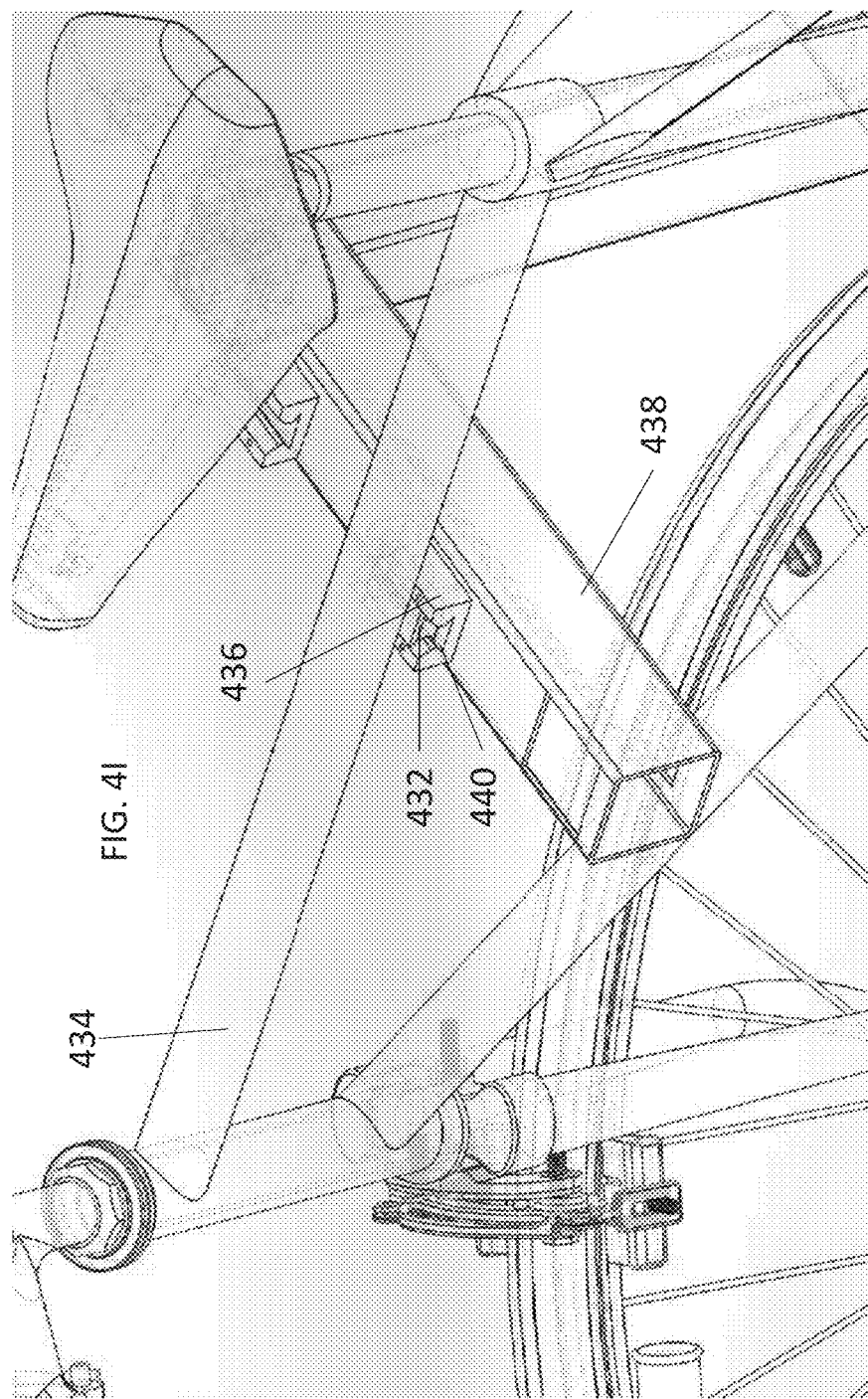

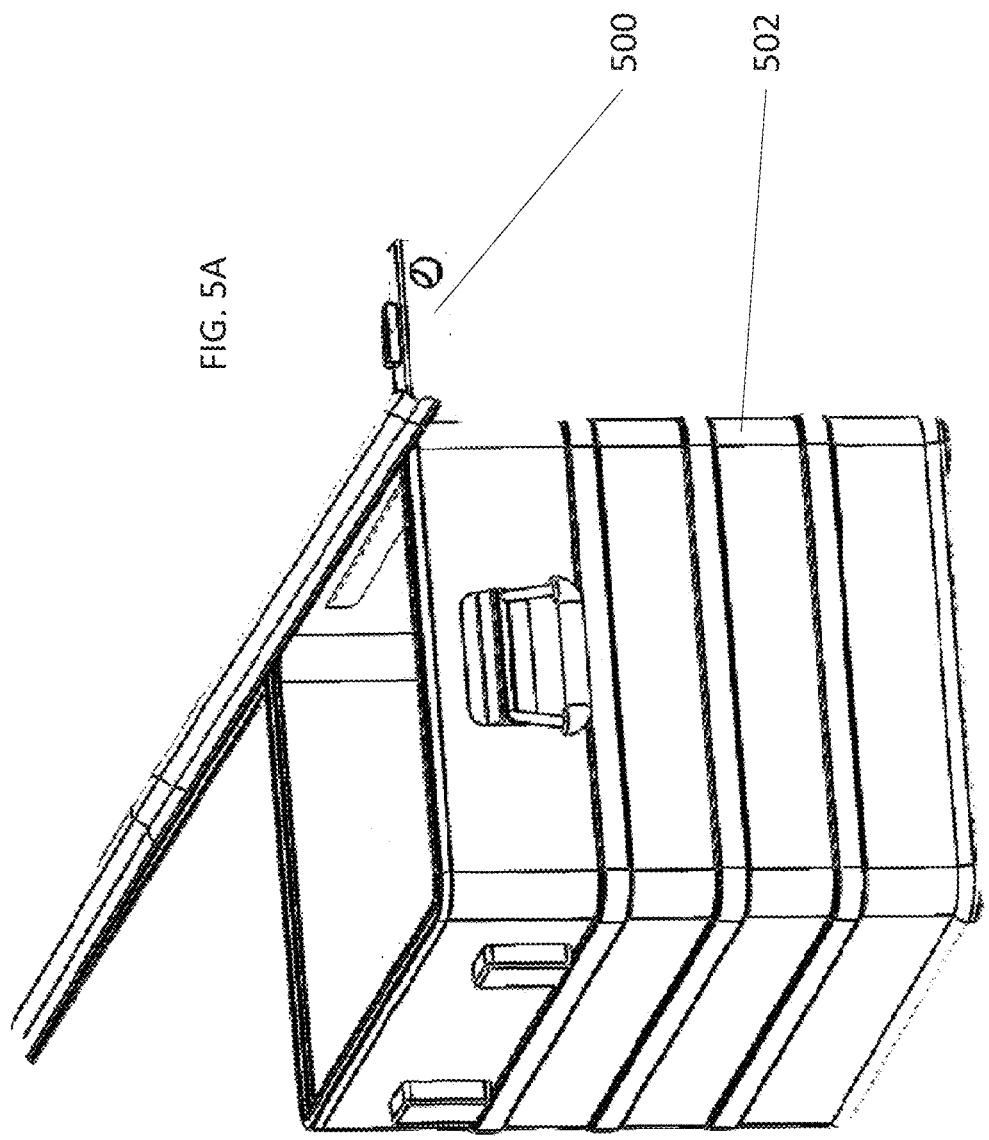

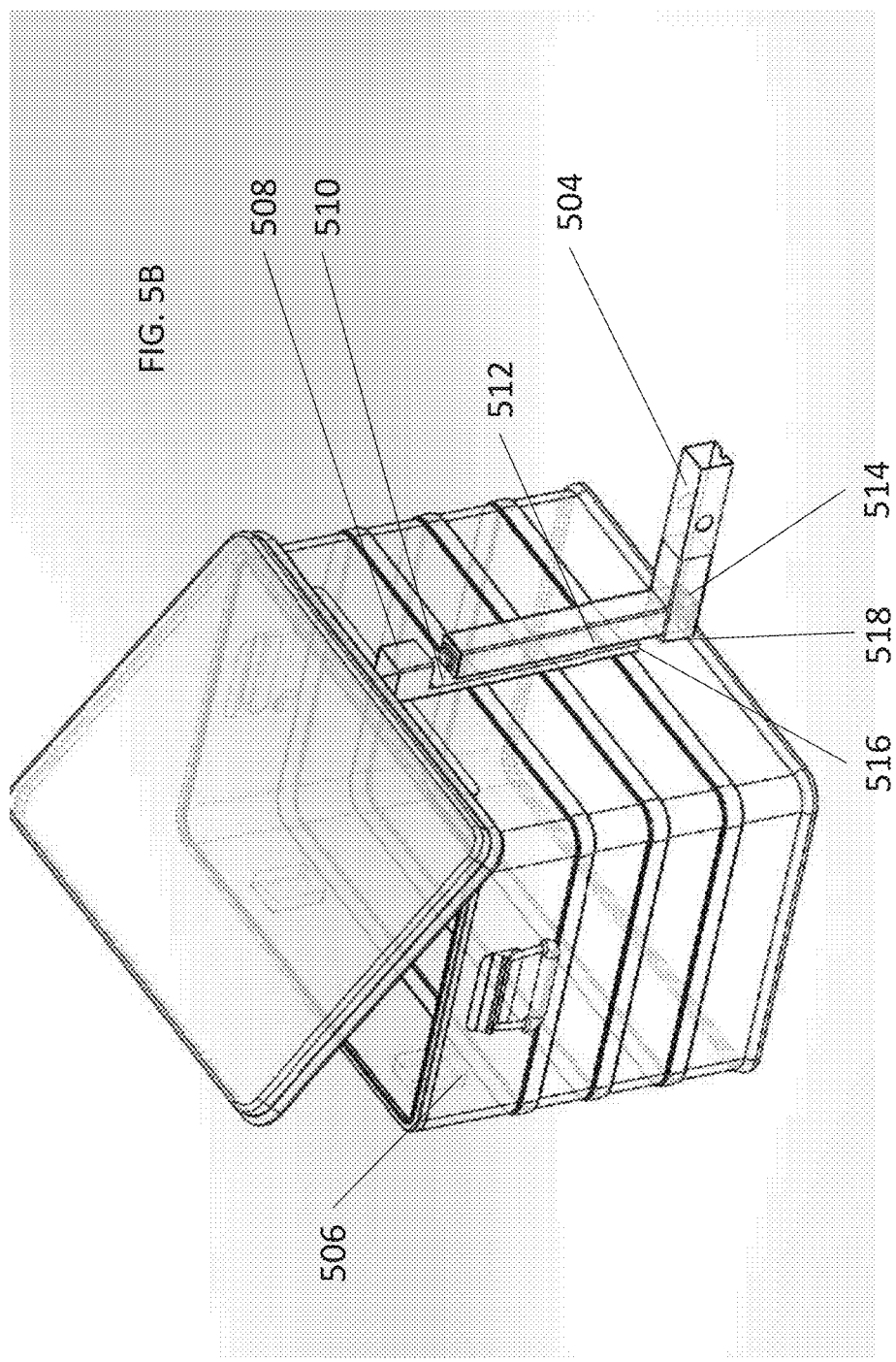

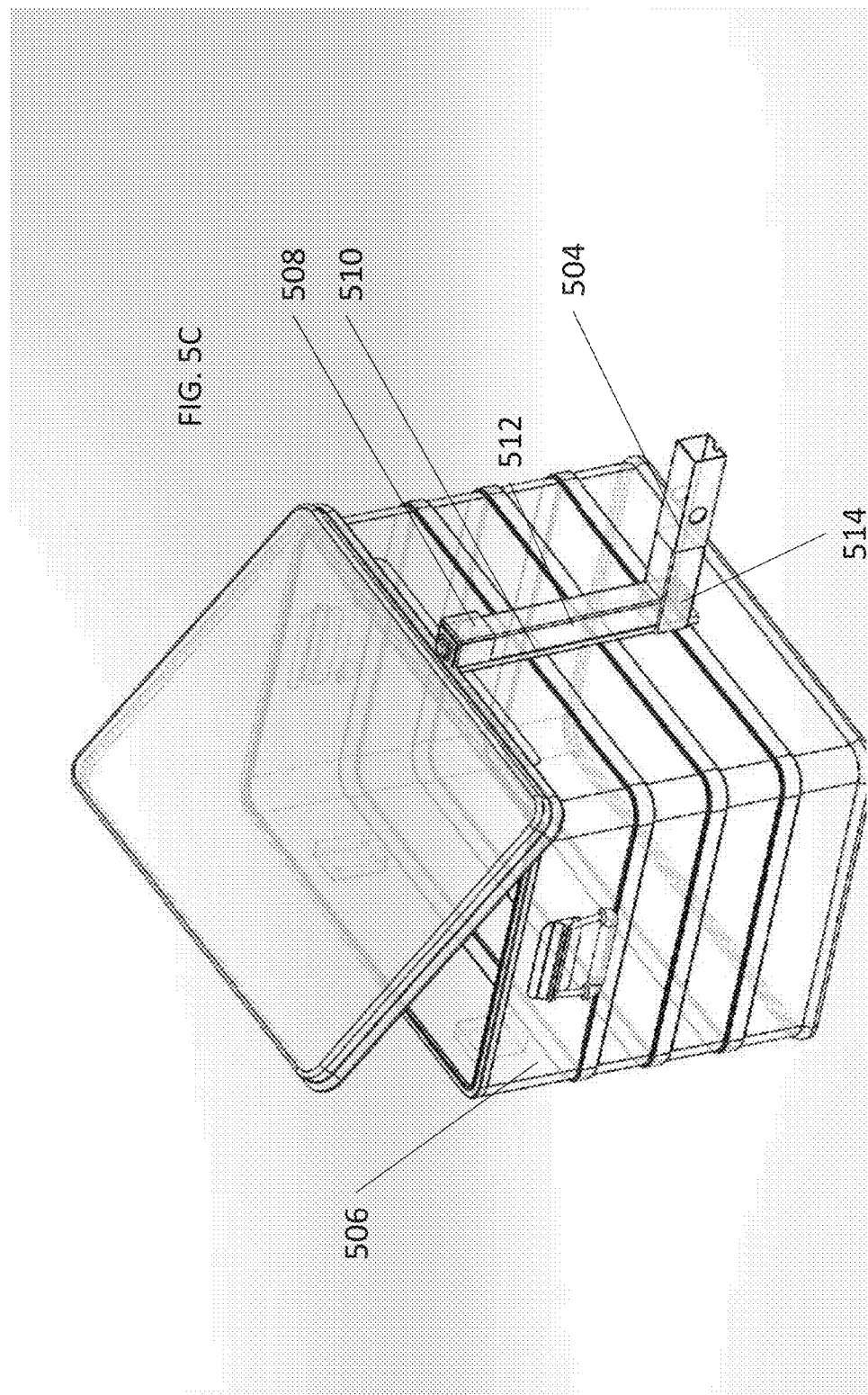

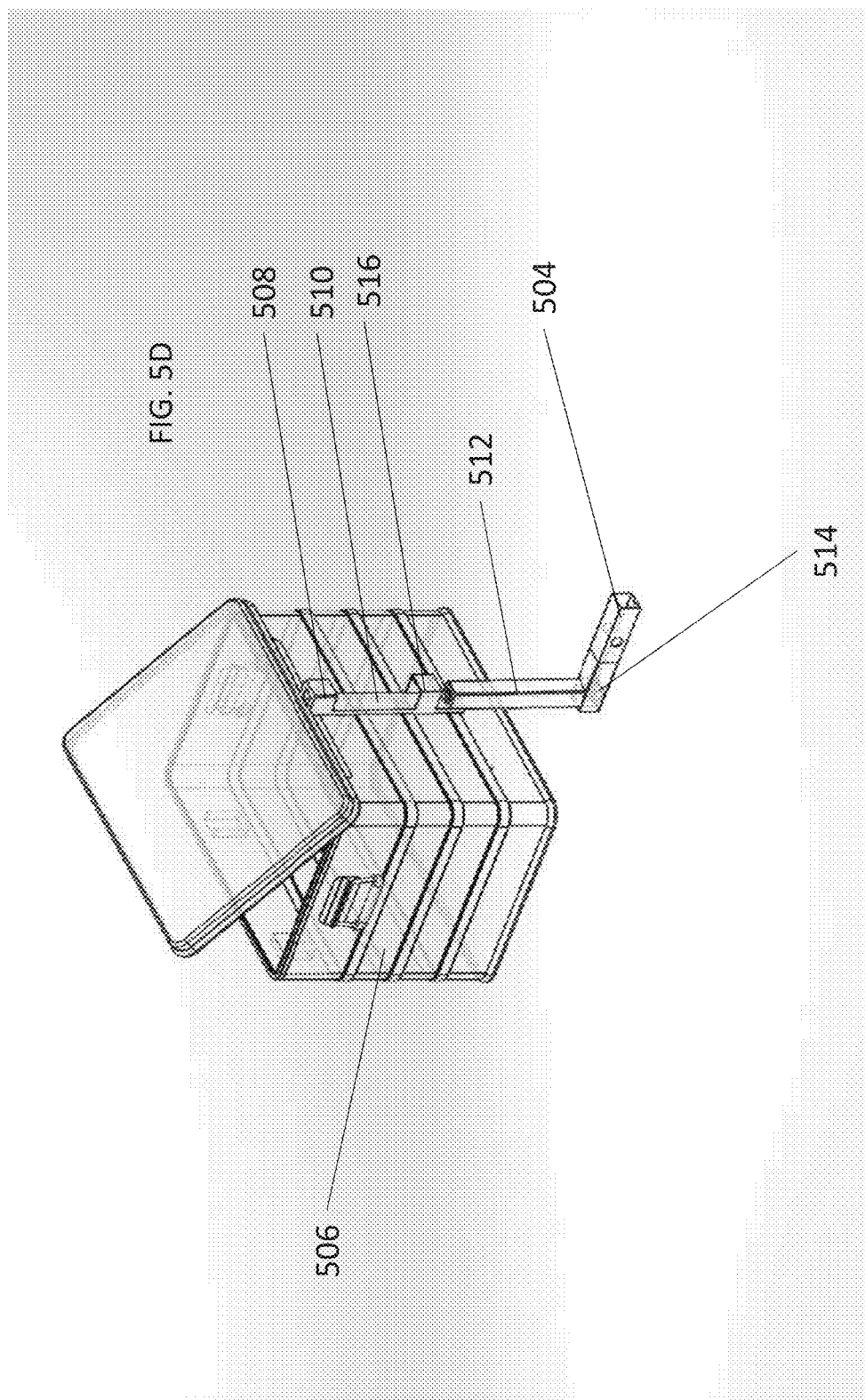

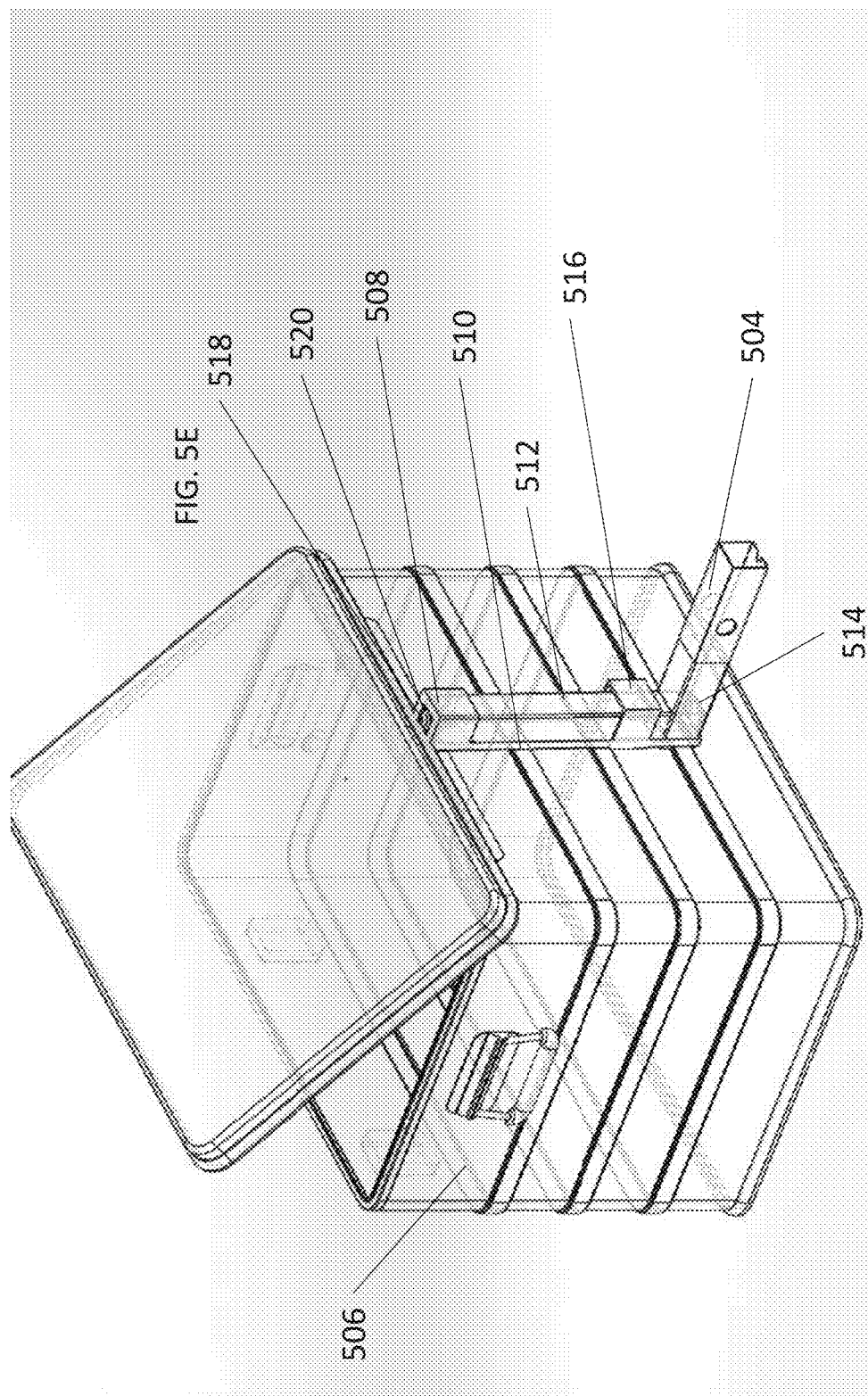

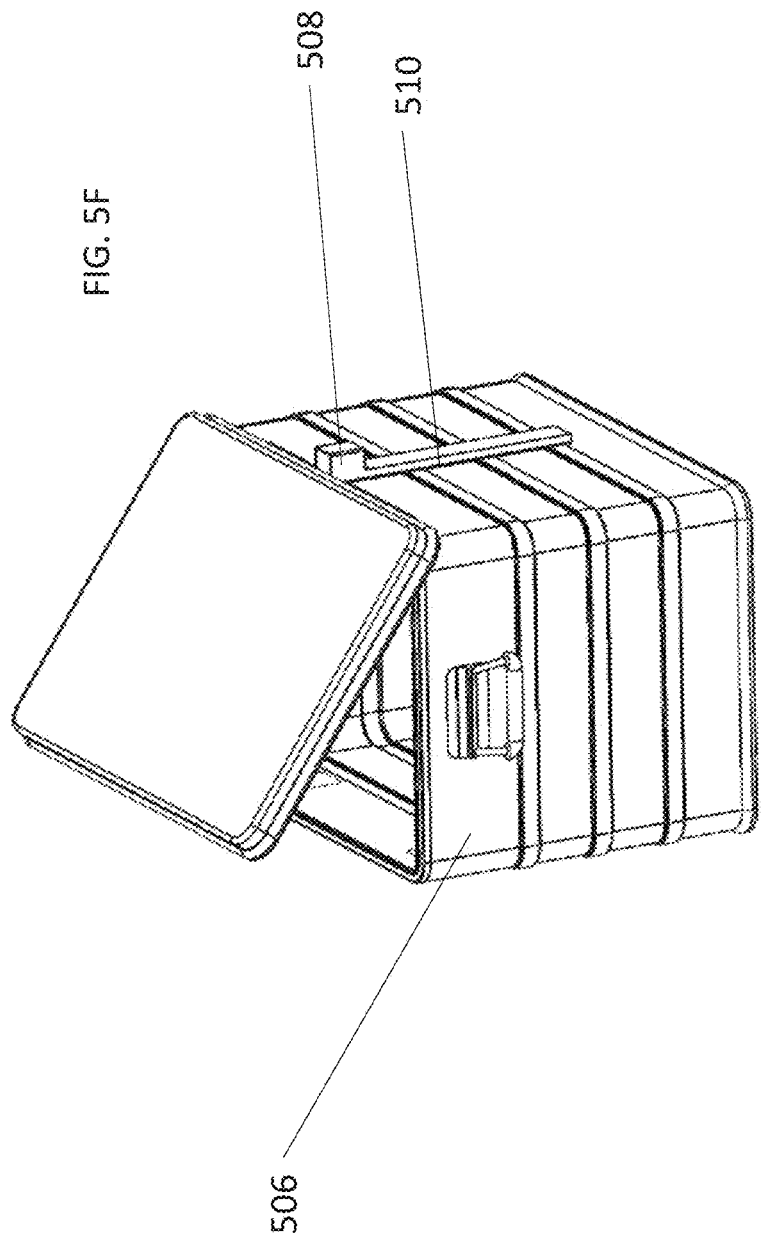

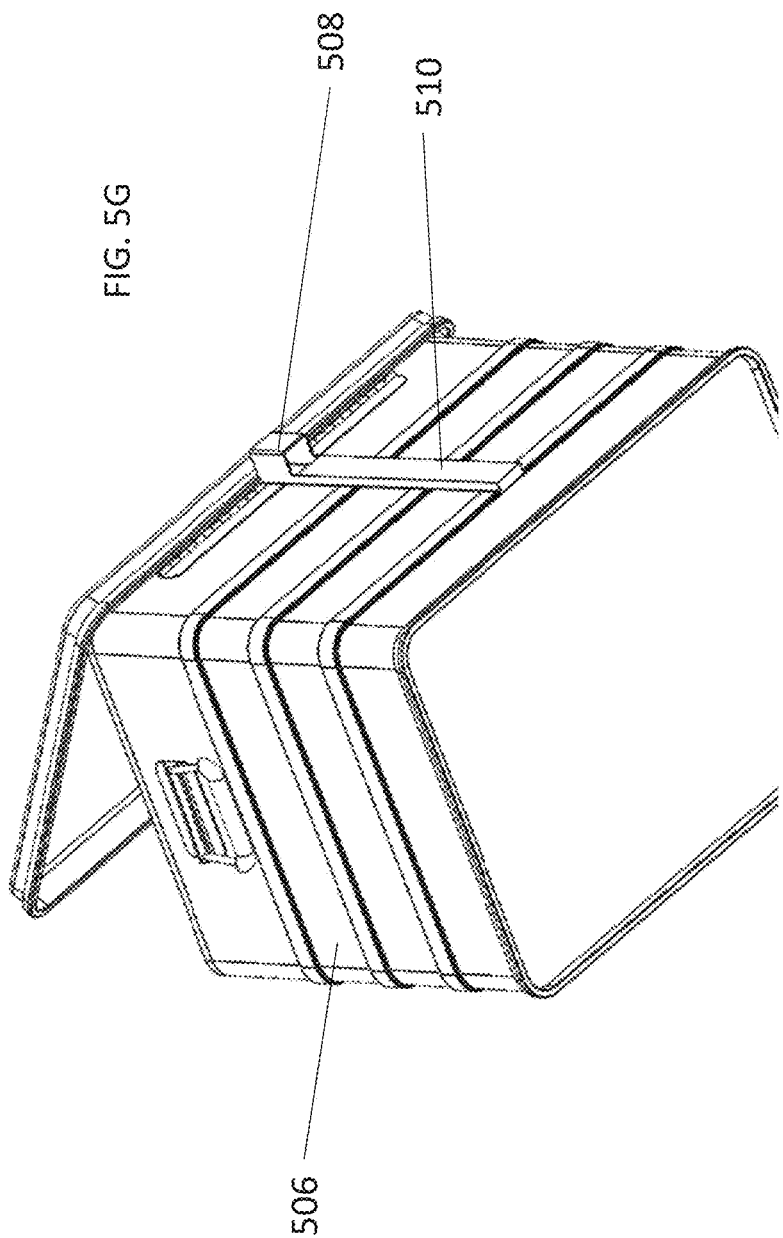

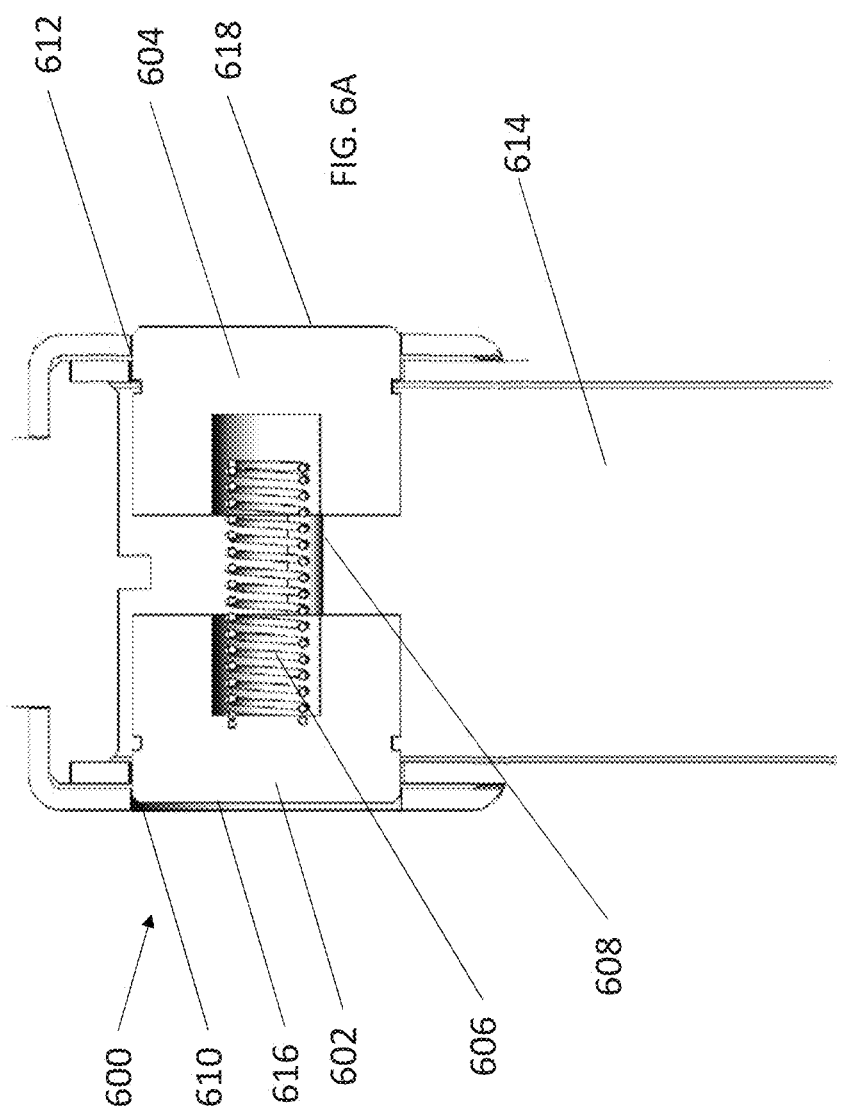

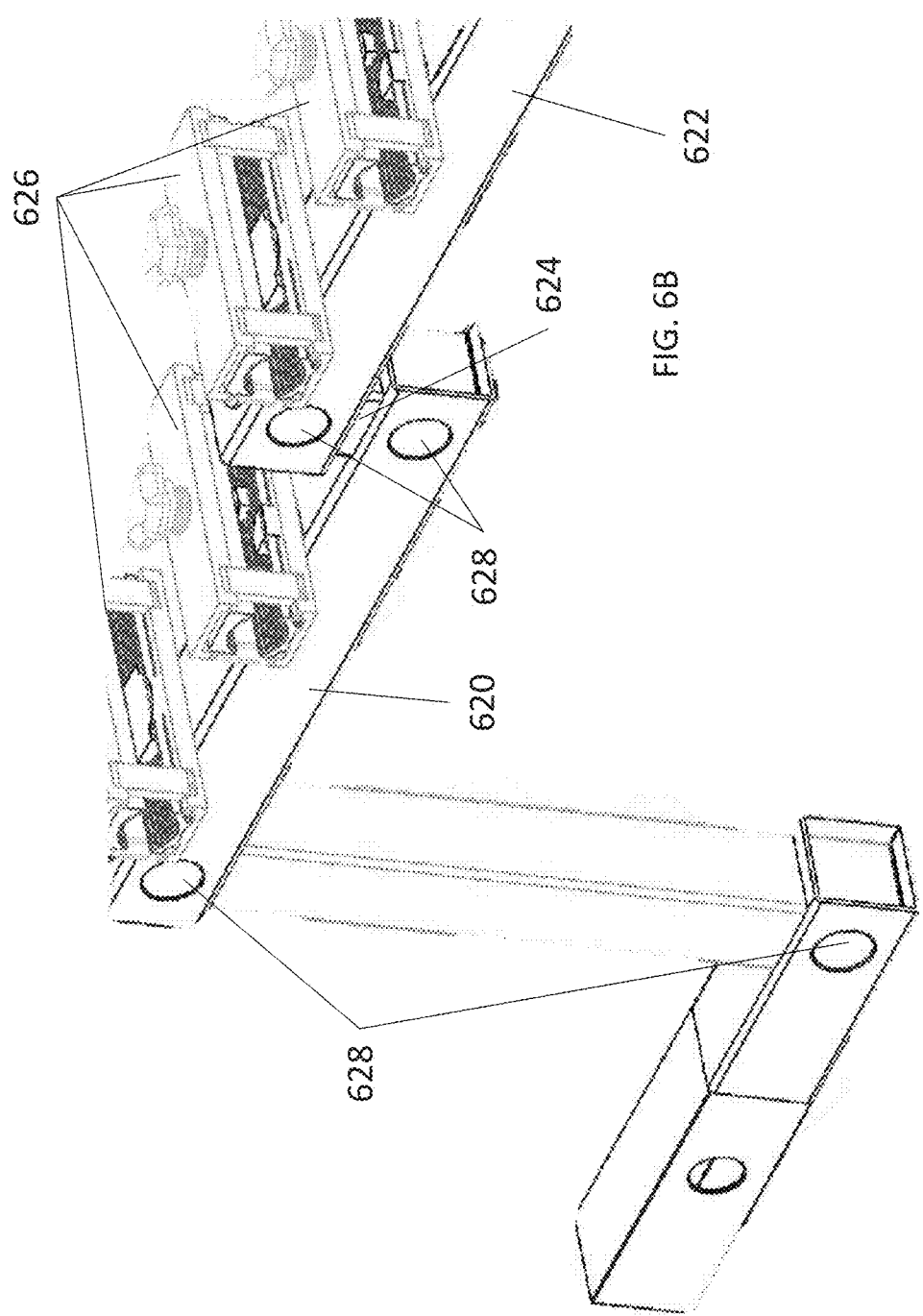

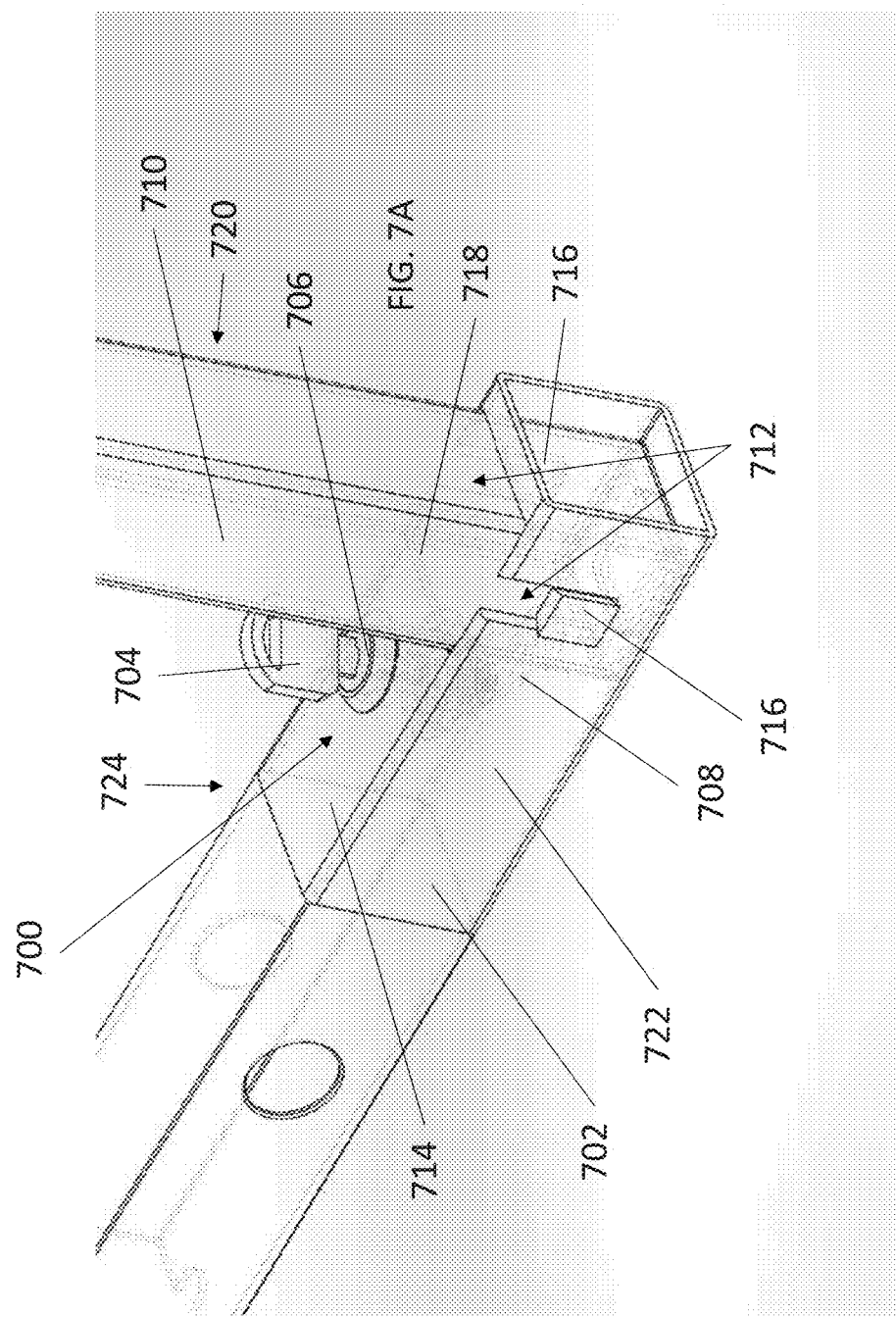

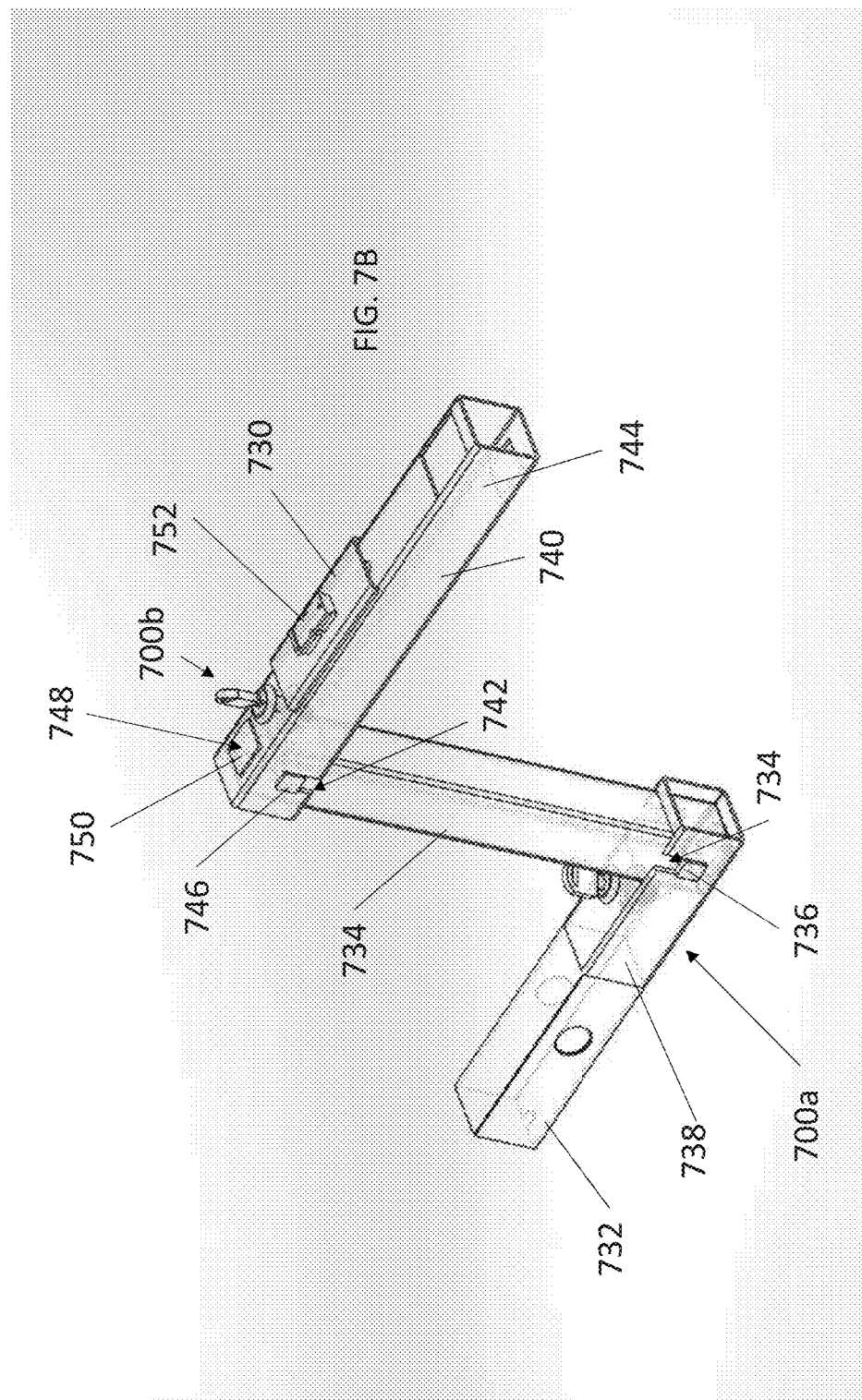

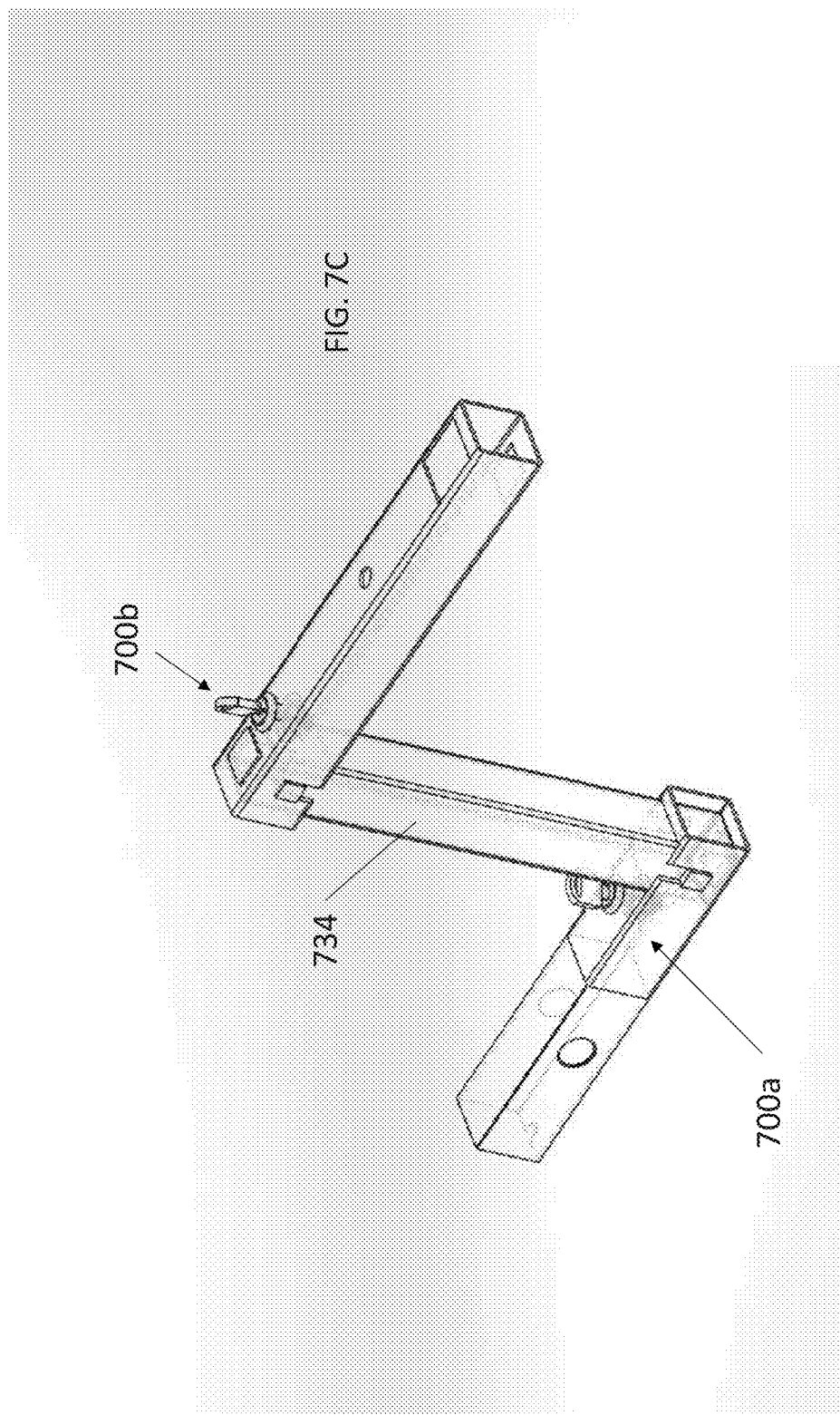

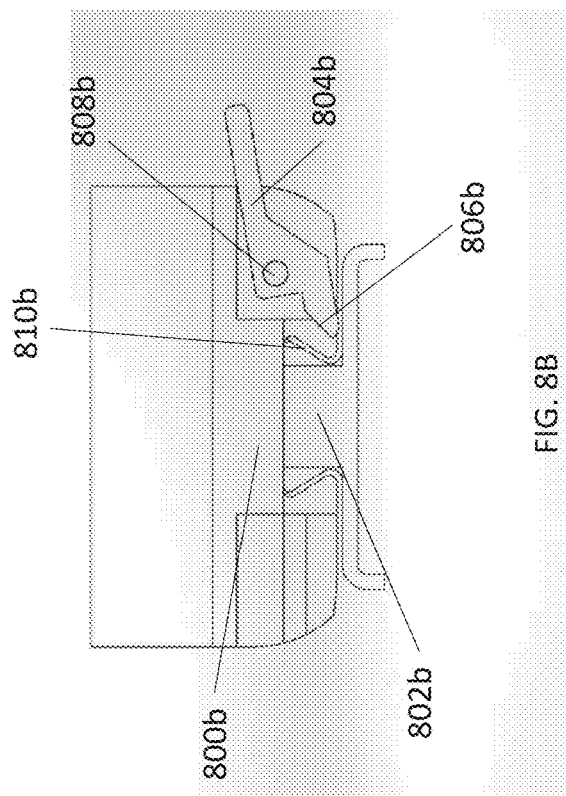
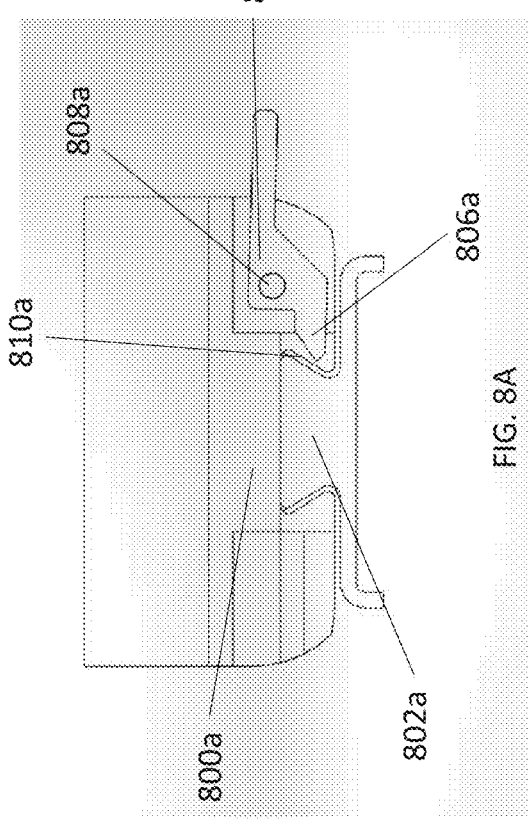
FIG. 8A
FIG. 8B

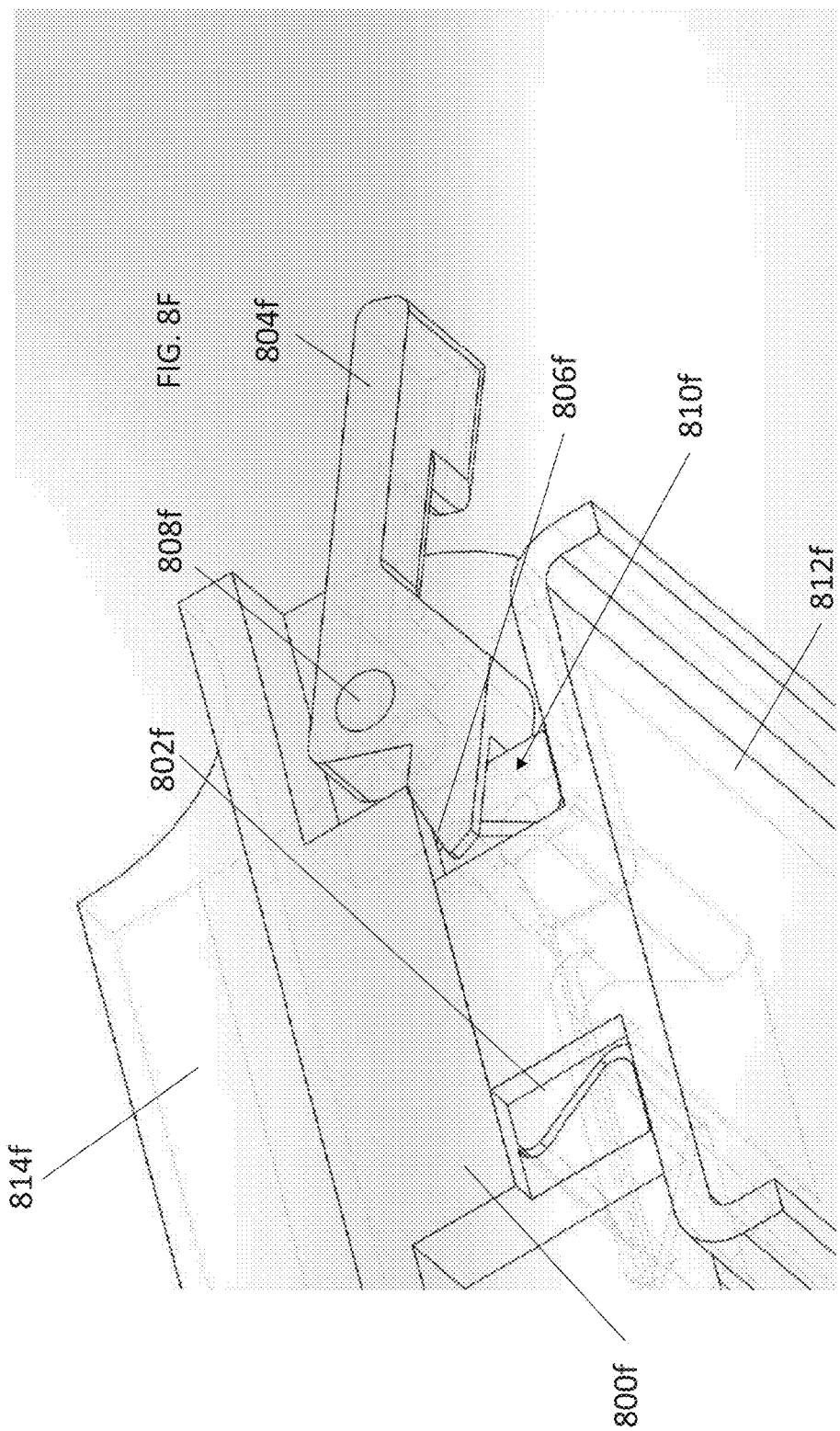

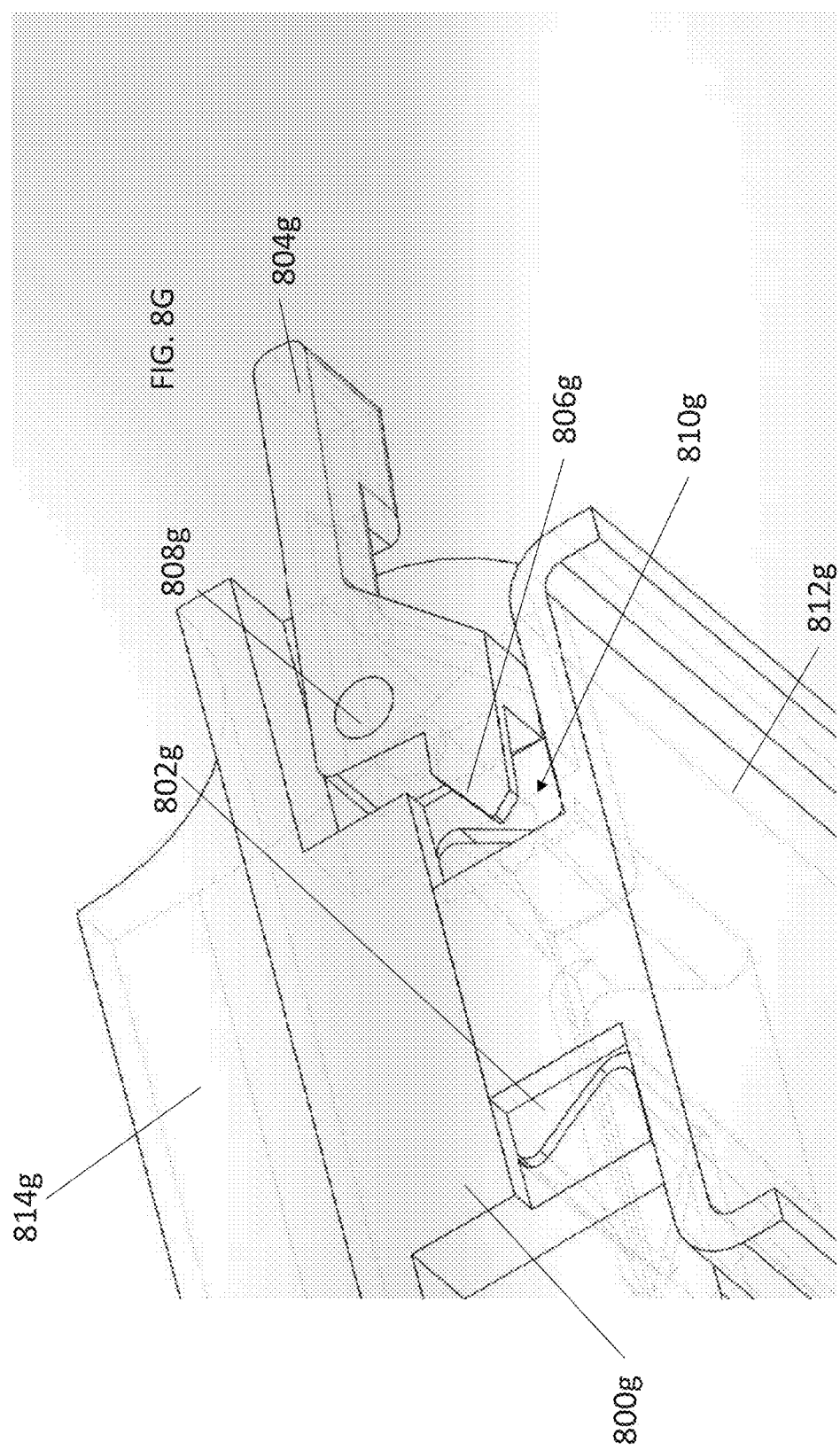

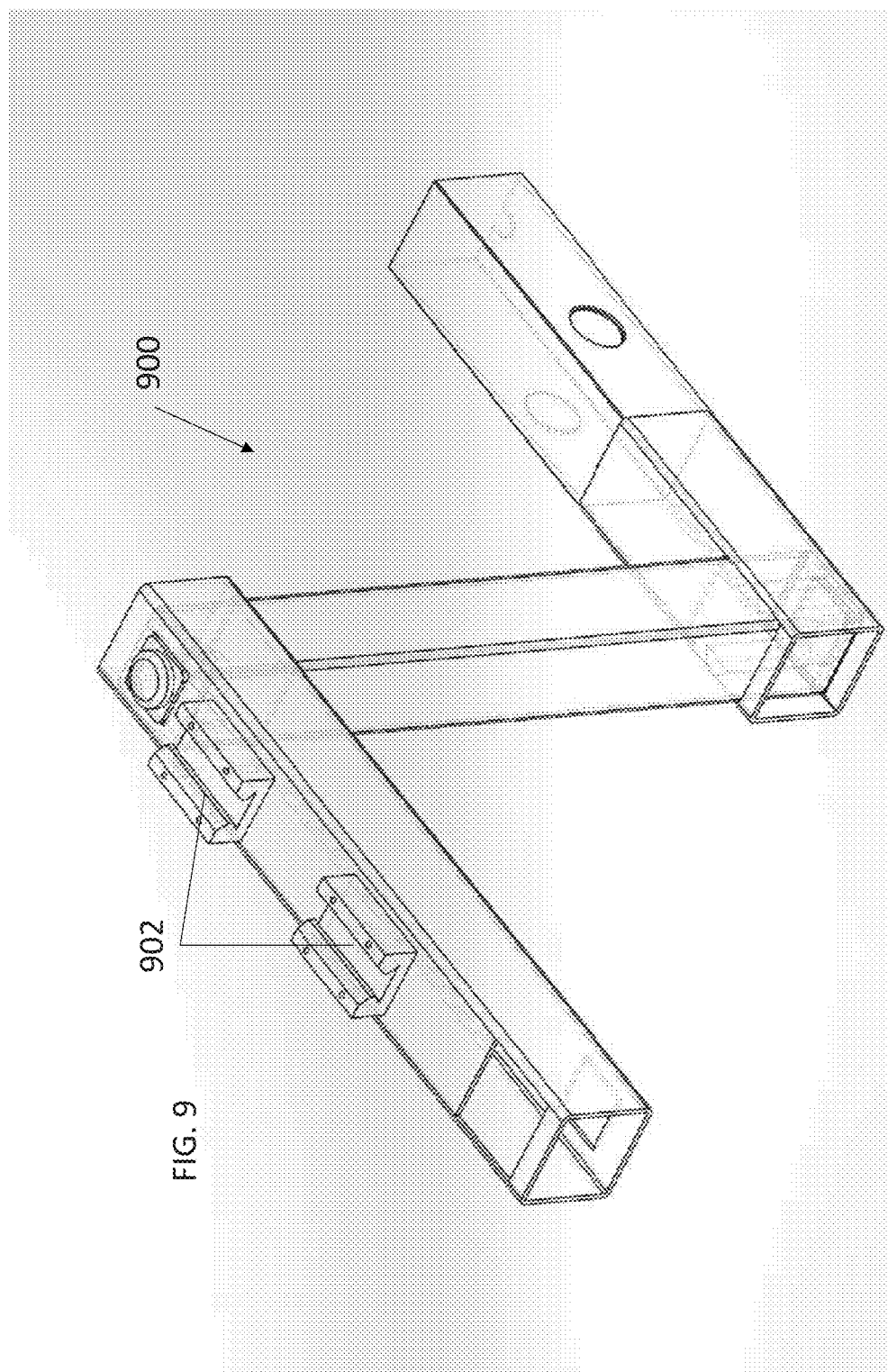

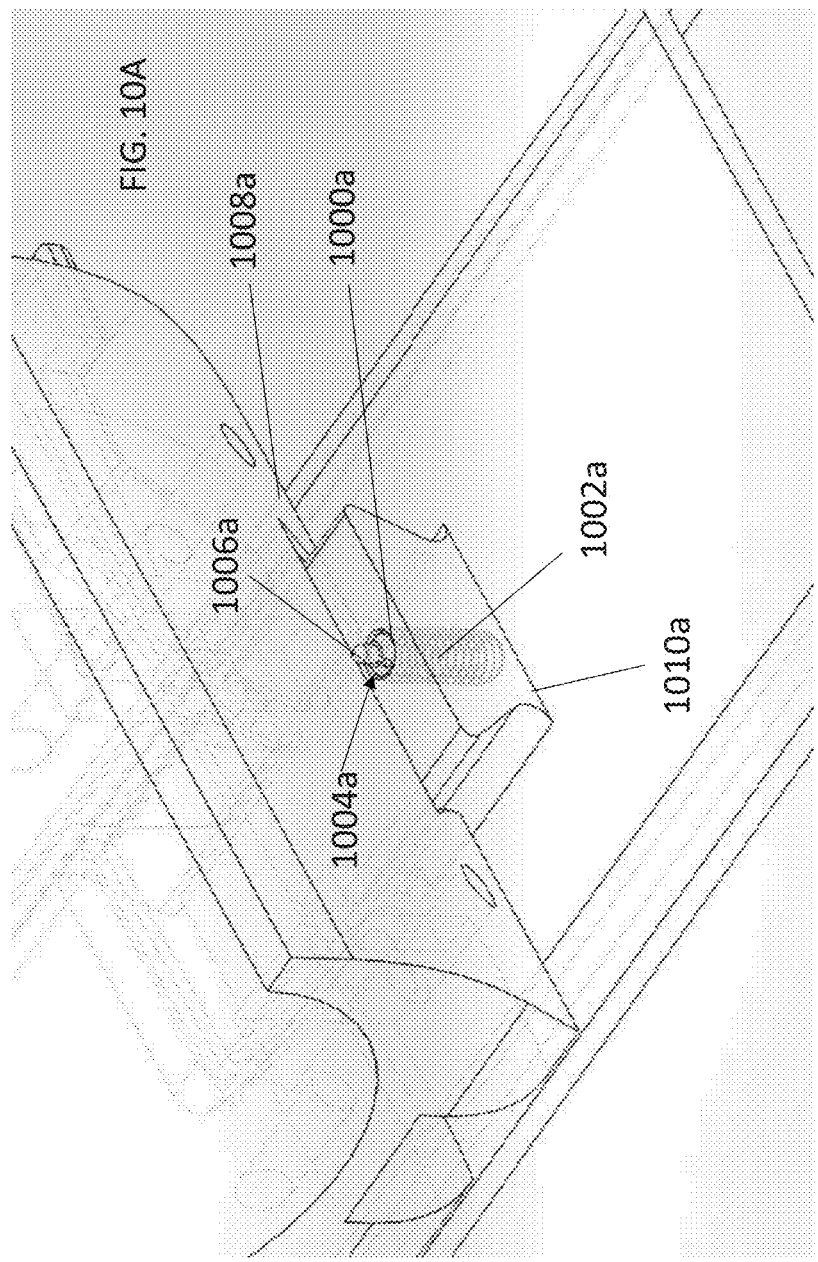

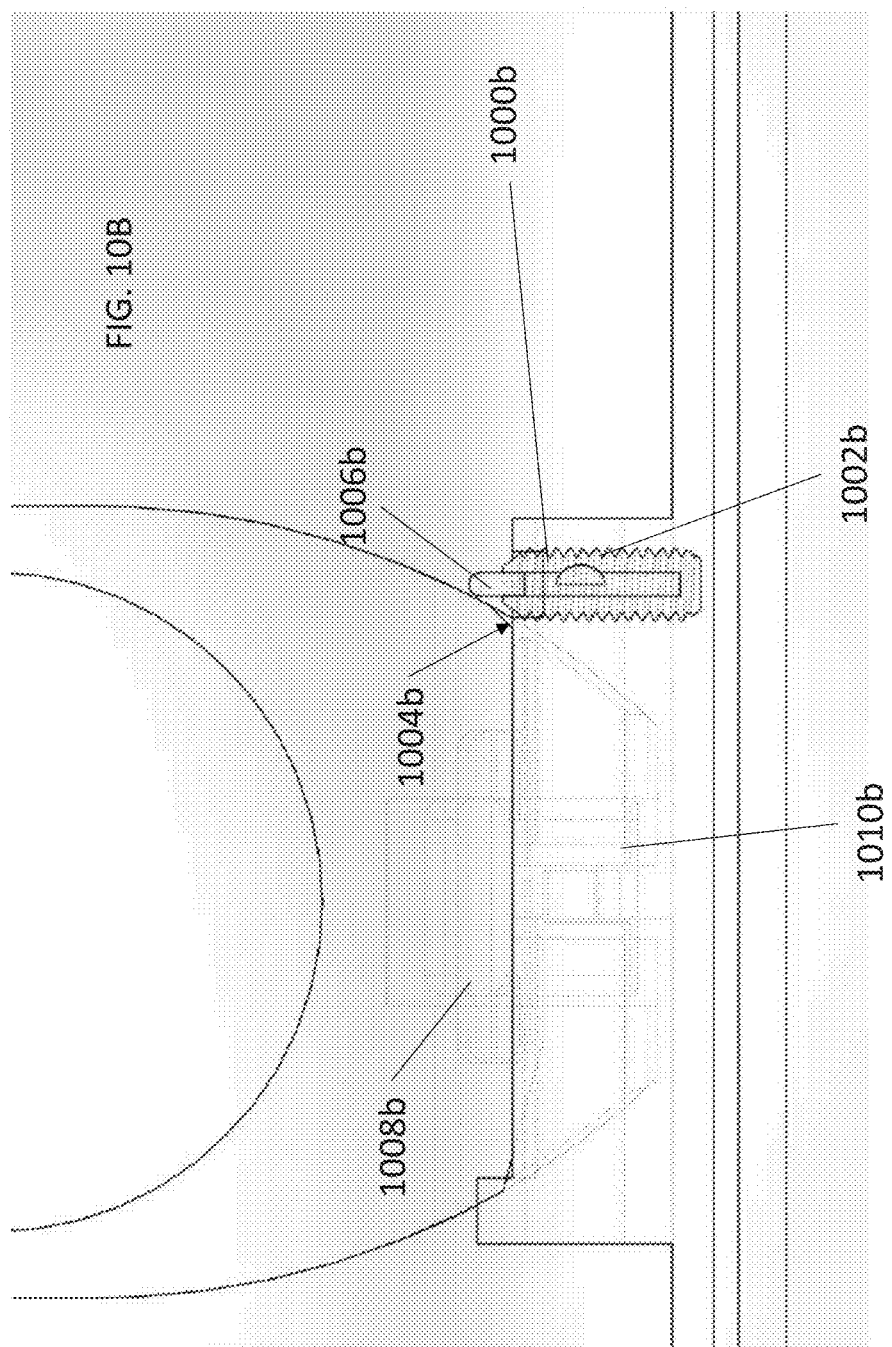

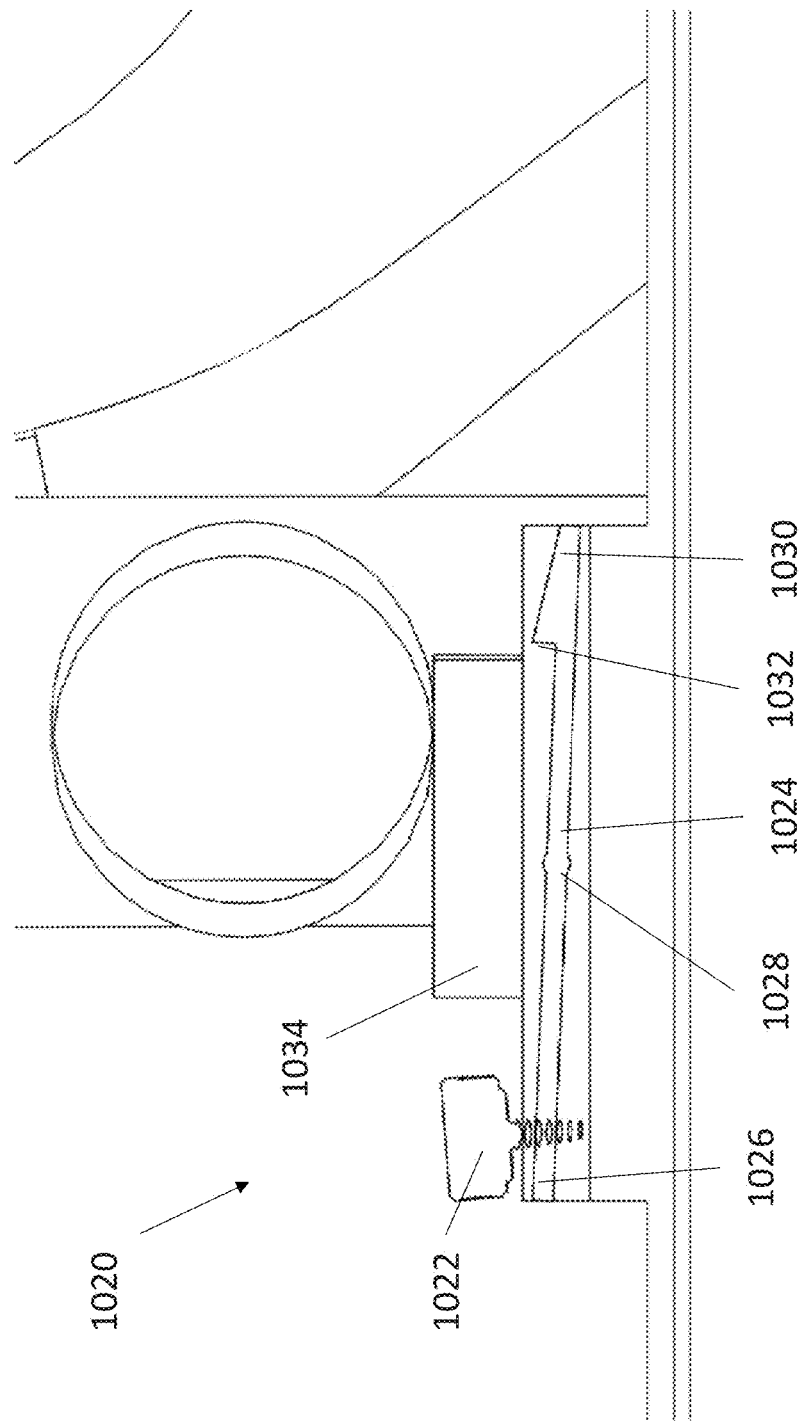

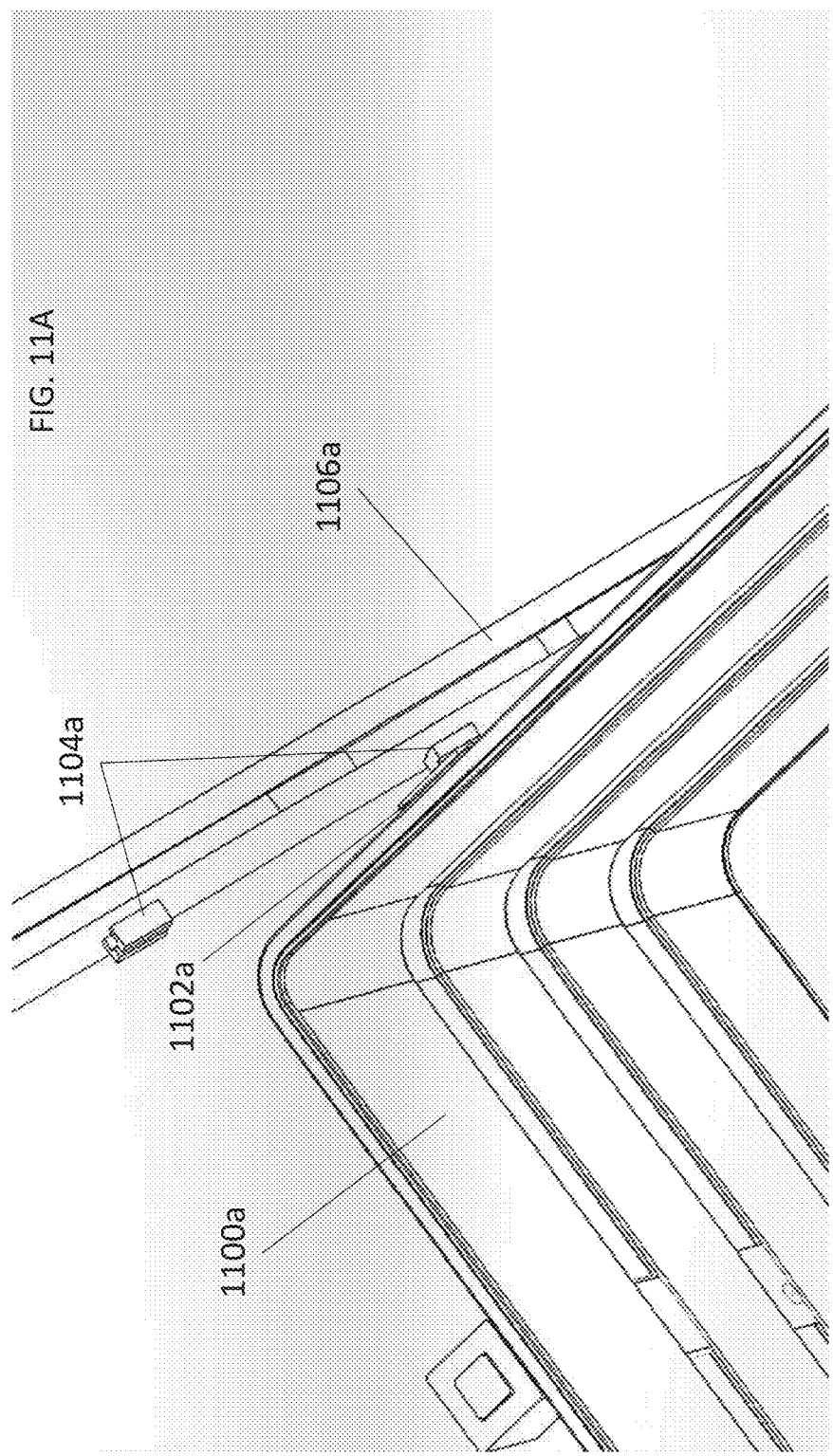

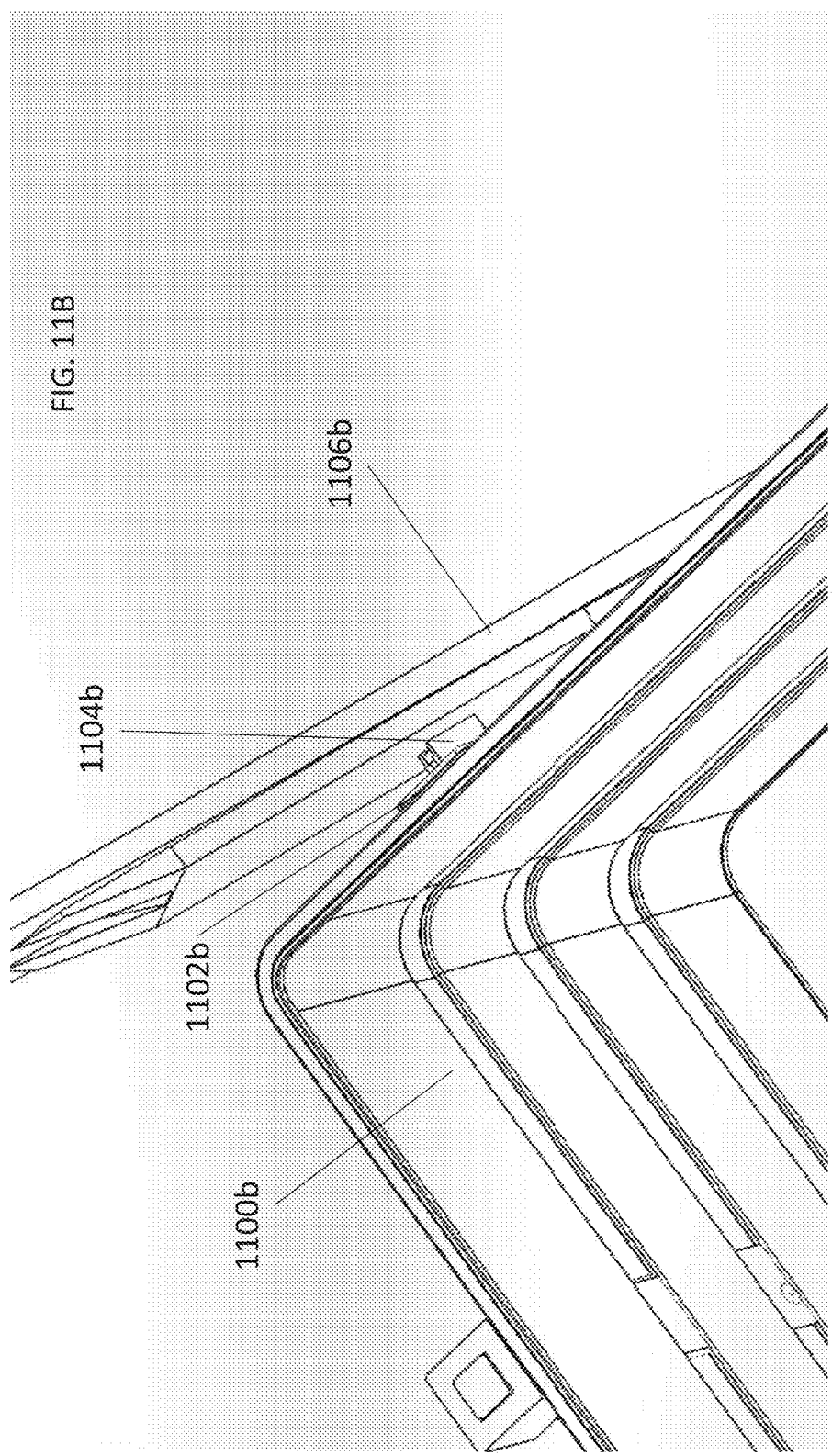

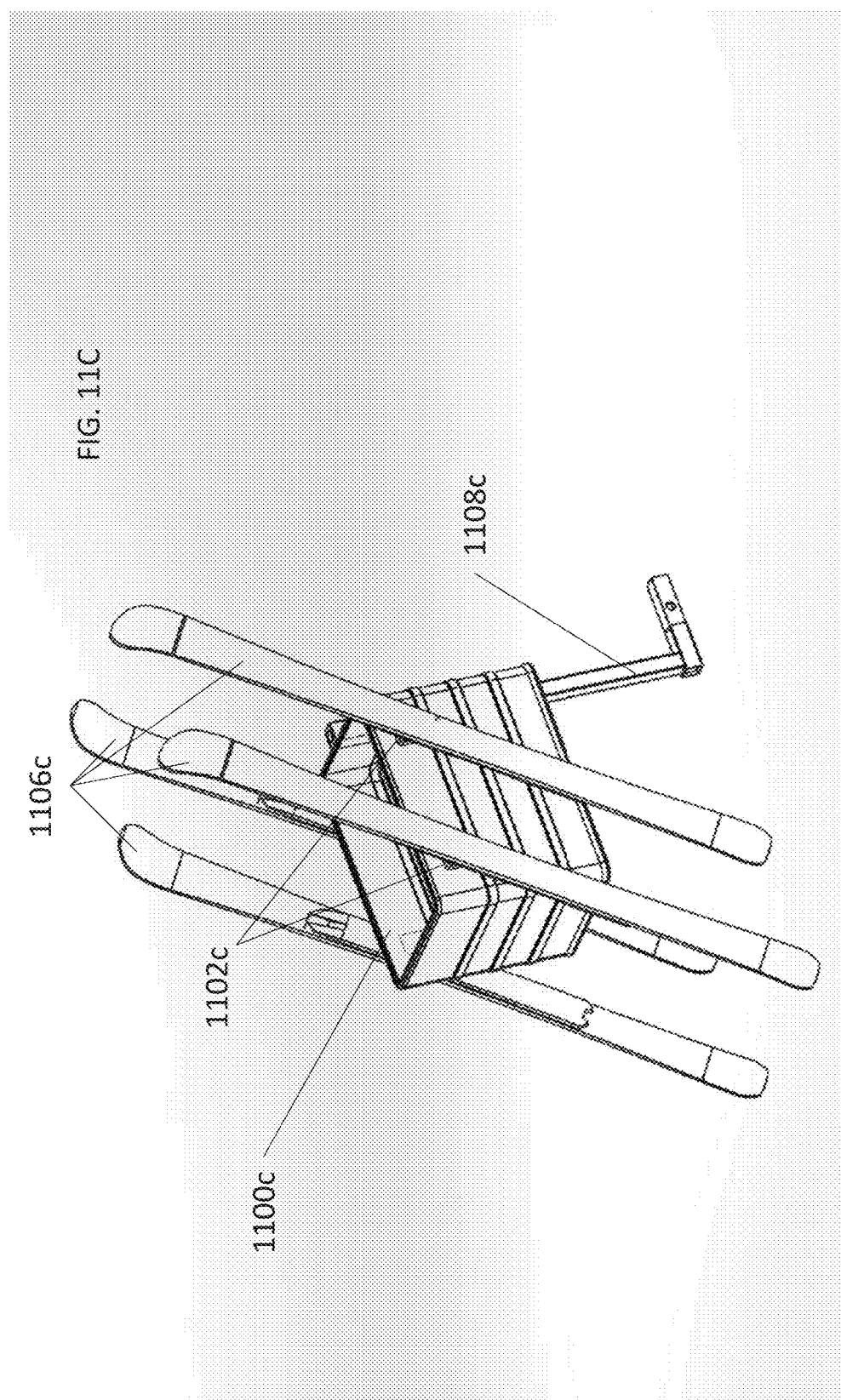

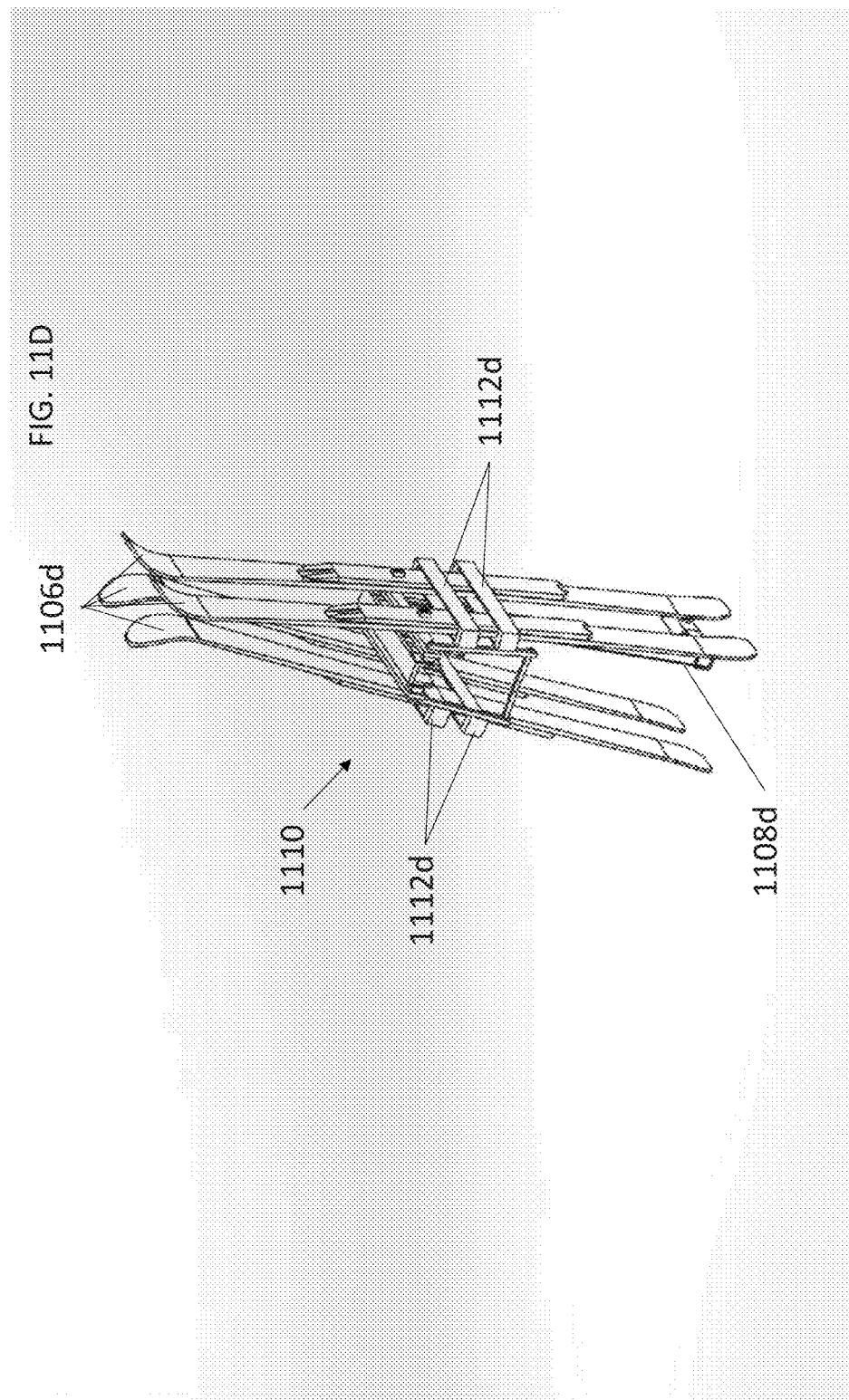

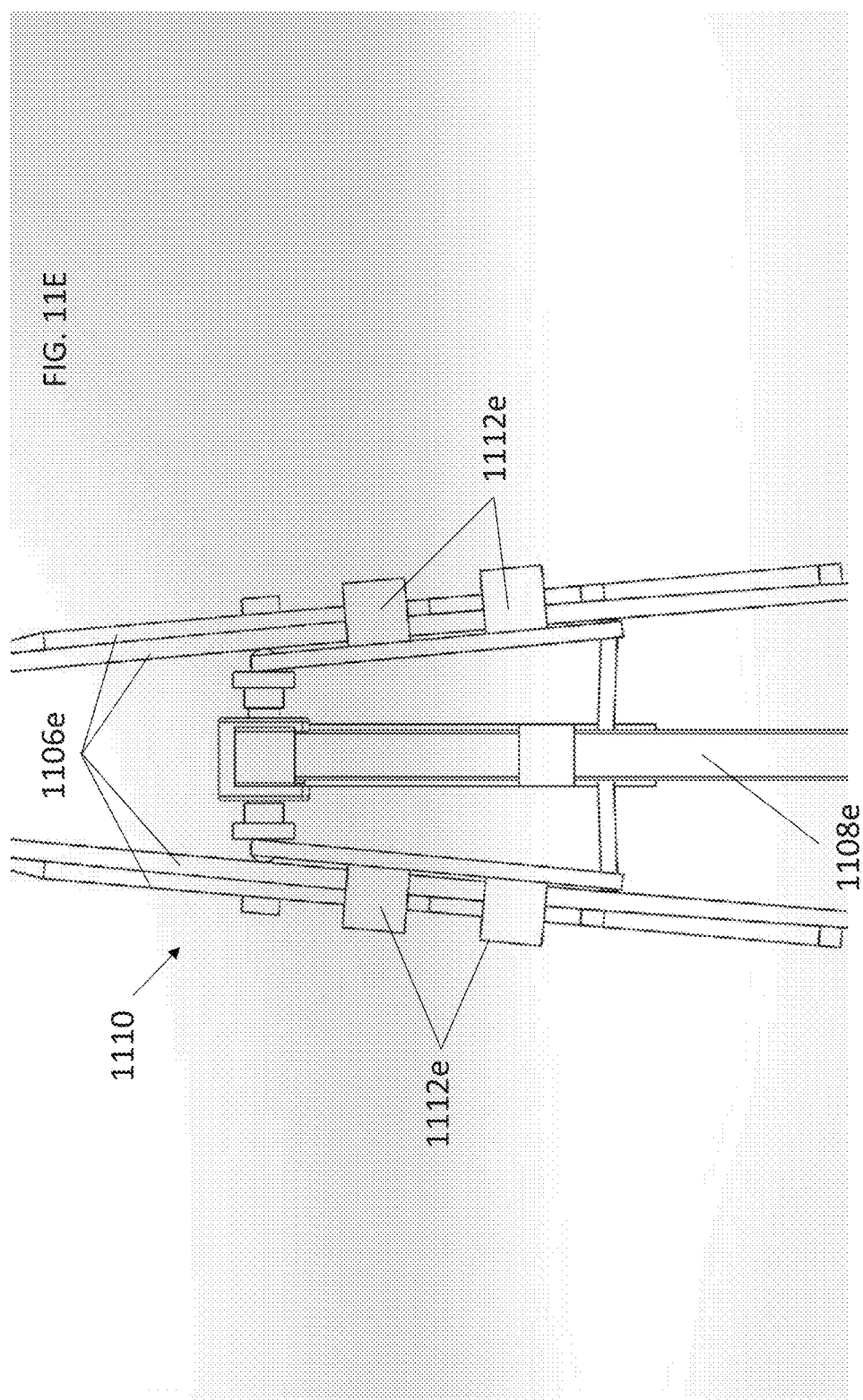

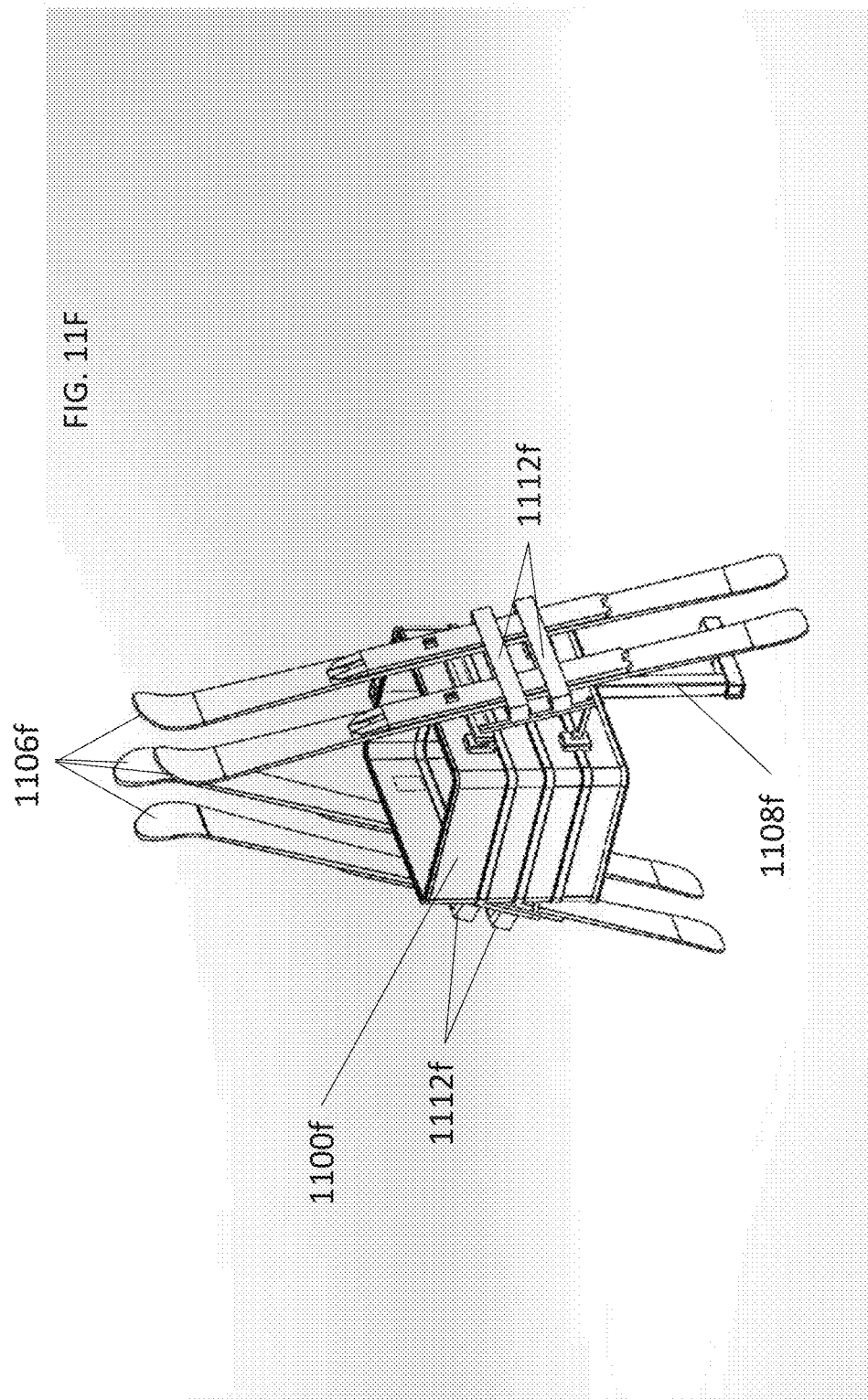

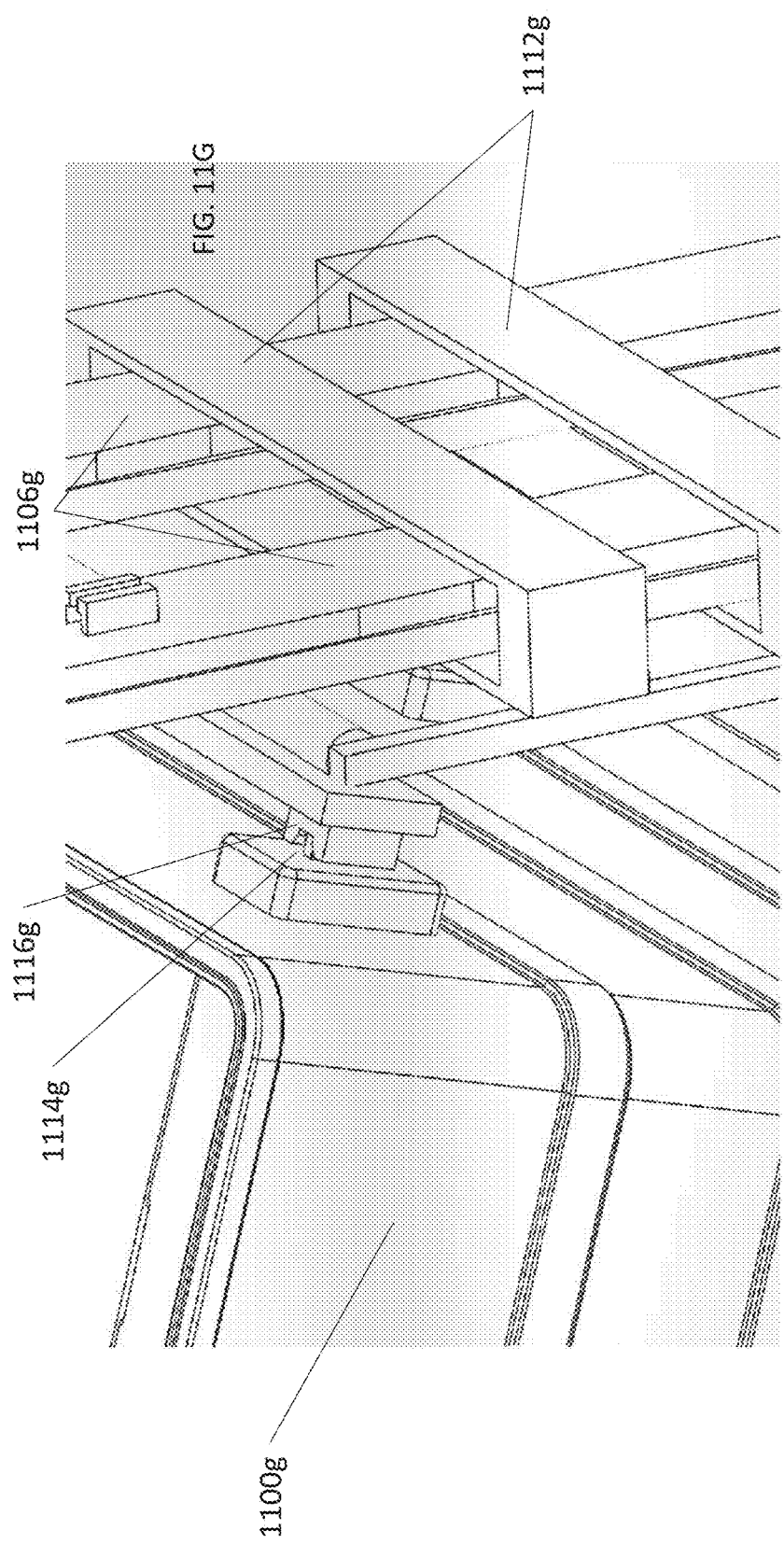

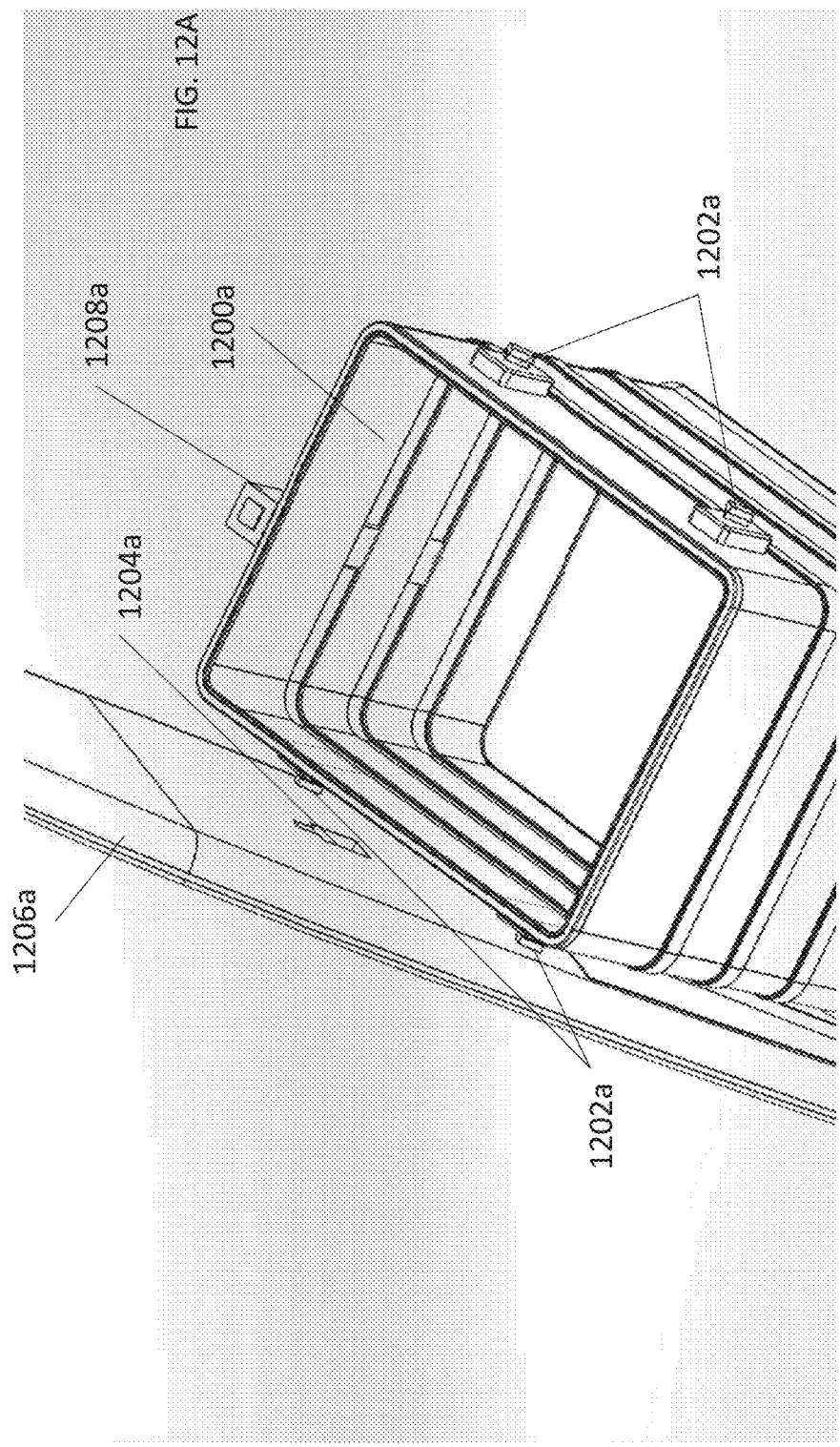

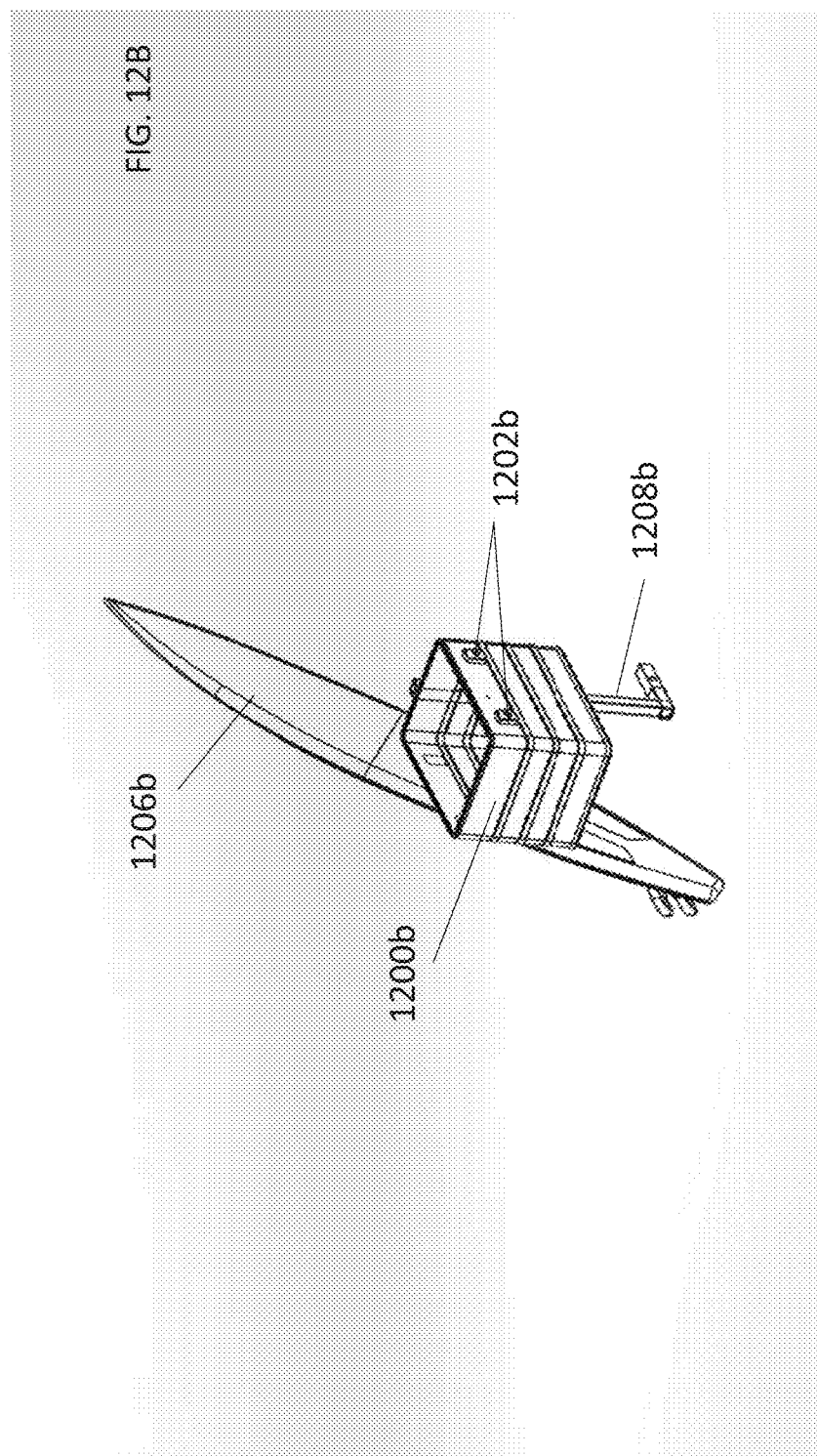

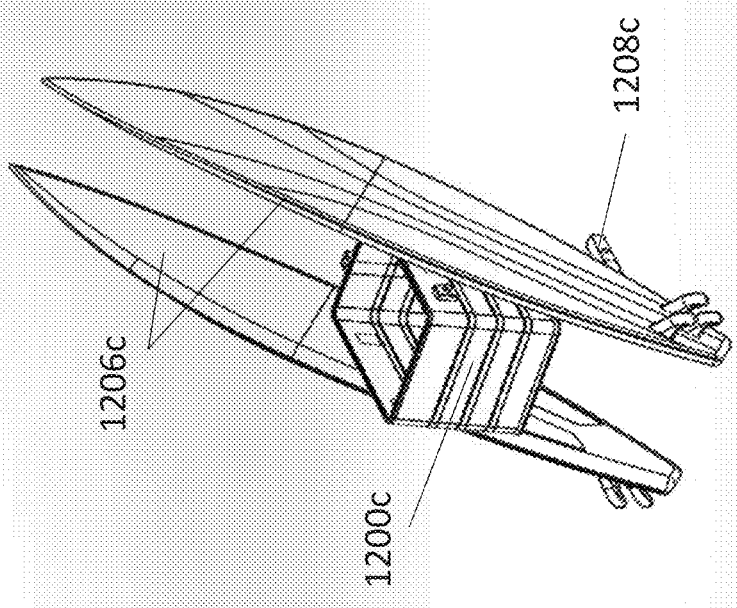

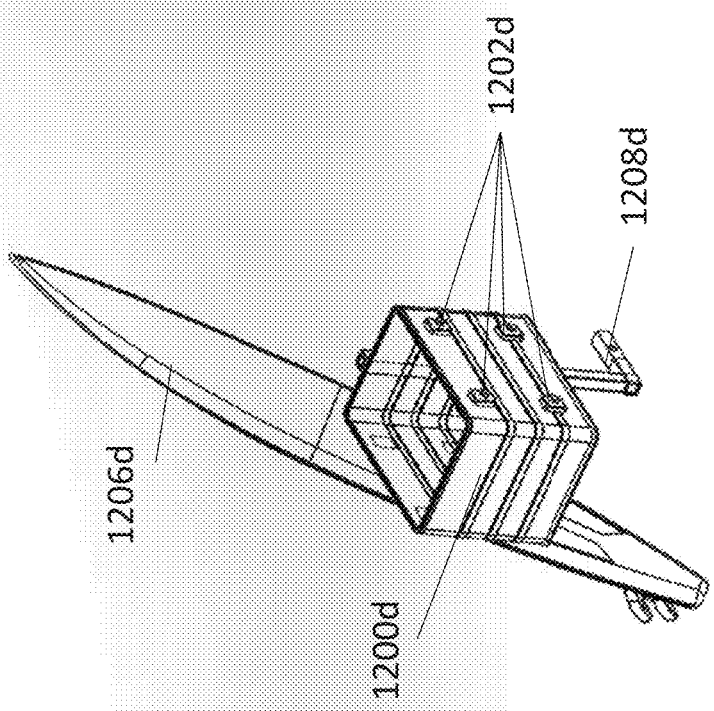

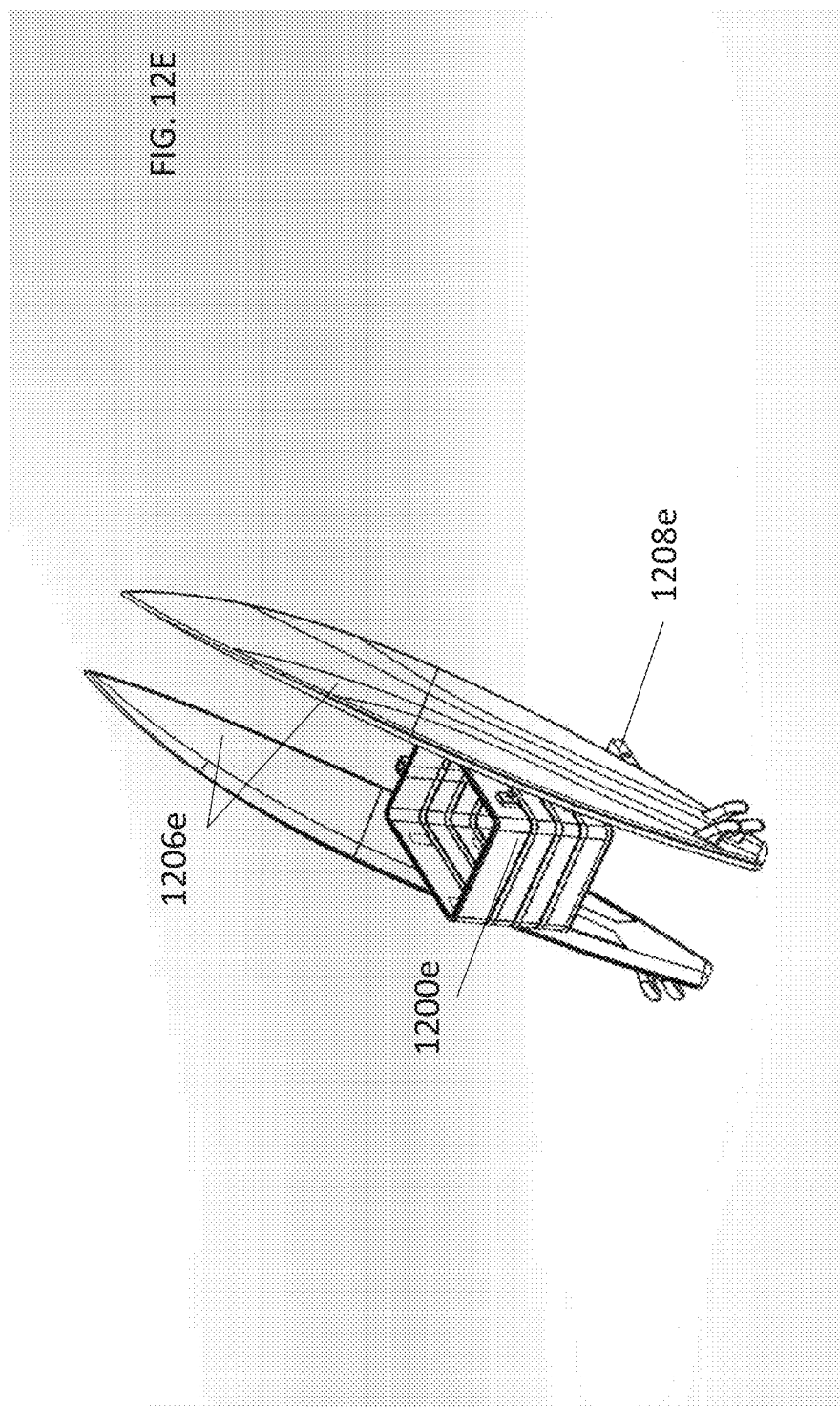

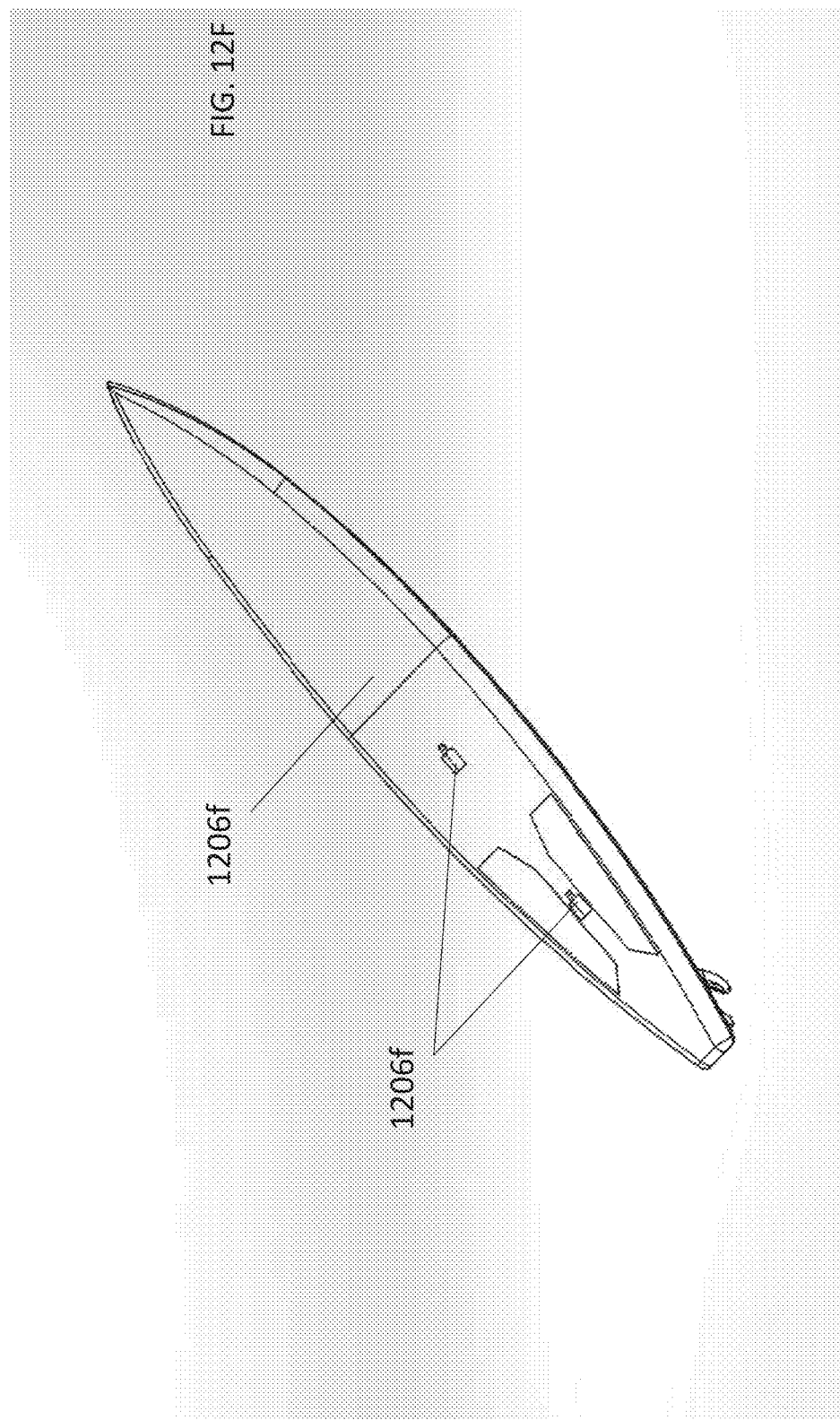

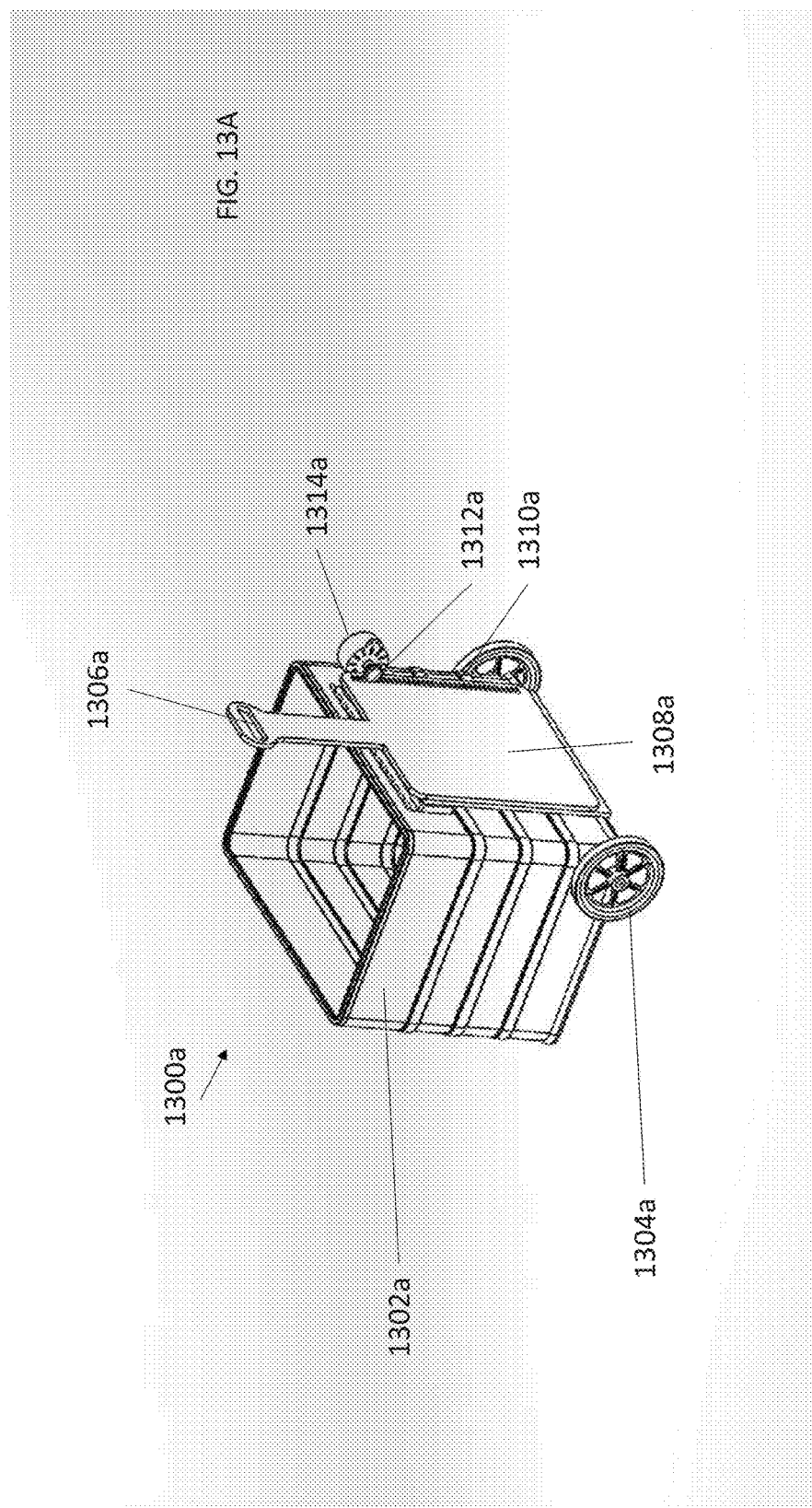

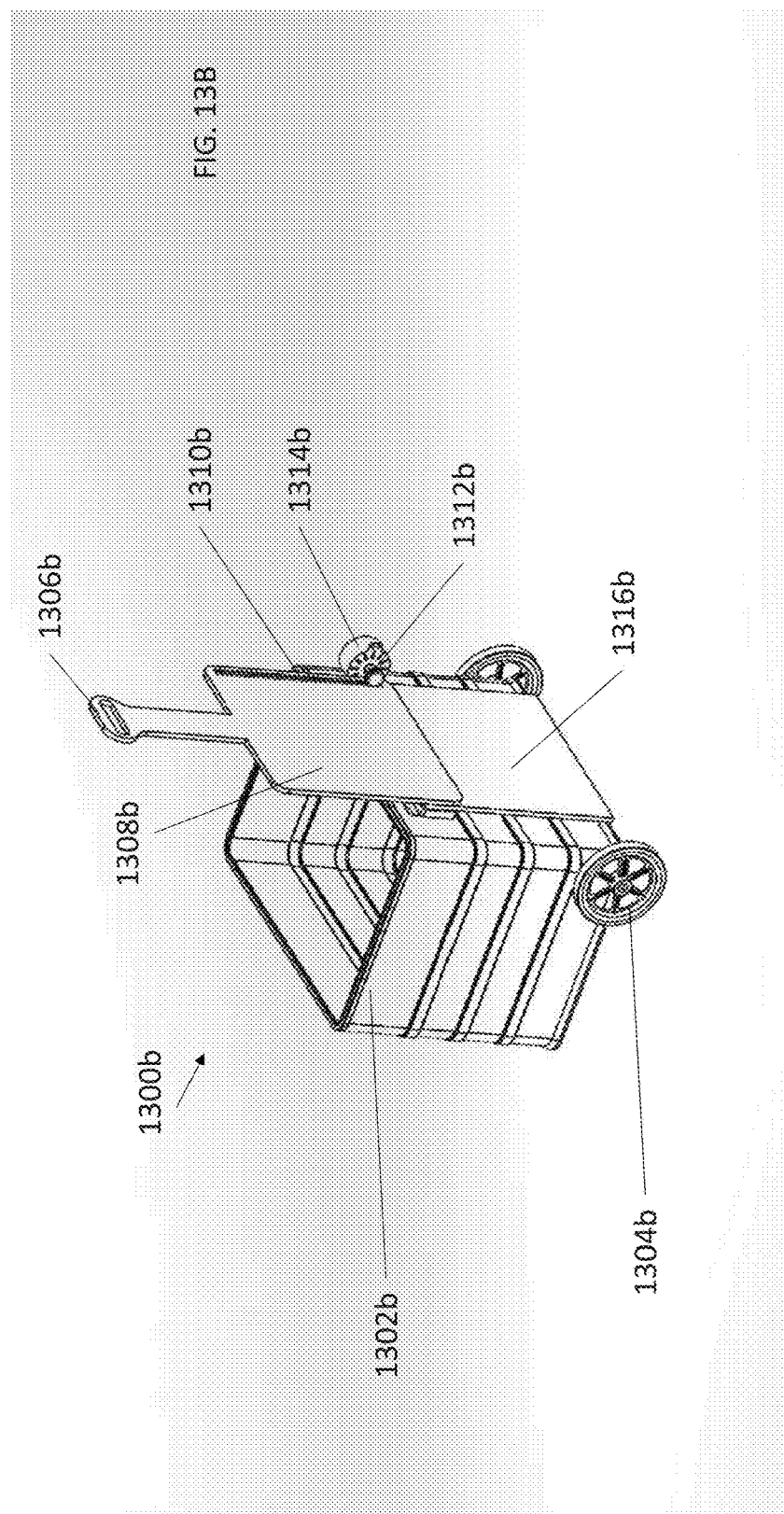

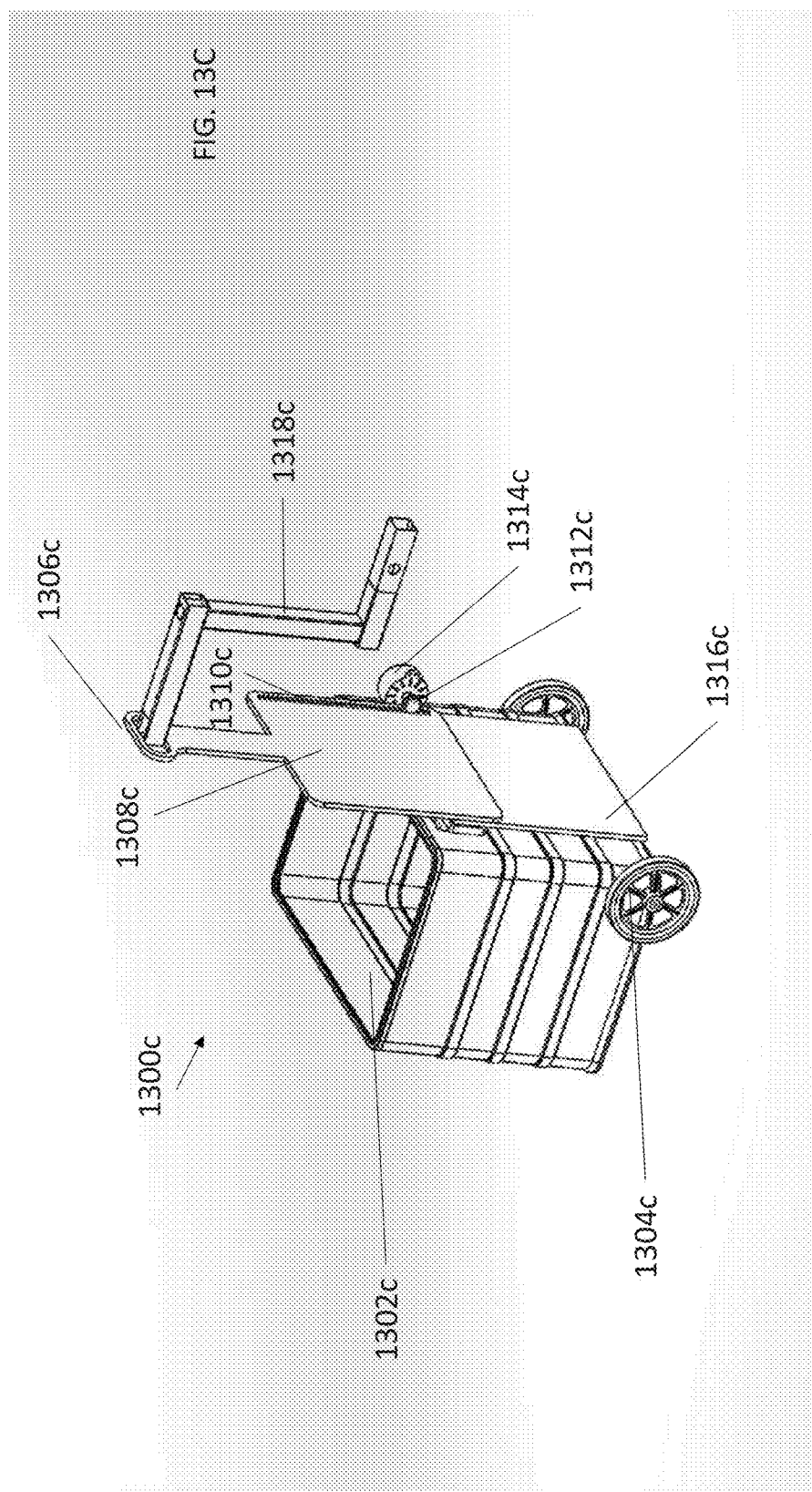

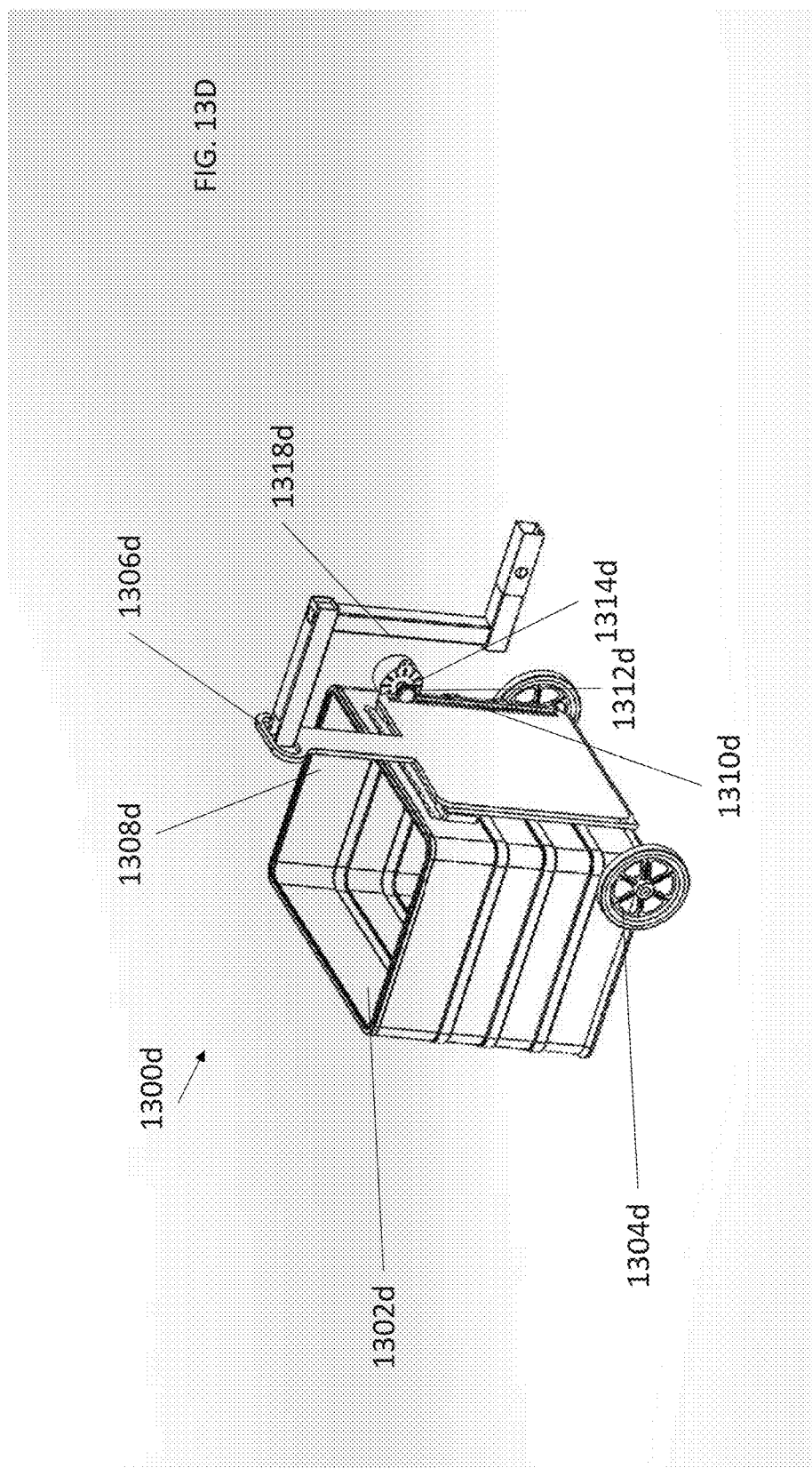

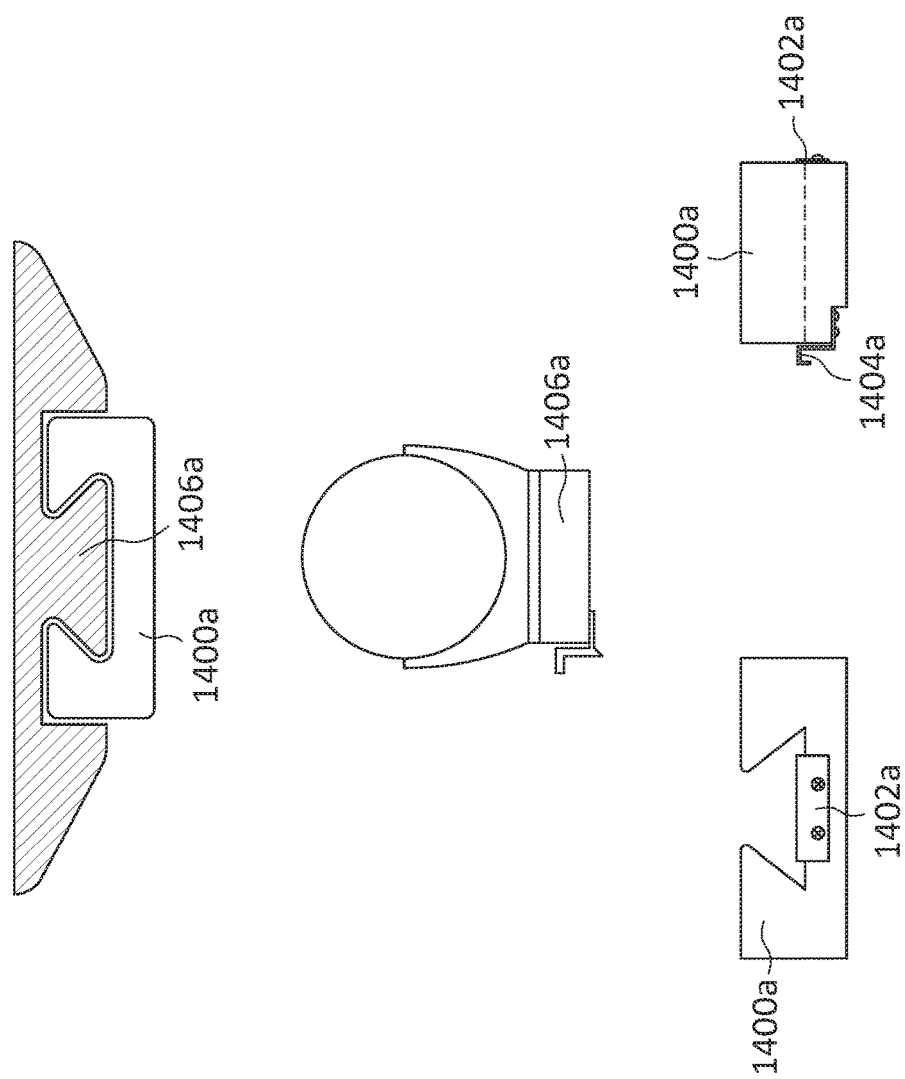

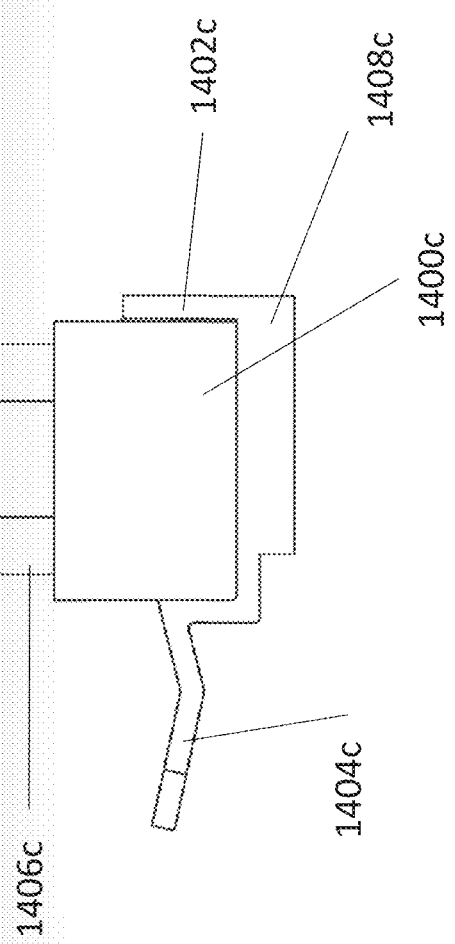

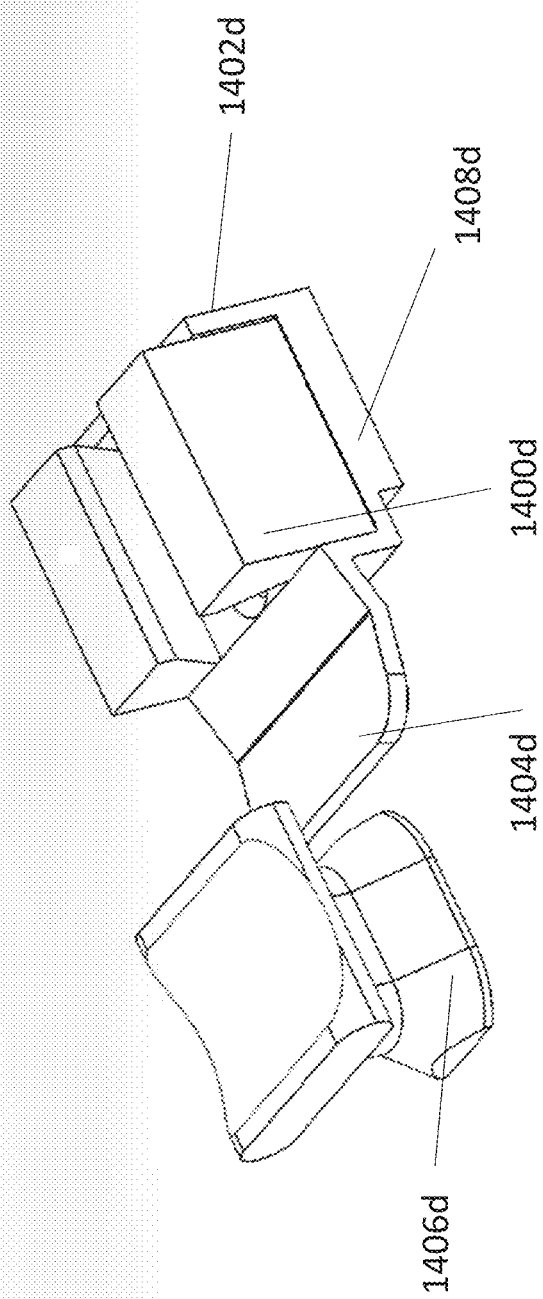

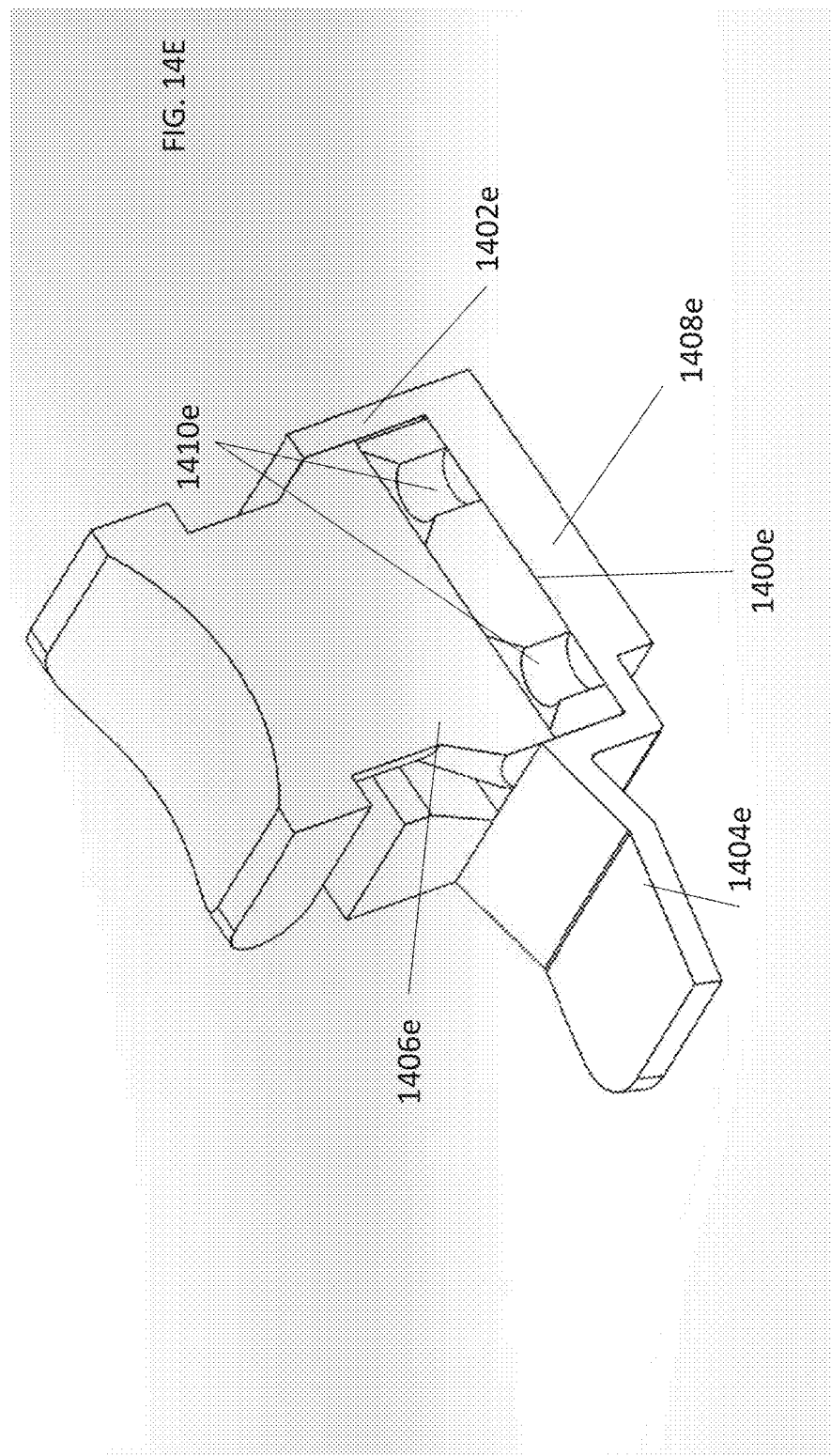

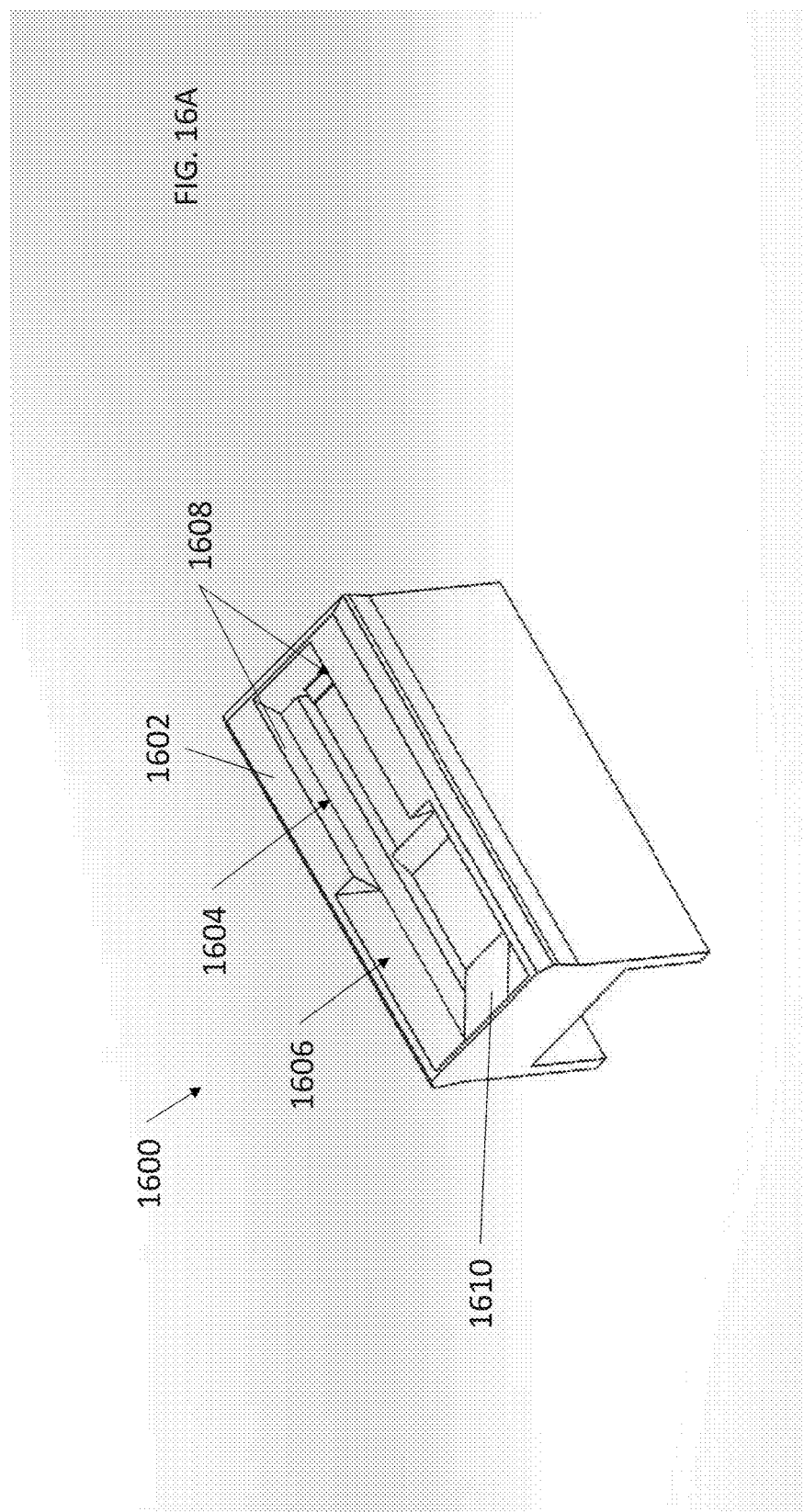

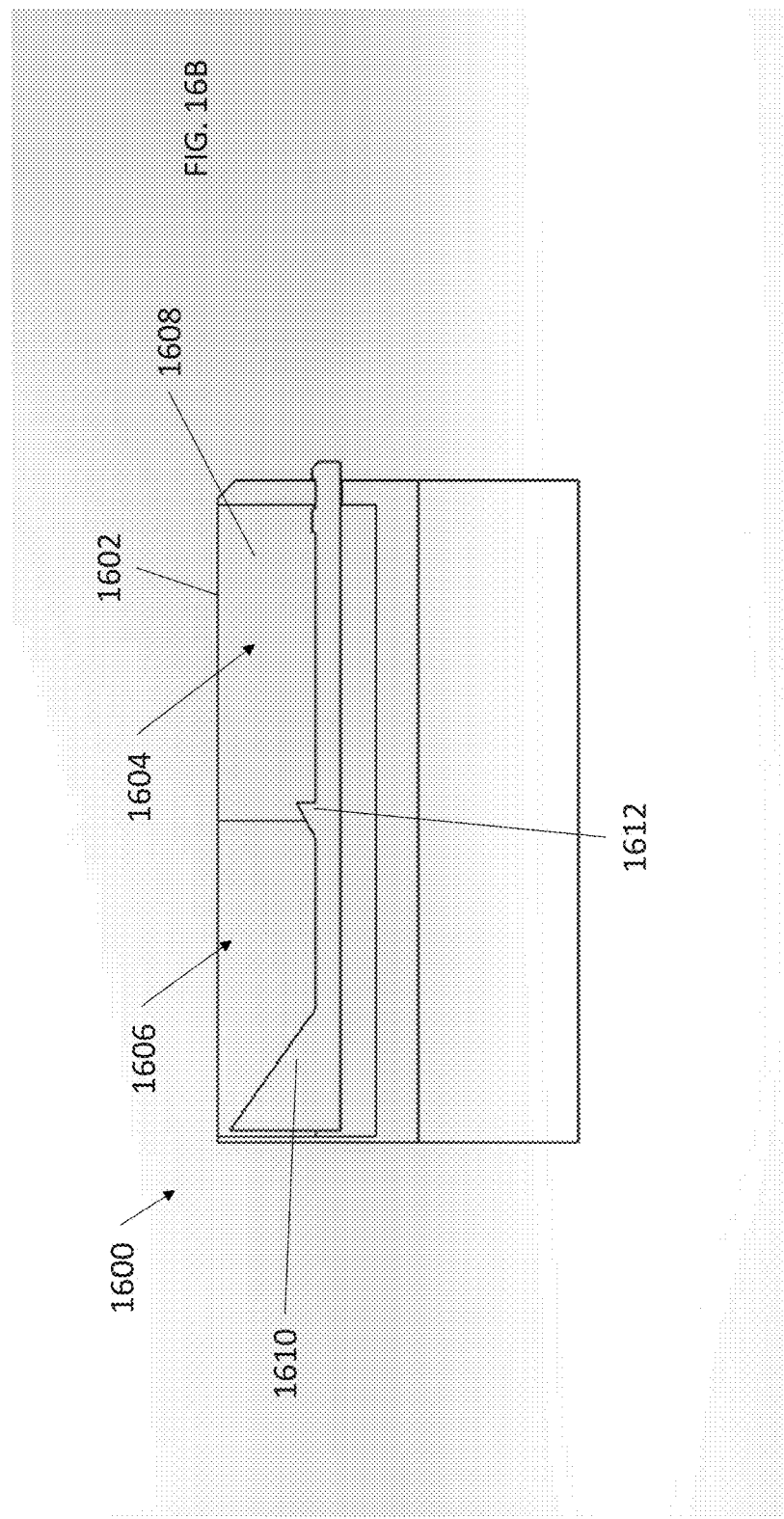

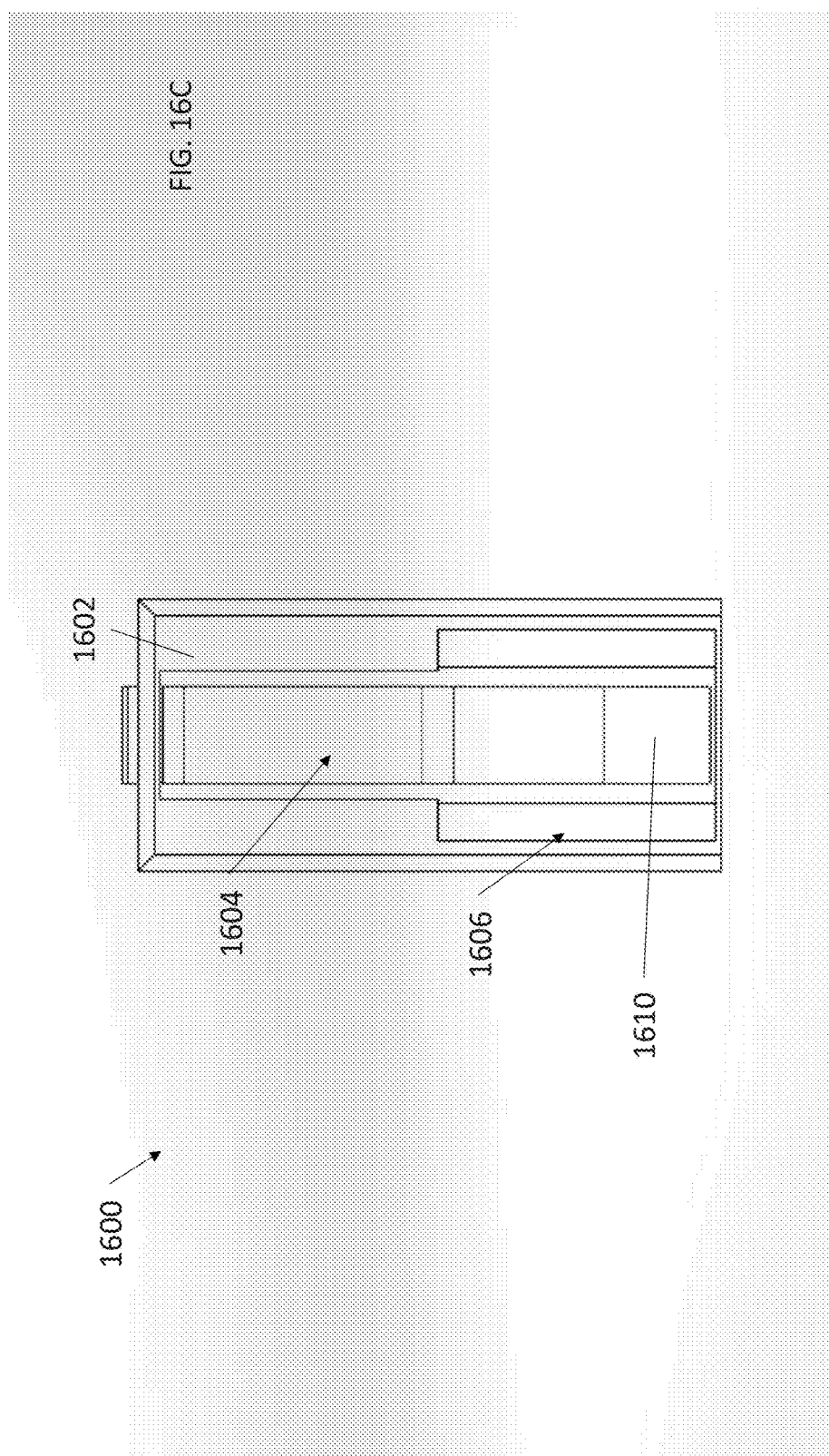

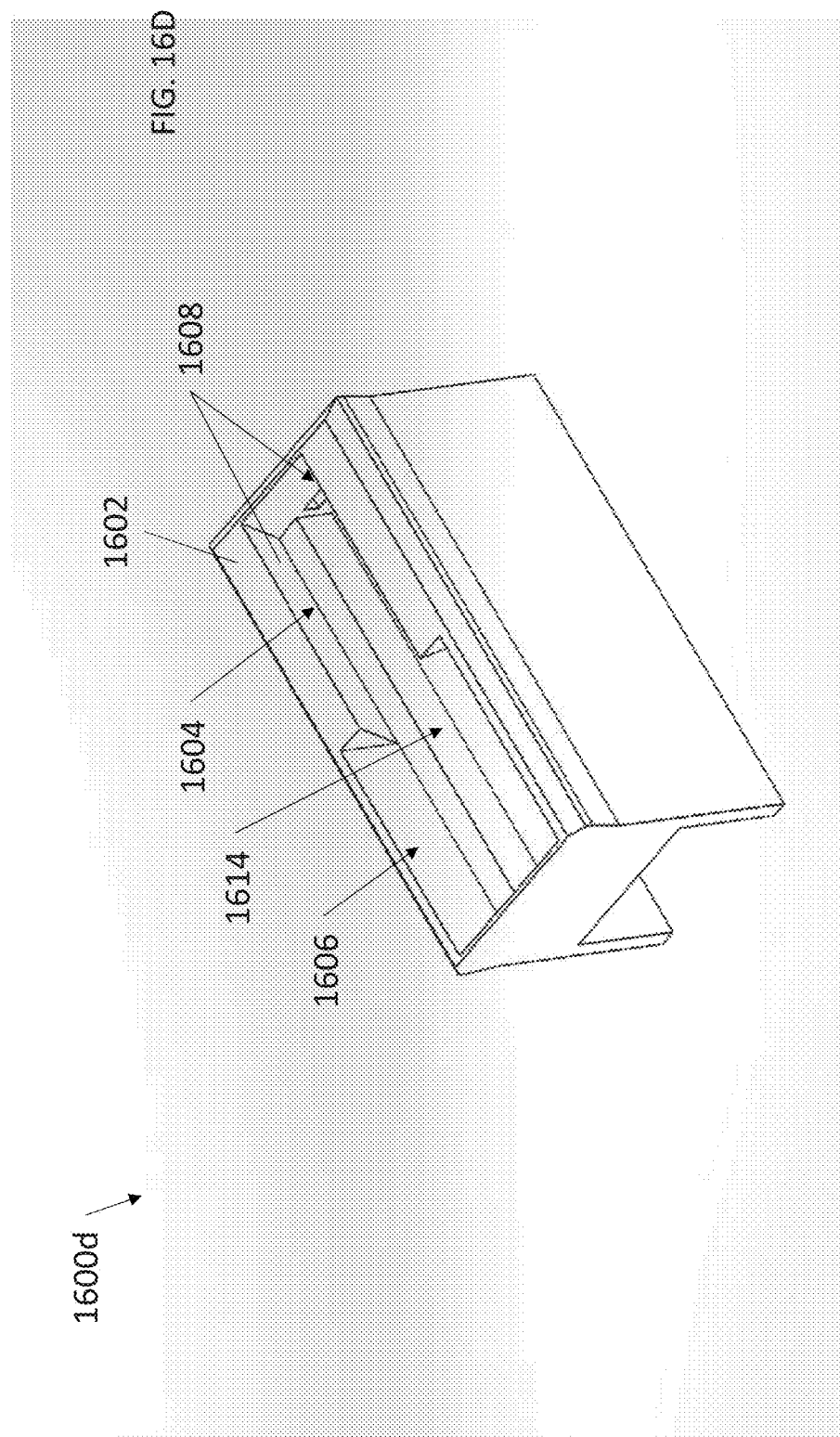

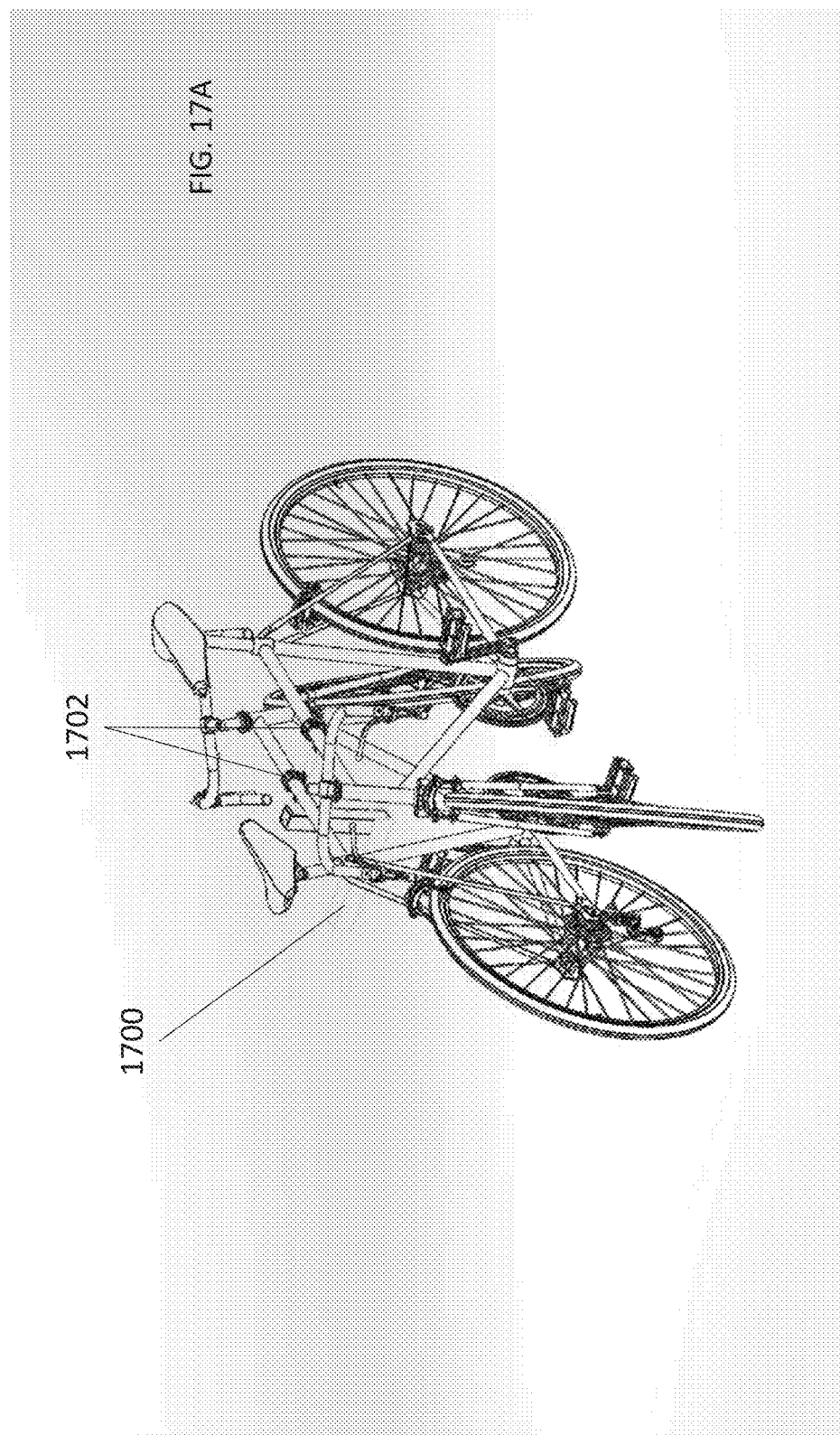

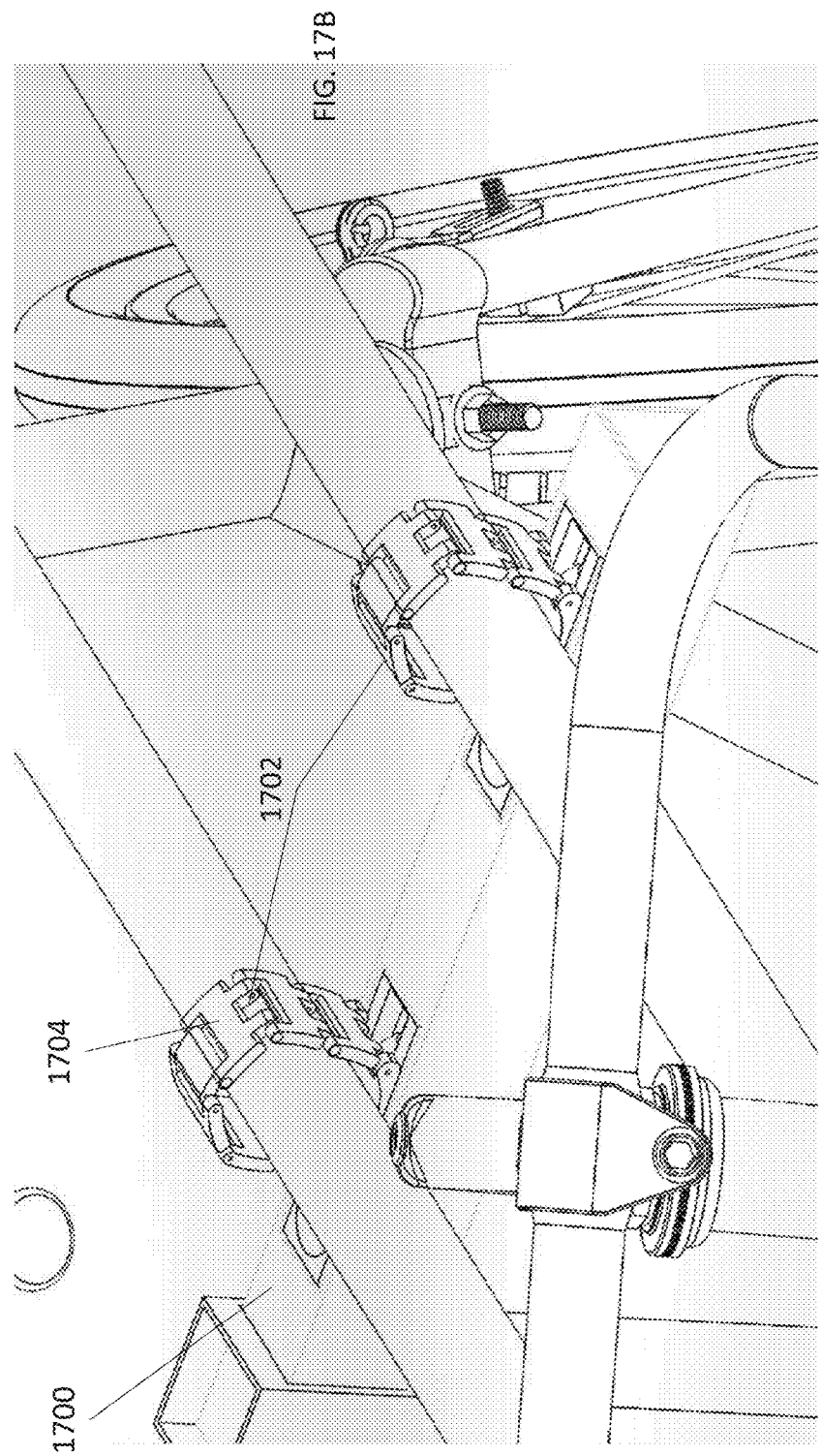

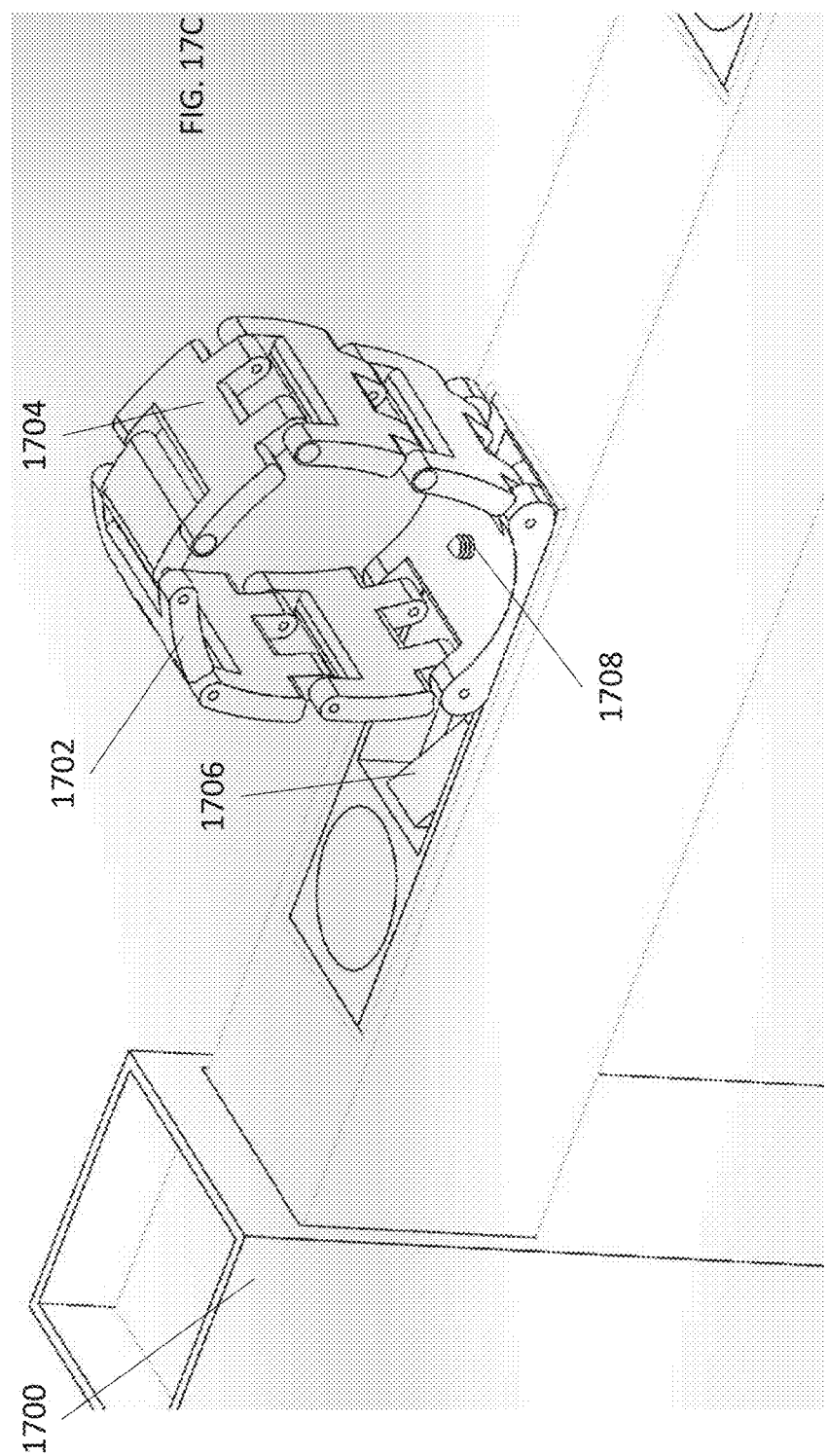

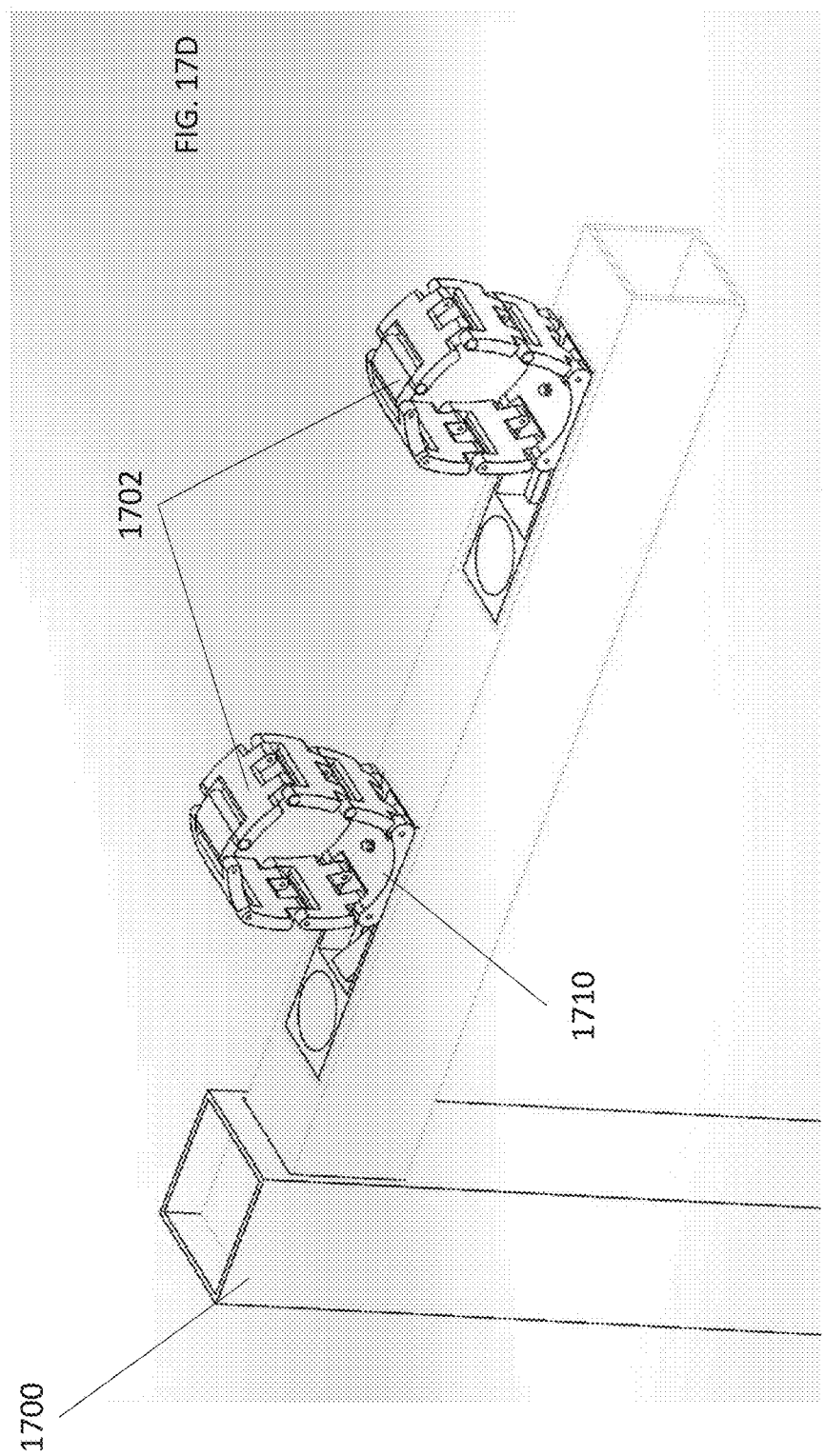

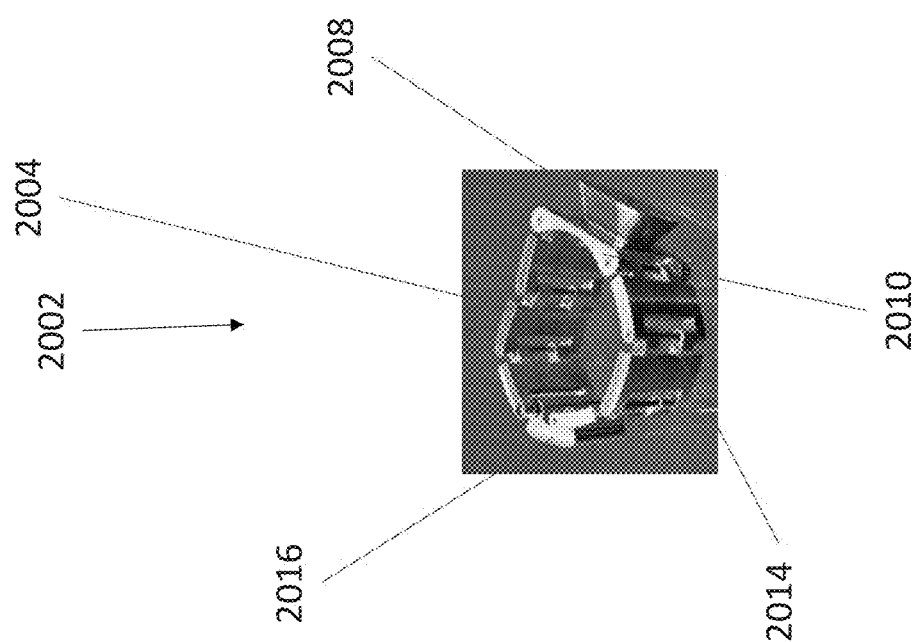

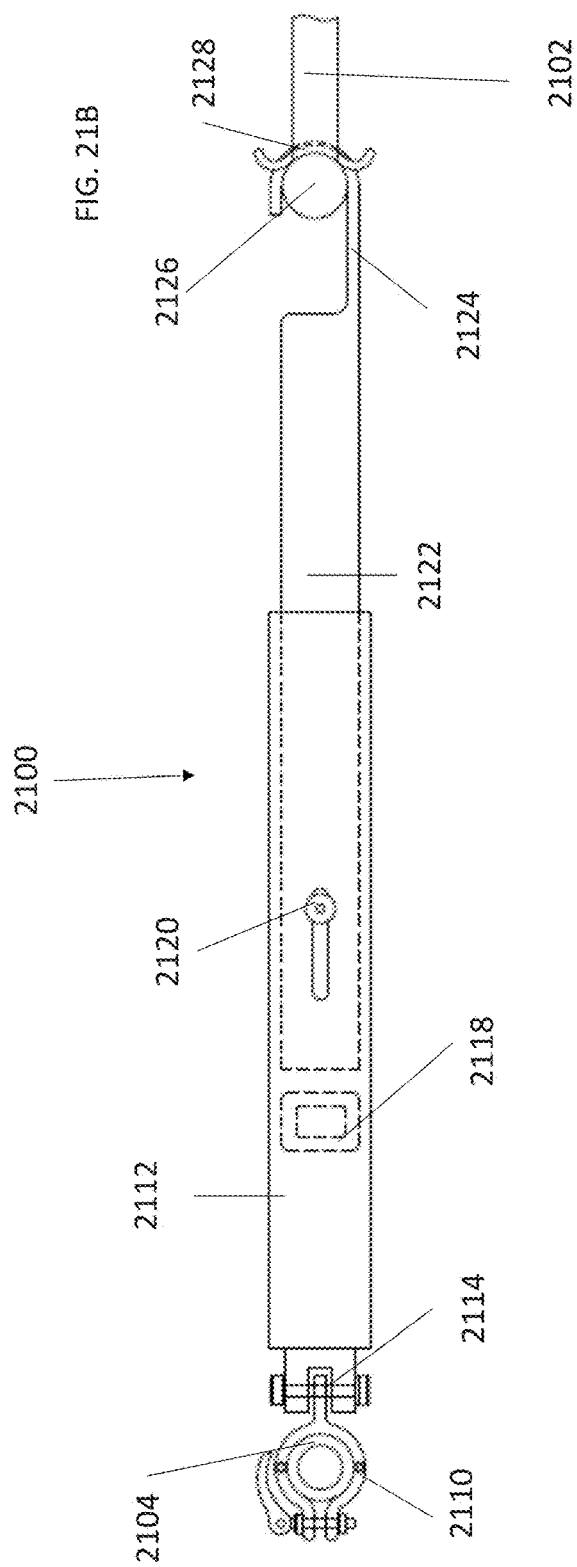

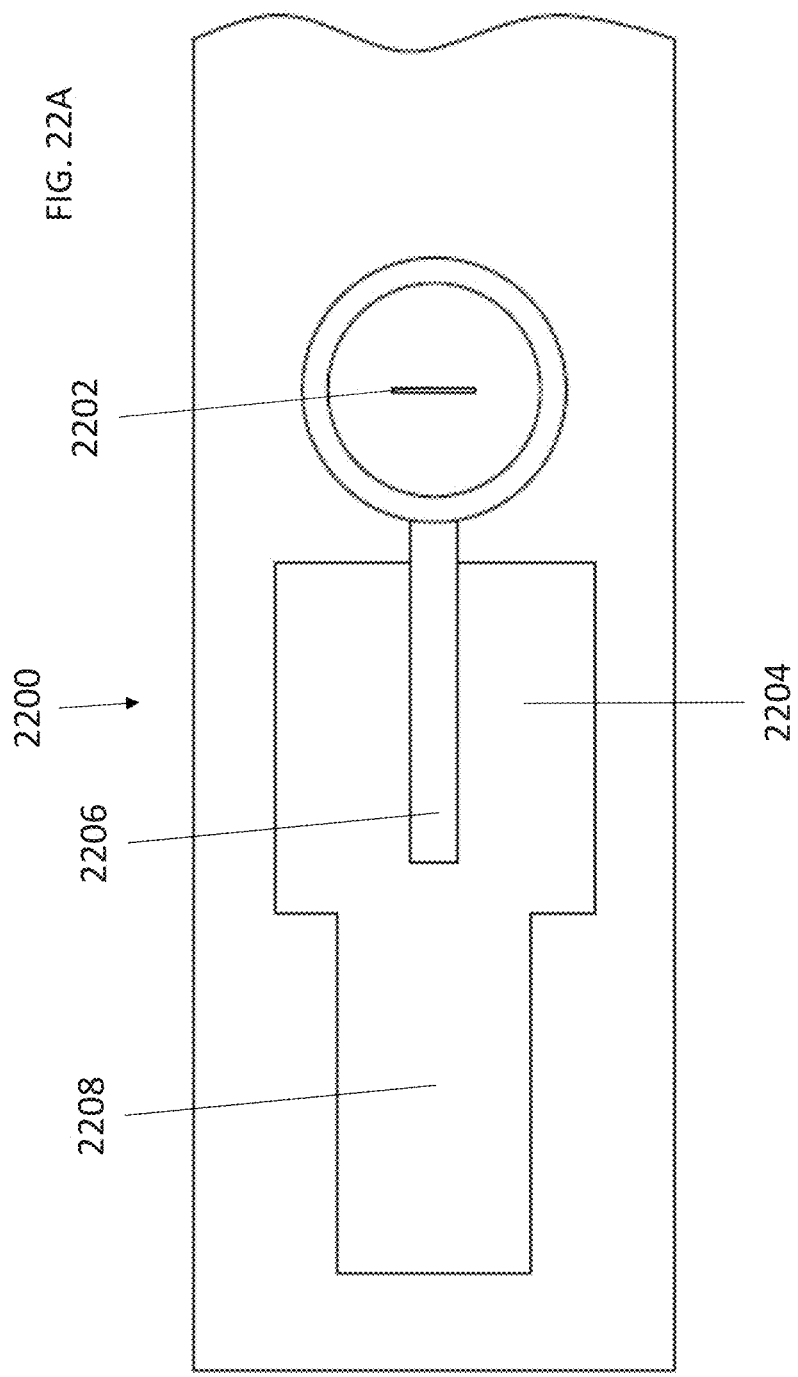

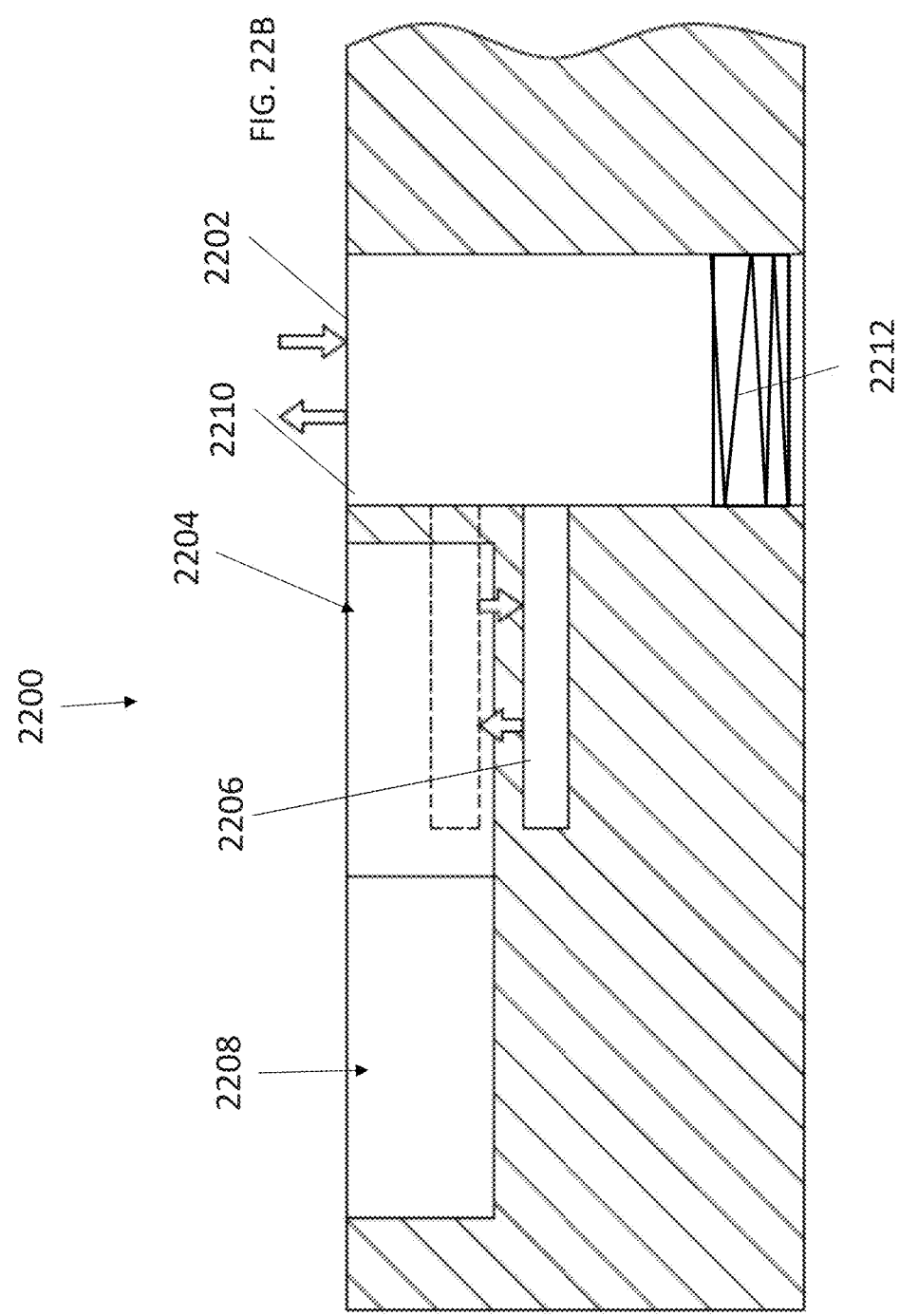

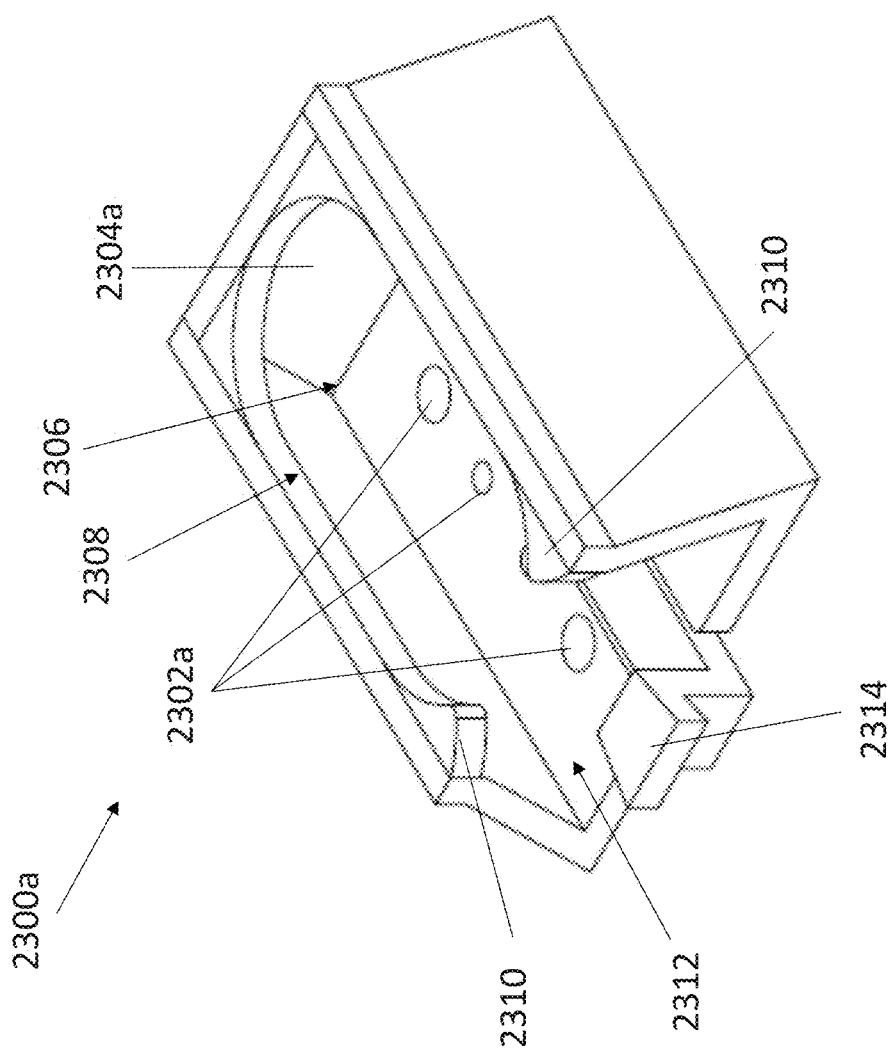

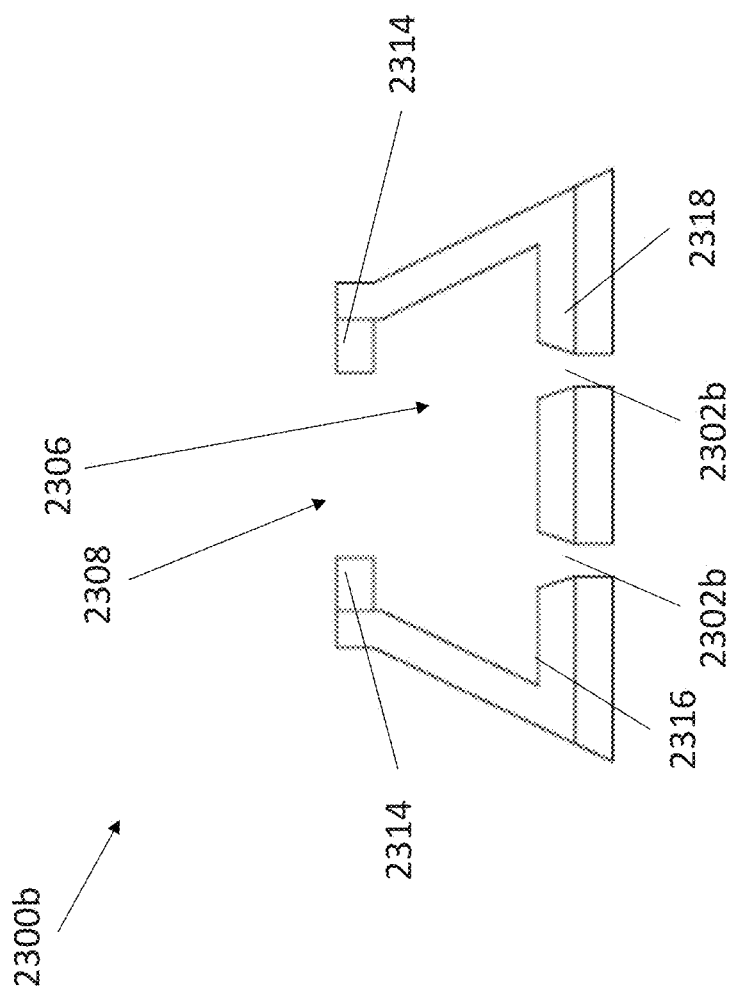

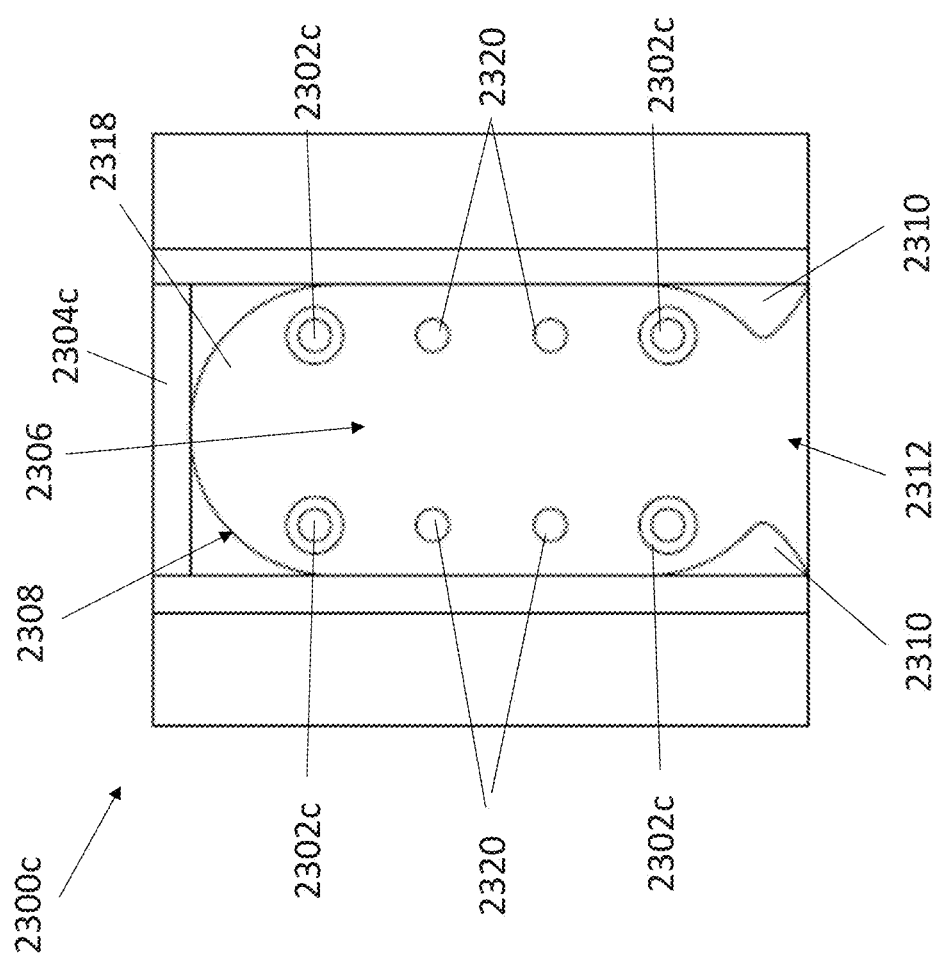

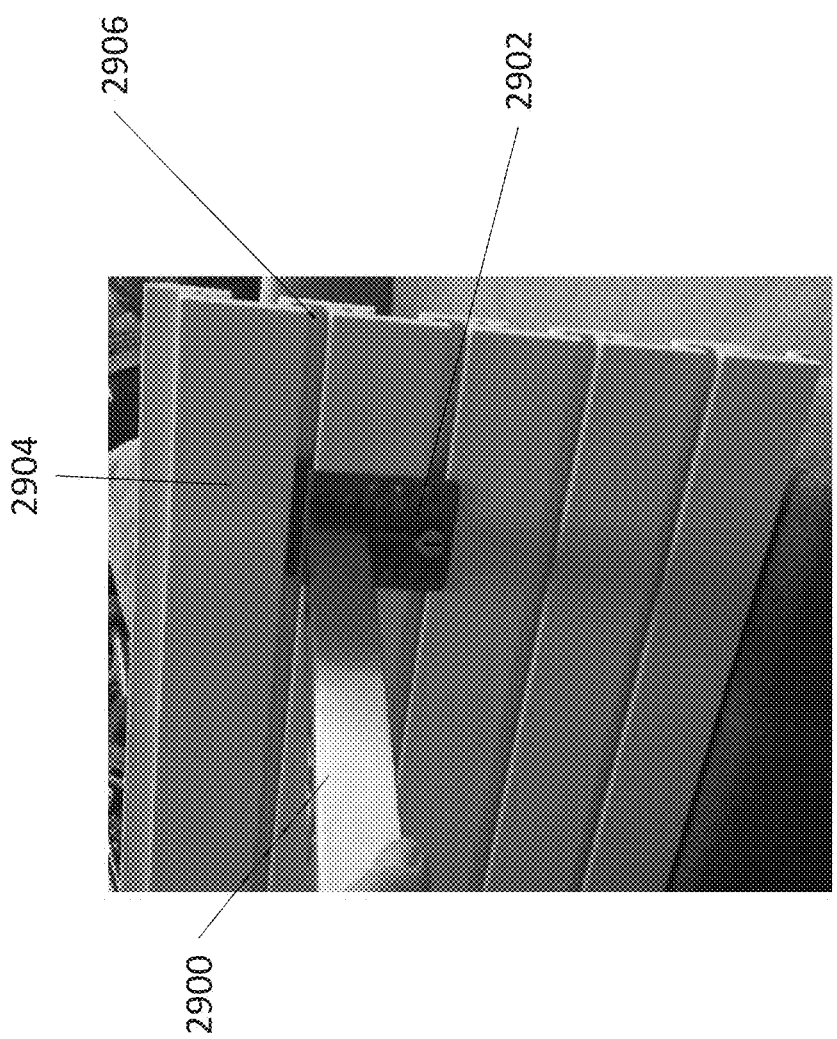

MODULAR MOTOR VEHICLE INTEGRATED CARRIER RACK AND STORAGE SYSTEM WITH UNIVERSAL CONNECTIONS

CROSS REFERENCE TO RELATED APPLICATIONS

The present application claims priority to U.S. Provisional Application No. 62/276,144 filed Jan. 7, 2016, U.S. Provisional Application No. 62/120,825 filed Feb. 25, 2015 and U.S. Provisional Application No. 62/163,638 filed. May 19, 2015 which are hereby incorporated by reference in their entirety. This application is related to U.S. Non-Provisional application Ser. No. 14/214,407 filed Mar. 14, 2014, U.S. Provisional Application No. 61/803,101 filed Mar. 18, 2013 and U.S. Provisional Application No. 61/801,951 filed Mar. 15, 2013 which are hereby incorporated by reference in their entirety. This application is also related to U.S. Pat. No. 6,752,302 by Anton et al., patented Jun. 22, 2004, which is hereby incorporated by reference in its entirety.

FIELD OF THE INVENTION

The subject matter described herein relates generally to lightweight, modular carrier rack and storage systems for motor vehicles, and more particularly to carrier rack systems that are integrated into a motor vehicle or can be attached to a tow hitch-carrier rack and storage systems that are designed through unique, universal connections to carry and store items such as bicycles, skis, snowboards, surfboards, wave boards, wheelchairs, scooters, luggage, fishing gear, accessories, and others.

BACKGROUND OF THE INVENTION

Present carrier rack systems for motor vehicles, such as cars, trucks, vans, minivans, sports utility vehicles (SUV's), and motor homes, generally involve a system of multiple straps attached onto the vehicle, a system attached to a universal tow hitch, a system attached to a roof, or a system attached to a bumper. These systems are cumbersome, heavy, and difficult to store at home or in the vehicle when the systems are not in use. Additionally, these systems may not be adaptable to all types of vehicles, and when some of these systems are attached, they often make it difficult to access the trunk or doors. These systems are susceptible to theft and may scratch and damage the vehicle when attached and used.

In the case of systems involving multiple straps, these systems are complicated to attach onto the vehicle and may loosen with use over time. In the case of systems attached to the roof, these systems create wind resistance when the car is moving and are difficult to access. For carrier systems that are attached to bumpers, these systems damage the sensitive bumper mechanism and have limited supportability. For trailer hitch systems, the systems are heavy and difficult to attach, detach, and store.

Additionally, organization and storage space is important for people from all walks of life. Improved organization and storage saves time when preparing for activities. It saves space in a home garage, basement, storage garage or shed, closet, office, home, room or any other place things are stored. It may also help prevent injuries that can occur from tripping, falling, dropping, knocking over unstable items, or other accidental or unintentional actions. Likewise, it may save money because when items fall they may be individually harmed in the form of dents, breaks, chips or other damage or may dent, break, chip, or damage items which they collide with such as motor vehicles.

Accordingly, this invention creates an interface between machine and cargo. It is a modular platform whose universal designs and connections allow simple and easy vehicular transport and storage of multiple types of recreational equipment and activity pods.

SUMMARY

The present invention is directed to carrier rack and storage systems for motor vehicles, and more particularly to carrier rack and storage systems that are integrated into motor vehicles at the time of vehicle manufacture or after production (retrofitting) and it can also attach to current tow hitches in some embodiments.

In accordance with one aspect of the present invention, a carrier rack system is integrated into a portion of a motor vehicle with a rear wall, such as a tailgate of a pickup truck, a trunk lid of a car, a rear license plate wall, or a rear door of a minivan or sports utility vehicle, having an inside and outside. The system generally includes a receiving unit, having rear and forward ends, integrated into the rear wall, an immobilizing system attached to the receiving unit, and/or a carrier bar attached to the receiving unit. The receiving unit may be positioned such that the rear end is directed toward the back of the vehicle and forms an engaging structure in the rear wall that can be aesthetically hidden from view with a cover or cap.

The carrier bar can generally be universal, meaning it can be attached to any vehicle with a receiving unit and can have any attachments placed on the carrier bar to carry a variety of items. The carrier bar is generally lightweight, easily stored in the vehicle when not in use, and easily attachable to the receiving unit when use is desired. When in use, the carrier bar will not damage the paint on the vehicle. Also, supportability is improved with the carrier because it can be positioned at an optimum level on the vehicle, providing ample distance from the ground when an item or storage pod is attached to the carrier bar and providing less stress to a person's back when the person is loading the item or storage pod onto the carrier bar. The invention is advantageous in that it provides a lightweight and easy to use carrier rack and storage system that can be integrated into motor or other vehicles. The invention is further advantageous in that it will not damage or scratch the vehicle. The invention is yet further advantageous in that it provides a simplistic storage system using universal carrier connections to easily attach and detach cargo for transport in which all items for a particular activity are kept together and may be easily taken along when going to an activity and stored when returning from the activity.

In accordance with another aspect of the invention, the receiving unit described above is integrated into a portion of a vehicle having a side wall, such as a side of a truck bed, a side door, a side of a trunk lid, or other side panel of a vehicle. Interior walls are also contemplated.

In accordance with another aspect of the invention, the receiving unit described above is integrated into a portion of a motor vehicle having a front end, such as a front end of a bus, motor home, van, truck, SUV, or minivan.

In accordance with another aspect of the invention a storage system is provided which allows a user to easily transport and store items associated with a particular activity in a convenient compartment or compartmentalized pod. This provides simplicity in storing commonly used items for one activity, ease of transport, and ease of storage in any location necessary including in the home, office, garage, basement, closet, on a wall, or in or on virtually any other location desired.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

U.S. Pat. No. 6,752,302 by Anton et al., patented Jun. 22, 2004 is hereby incorporated by reference in its entirety.

BRIEF DESCRIPTION OF THE DRAWING(S)

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 1B shows a center of gravity cradle supporting a bicycle frame in accordance with the present invention.

FIG. 1D shows a center of gravity attachment supporting a briefcase in accordance with the present invention.

FIG. 2B shows a cross sectional perspective view of a peg locking cradle in a perpendicular orientation to a carrier bar in accordance with the present invention.

FIG. 2H shows a side view of an open peg locking cradle with supported bar and with a securing screw mechanism and open side hinge in accordance with the present invention.

FIG. 2I shows a side view of an open peg locking cradle with a securing screw mechanism and open side hinge in accordance with the present invention.

FIG. 4B shows a support bar with two center of gravity cradle attachments in accordance with the present invention.

FIG. 4C shows a support bar with a center of gravity cradle attachment and a center of gravity bicycle attachment in accordance with the present invention.

FIG. 4D shows a perspective view of a peg locking cradle with a securing screw mechanism and closed side hinge in accordance with the present invention.

FIG. 4E shows a side view of a cradle device in accordance with the present invention.

FIG. 4F shows a male center of gravity device attached to a bicycle bar in accordance with the present invention.

FIG. 4G shows a male center of gravity device attached to a bicycle bar in accordance with the present invention.

FIG. 4H shows a male center of gravity device attached to a bicycle bar in position to slide into a female device attached to a support bar in accordance with the present invention.

FIG. 4I shows a male center of gravity device engaged with a female device attached to a support bar in accordance with the present invention.

FIG. 5A shows an example embodiment of a carrier bar with cargo carrying box in accordance with the present invention.

FIG. 5B shows an example embodiment of a carrier bar with cargo carrying box unattached in accordance with the present invention.

FIG. 5C shows an example embodiment of a carrier bar with cargo carrying box attached in accordance with the present invention.

FIG. 5D shows an example embodiment of a carrier bar with cargo carrying box unattached and additional securing collar in accordance with the present invention.

FIG. 5E shows an example embodiment of a carrier bar with cargo carrying box attached and additional securing collar in accordance with the present invention.

FIG. 5F shows an example embodiment of a cargo carrying box in accordance with the present invention.

FIG. 5G shows an example embodiment of a cargo carrying box in accordance with the present invention.

FIG. 6A shows an example embodiment of a push button spring mechanism in accordance with the present invention.

FIG. 6B shows an example embodiment of a main carrier bar with two carrier units with an attached second carrier bar that has an additional two carrier units in accordance with the present invention.

FIG. 7A shows an example embodiment of a locking attachment mechanism in accordance with the present invention.

FIG. 7B shows an example embodiment of two locking attachment mechanisms and an attached center of gravity joining piece in accordance with the present invention.

FIG. 7C shows an example embodiment of two locking attachment mechanisms and a removed attached center of gravity joining piece in accordance with the present invention.

FIG. 8A shows a side view of a center of gravity joining piece with attached center of gravity attachment and release clasp in locked position in accordance with the present invention.

FIG. 8B shows a side view of a center of gravity joining piece with attached center of gravity attachment and release clasp in unlocked position in accordance with the present invention.

FIG. 8F shows a perspective view of a center of gravity joining piece with attached center of gravity attachment and release clasp in locked position in accordance with the present invention.

FIG. 8G shows a perspective view of a center of gravity joining piece with attached center of gravity attachment and release clasp in unlocked position in accordance with the present invention.

FIG. 9 shows a perspective view of a transitional carrier bar with female device supports for engaging male center of gravity devices in accordance with the present invention.

FIG. 10A shows a view of a plunger stop in accordance with the present invention.

FIG. 10B shows a side view of a plunger stop in accordance with the present invention.

FIG. 10C shows an example embodiment of locking mechanism.

FIG. 11A shows an example embodiment of a cargo carrier with ski mounting.

FIG. 11B shows an example embodiment of a cargo carrier with ski mounting.

FIG. 11C shows an example embodiment of a perspective view of a cargo carrier with ski mounting.

FIG. 11D shows an example embodiment of a side view of a ski mounting carrier.

FIG. 11E shows an example embodiment of a ski mounting carrier.

FIG. 11F shows an example embodiment of a ski mounting carrier.

FIG. 11G shows an example embodiment of a ski mounting carrier connection.

FIG. 12A shows an example embodiment of a surf mounting carrier cargo carrier.

FIG. 12B shows an example embodiment of a surf mounting carrier cargo carrier with two mounting pegs per side.

FIG. 12C shows an example embodiment of a surf mounting carrier cargo carrier.

FIG. 12D shows an example embodiment of a surf mounting carrier cargo carrier with four mounting pegs per side.

FIG. 12E shows an example embodiment of a surf mounting carrier cargo carrier.

FIG. 12F shows an example embodiment of a surfboard with mounting carrier slots.

FIG. 13A shows an example embodiment of a wheeled carrier box which can couple with a carrier bar.

FIG. 13B shows an example embodiment of a wheeled carrier box which can couple with a carrier bar.

FIG. 13C shows an example embodiment of a wheeled carrier box and a coupled carrier bar.

FIG. 13D shows an example embodiment of a wheeled carrier box and a coupled carrier bar.

FIG. 14A shows an example embodiment of a securing mechanism.

FIG. 14C shows an example embodiment of a side view of a securing mechanism.

FIG. 14D shows an example embodiment of a perspective view of a securing mechanism with detached male and female portions.

FIG. 14E shows an example embodiment of a perspective view of a securing mechanism cross-section.

FIG. 16A shows an example embodiment of a perspective view of a female receiver for installation in a flat surface which has an open area in which the male linking trapezoidal unit is inserted, pushes down a spring loaded locking slat and is then pushed into the corresponding female receiving unit and locks into place.

FIG. 16B shows an example embodiment of a side cutaway view of a female receiver for installation in a flat surface.

FIG. 16C shows an example embodiment of top-down view of a female receiver for installation in a flat surface.

FIG. 16D shows an example embodiment of a perspective view of a female receiver for installation in a flat surface.

FIG. 17A shows an example embodiment of a two bicycle carrier system with link securing mechanisms.

FIG. 17B shows an example embodiment of a two bicycle carrier system with link securing mechanisms.

FIG. 17C shows an example embodiment of a link securing mechanism attached to a carrier bar.

FIG. 17D shows an example embodiment of two link securing mechanisms attached to a carrier bar.

FIG. 20E shows an example embodiment of a link securing mechanism with a male piece.

FIG. 21B shows an example embodiment of a top view of a removable, adjustable horizontal support adaptor bar.

FIG. 22A shows an example embodiment of a top view of a female receiver with a lock.

FIG. 22B shows an example embodiment of a side view of a female receiver with a lock.

FIG. 23A shows an example embodiment of a perspective view of a female receiver clip.

FIG. 23B shows an example embodiment of a cross sectional view of a female receiver clip.

FIG. 23C shows an example embodiment of a top view of a female receiver clip.

FIG. 29 shows an example embodiment of a storage bar with a wall mounting for coupling with a slatted wall.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Figure 1A:
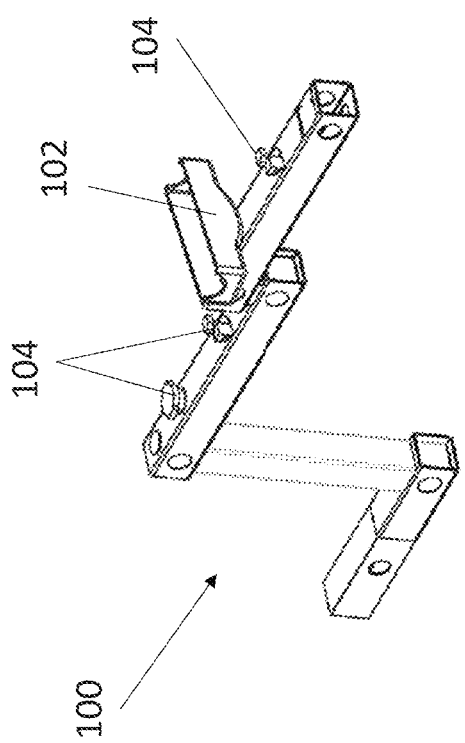
FIG. 1A shows a transitional carrier bar device with a twist-and-lock attachment in accordance with the present invention.

FIG. 1A shows an example embodiment of a transitional carrier bar device 100 with a twist-and-lock or rotate-and-secure attachment 102 in accordance with the present invention. In the example embodiment multiple pegs 104 are shown which cradle devices 102 can slip over in a slot in the lower surface of the cradle. Typically, a cradle 102 can be slid in a first direction and then rotated about a central axis of a peg 104 and secured into place using a securing clip which is manufactured as part of or added to the carrier bar 100. Upon disengagement from the securing clip the cradle 102 can be rotated and removed from the peg mechanism 104. Peg mechanisms 104 can be any of a number of sizes and shapes and often have a wider upper section and a narrower lower section which is attached to or manufactured as part of a carrier bar 100.

FIG. 1B shows an example embodiment of a center of gravity cradle 106a supporting a bicycle frame 108 in accordance with the present invention. In the example embodiment the cradle 106a is attached to a carrier bar 110 using a slide-and-secure attachment. A male piece 112 on the carrier bar has a trapezoidal cross-sectional profile when viewed from the side and a corresponding female cutout 114 is provided as part of a securing structure on the bottom of the cradle 106a. Based on the profile of the interlocking pieces there is a reduced chance of swaying or other rotational movement of the cradle 106a around the carrier bar 110 and thus, the bicycle frame 108 it is carrying also has a reduced chance of swaying or other rotational movement around the carrier bar 110.

The cradles 106a-b shown in the figure have screwing securing mechanisms 116 provided at their top which can push an upper engagement piece 118 down when a user rotates the screw in the appropriate direction to engage the threads to move the screw downward with relation to the cradle 106a-b. When the cradle 106a-b has solid side pieces, as in the example embodiment, this can provide enhanced securing of items supported.

The center of gravity cradle 106a and other center of gravity or center of mass attachments can be located in a center of gravity or center of mass zone "CG zone" or "CM zone" which can be +/−about 5-10% off the true center of gravity of an item supported in some embodiments. In some embodiments it can be a standard deviation of the center of gravity or mass in either direction as applied to the center of gravity or mass attachment or cradle. This can allow adjustable adaptor bicycle bars (such as that shown in FIGS. 21A-21B to securely transport bicycles which do not have standard horizontal crossbars to be transported and stored using carrier bars as disclosed herein. The CG zone can be a location of the male or female component in various embodiments.

Figure 1C:
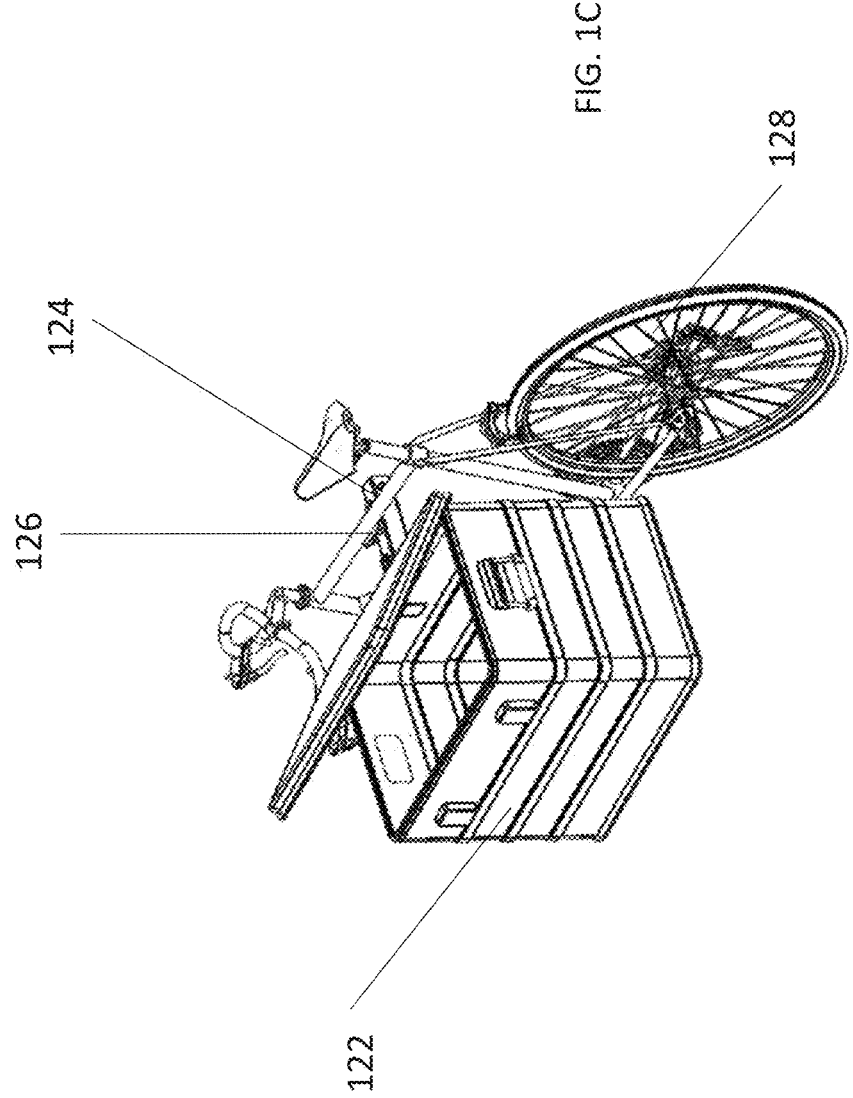
FIG. 1C shows a cargo carrier attachment to a carrier bar with a center of gravity attachment supporting a bicycle in accordance with the present invention.

FIG. 1C shows an example embodiment of a cargo carrier attachment 122 to a carrier bar 124 with a center of gravity attachment 126 supporting a bicycle 128 in accordance with the present invention. In the example embodiment the cargo carrier 122 can have a channel on a side facing where a carrier bar will be mounted.

FIG. 1D shows an example embodiment of a center of gravity attachment 130 supporting a briefcase 132 in accordance with the present invention. In the example embodiment a slide-and-secure female attachment piece can be secured to a horizontal bar of a bicycle frame 136. This female attachment piece 130 can be slid on to a male attachment piece as shown in previous embodiments to secure the bicycle for transportation to a carrier bar. Here, a satchel or briefcase 132 has a male attachment piece 138 that can slide into the female piece 130 to secure the satchel for transportation while an operator rides the bicycle. Attachment means for both the male attachment 138 and female attachment 130 vary and can include adhesives, screws, clamps, clips, manufacturing processes, solders, welds, and others. A standardized size of the female and male attachment pieces allows for the secure transport of any number of items with compatible attachments. These items can include speakers, tablets, bags, cases, water bottles, shoulder rests, helmets, and virtually any other item which fits within the space comfortably for the operator. The female attachment can be ergonomically shaped with ridges and gripping material to provide a convenient handle for a user to grip and carry the bicycle with if needed or desired when no attached item is being carried.

Figure 2A:
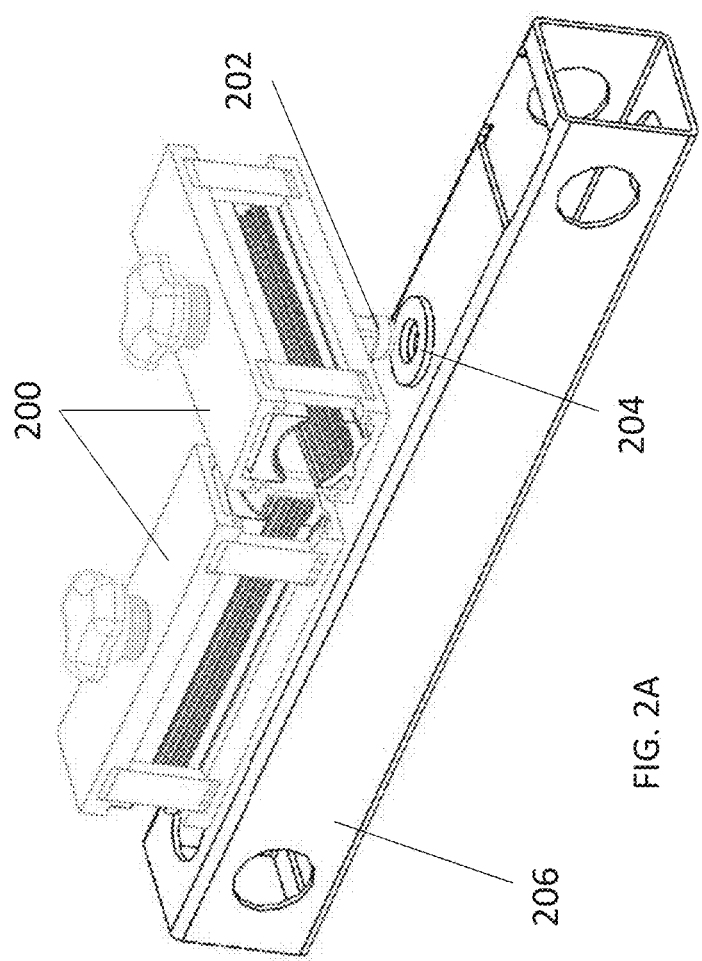
FIG. 2A shows two rotatable peg locking cradles in accordance with the present invention.

FIG. 2A shows an example embodiment of two rotatable peg locking cradles 200 in accordance with the present invention. In the example embodiment the cradles 200 can be attached by sliding a pin 202 downwards through a hole 204 in the upper side of a carrier bar 206. Once secured to the carrier bar 206, the cradles 200 can be rotated ninety degrees to provide an appropriate orientation for carrying cargo such as bicycles.

FIG. 2B shows an example embodiment of a cross sectional perspective view of a peg locking cradle 208 in a perpendicular orientation to a carrier bar 210 in accordance with the present invention. In the example embodiment the pin 212 can be secured after sliding through the hole 214 in the top of the carrier bar 210 and held in place by sliding a holding member 216 into a slot 218, cutout or hole in the side of the carrier bar 210. The holding member 216 can be a clip with an hourglass shape that secures the pin 212 in place in some embodiments. In other embodiments the holding member can have a "c" or other shape to engage the pin 212. The pin 212 can have a flared head 222 at the end opposite the cradle device 208 with a thinner neck 220 between the head 222 and the cradle device 208 in order to prevent upward and downward movement of the cradle device 208 during transportation.

Figure 2C:
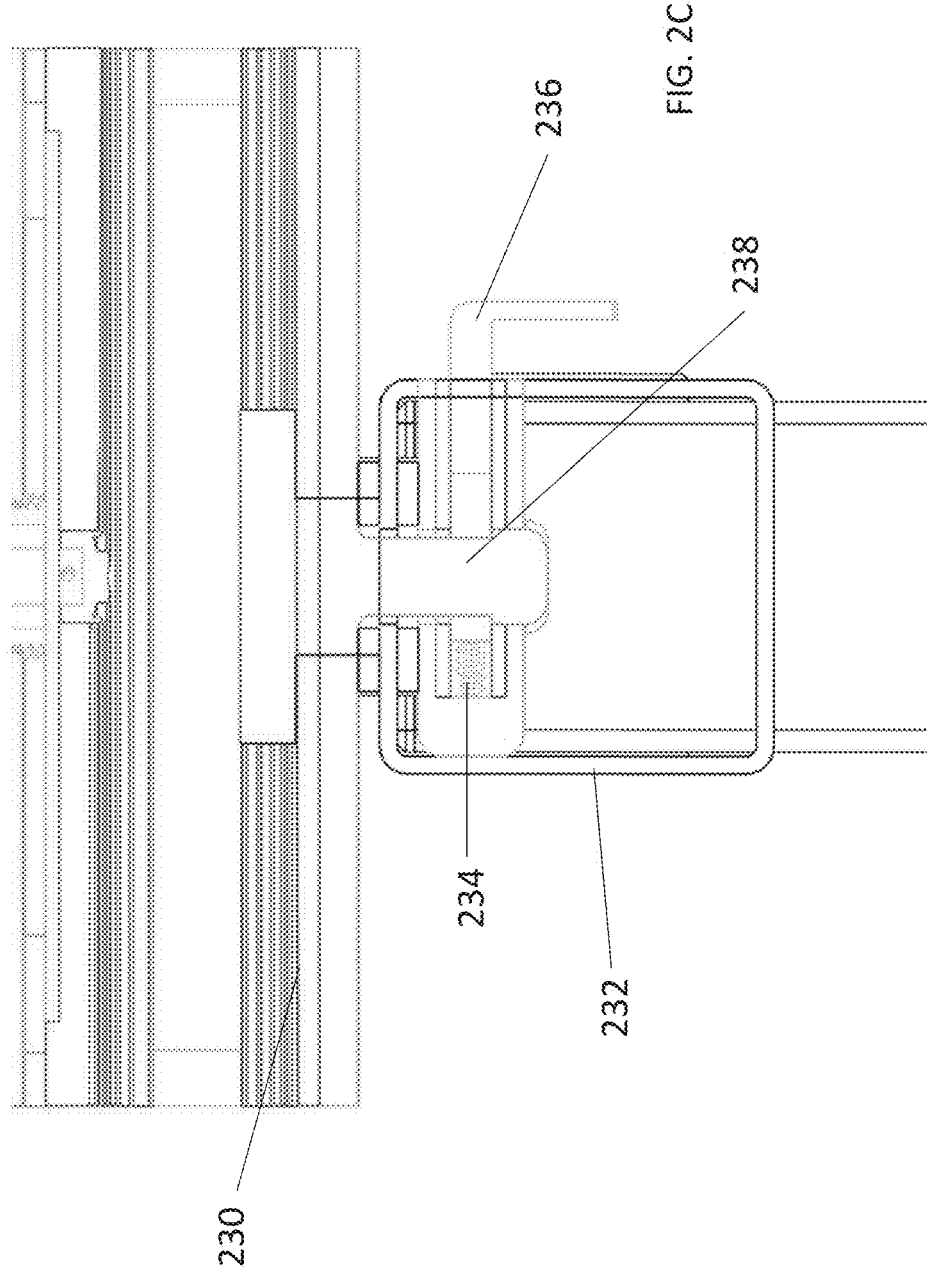
FIG. 2C shows a cross sectional side view of a peg locking cradle in a perpendicular orientation to a carrier bar in accordance with the present invention.

FIG. 2C shows an example embodiment of a cross sectional side view of a peg locking cradle 230 in a perpendicular orientation to a carrier bar 232 in accordance with the present invention. In the example embodiment a spring device 234 is included as part of the holding member in order 236 to provide pressure to engage the pin and hold it in place.

Figure 2E:
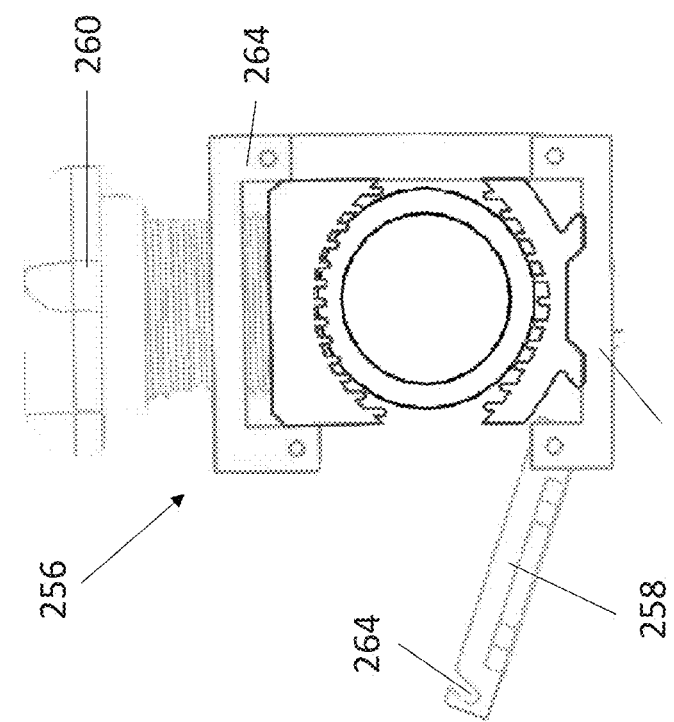
FIG. 2E shows a side view of a cradle with a securing screw mechanism and open side hinge in accordance with the present invention.
Figure 2D:
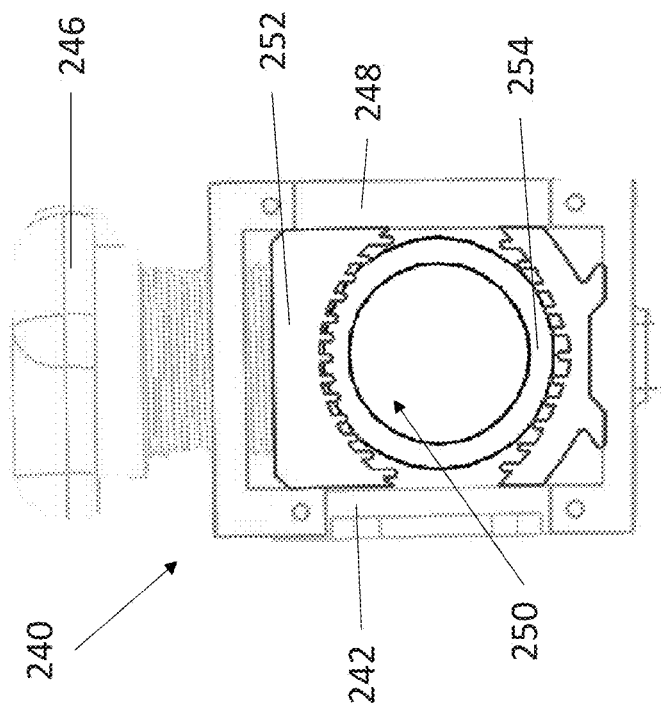
FIG. 2D shows a side view of cradle with a securing screw mechanism and closed side hinge in accordance with the present invention.

FIG. 2D shows a side view of a cradle 240 with a securing screw mechanism 246 and closed side hinge 242 in accordance with the present invention. In the example embodiment the cradle 240 has solid structures 248 which maintain a uniform structure and height of the cradle 240. The interior area 250 of the cradle 240 can move by operation of the screw mechanism 246 on the top of the cradle 240 which can push the upper engaging part 252 downward to provide a more secure hold on the structure 254 being gripped.

FIG. 2E shows an example embodiment of a side view of a cradle 256 with a securing screw mechanism 260 and open side hinge 258 in accordance with the present invention. In the example embodiment the open side hinge 258 is shown attached to the lower cradle support 262 with a hook-latch that can be secured to a compatible component on the upper cradle support 264.

Figure 2G:
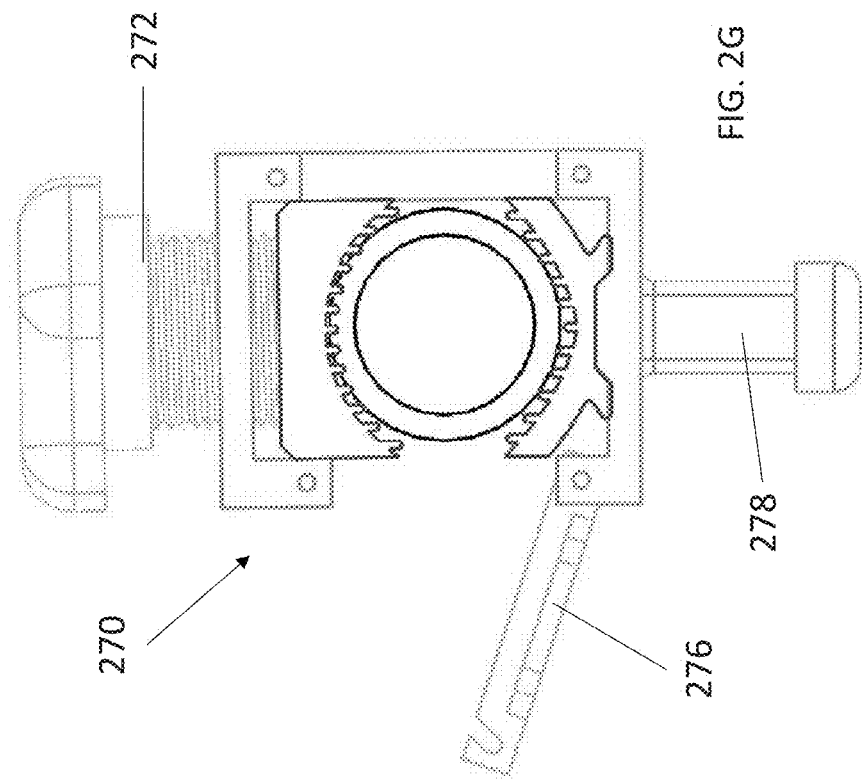
FIG. 2G shows a side view of a peg locking cradle with a securing screw mechanism and open side hinge in accordance with the present invention.
Figure 2F:
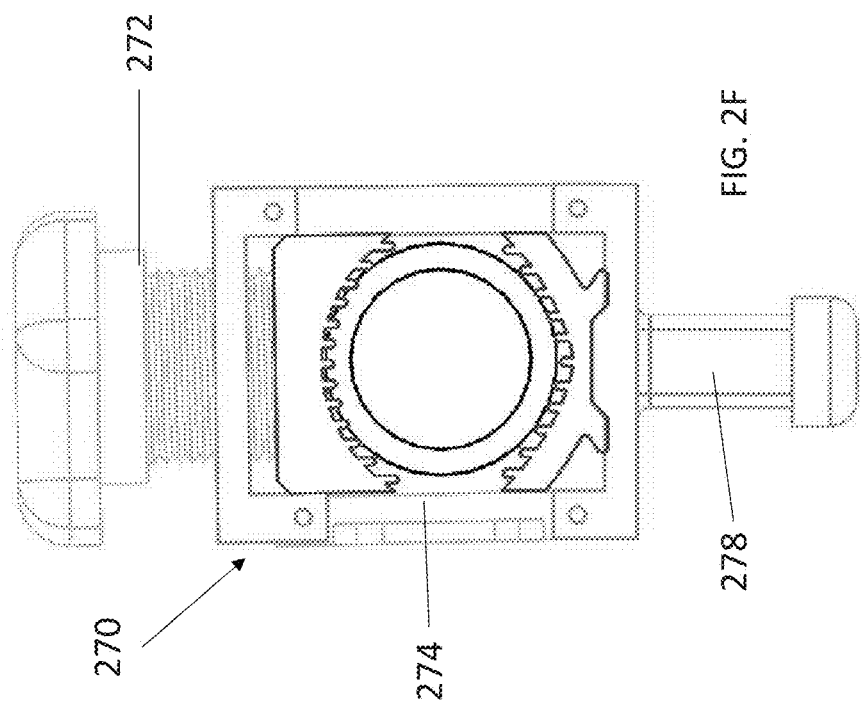
FIG. 2F shows a side view of a peg locking cradle with a securing screw mechanism and closed side hinge in accordance with the present invention.

FIGS. 2F-2G show example embodiments of a side view of a peg locking cradle 270 with a securing screw mechanism 272 and closed side hinge 274 and open side hinge 276 respectively, in accordance with the present invention. In the example embodiments a peg locking mechanism 278 is shown at the bottom of the cradle 270 which can be secured to a carrier bar, as shown in previous embodiments.

FIGS. 2H-2I show example embodiments of a side view of an open peg locking cradle 280 with supported bar 282 and no bar respectively, and with a securing screw mechanism 284 and open side hinge 286 in accordance with the present invention. In the example embodiment the upper cradle 288 has been rotated away from the lower cradle 290 about a hinge 292 attached to the lower cradle 290. This can ease a user's operation of the cradle device 280 in the form of loading, securing and unloading cargo.

Figure 3A:
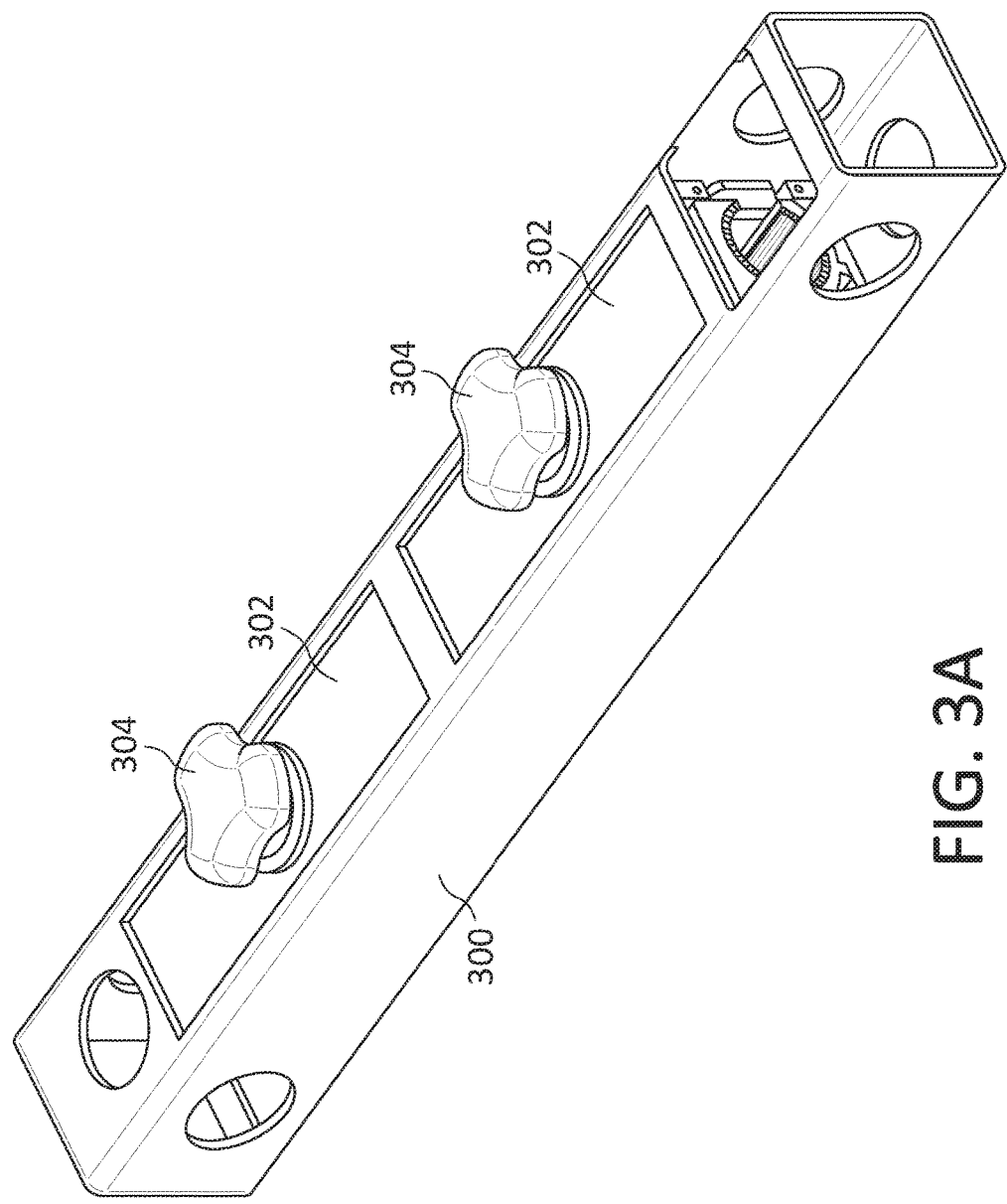
FIG. 3A shows a perspective view of a support bar with nesting cradles with securing screw mechanisms in accordance with the present invention.

FIG. 3A shows an example embodiment of a perspective view of a support bar 300 with nesting cradles 302 with securing screw mechanisms 304 in accordance with the present invention. In the example embodiment each cradle 302 can be nested within the body of the carrier bar 300 while the only structures above the top of the carrier bar 300 are the securing screws 304.

Figure 3B:
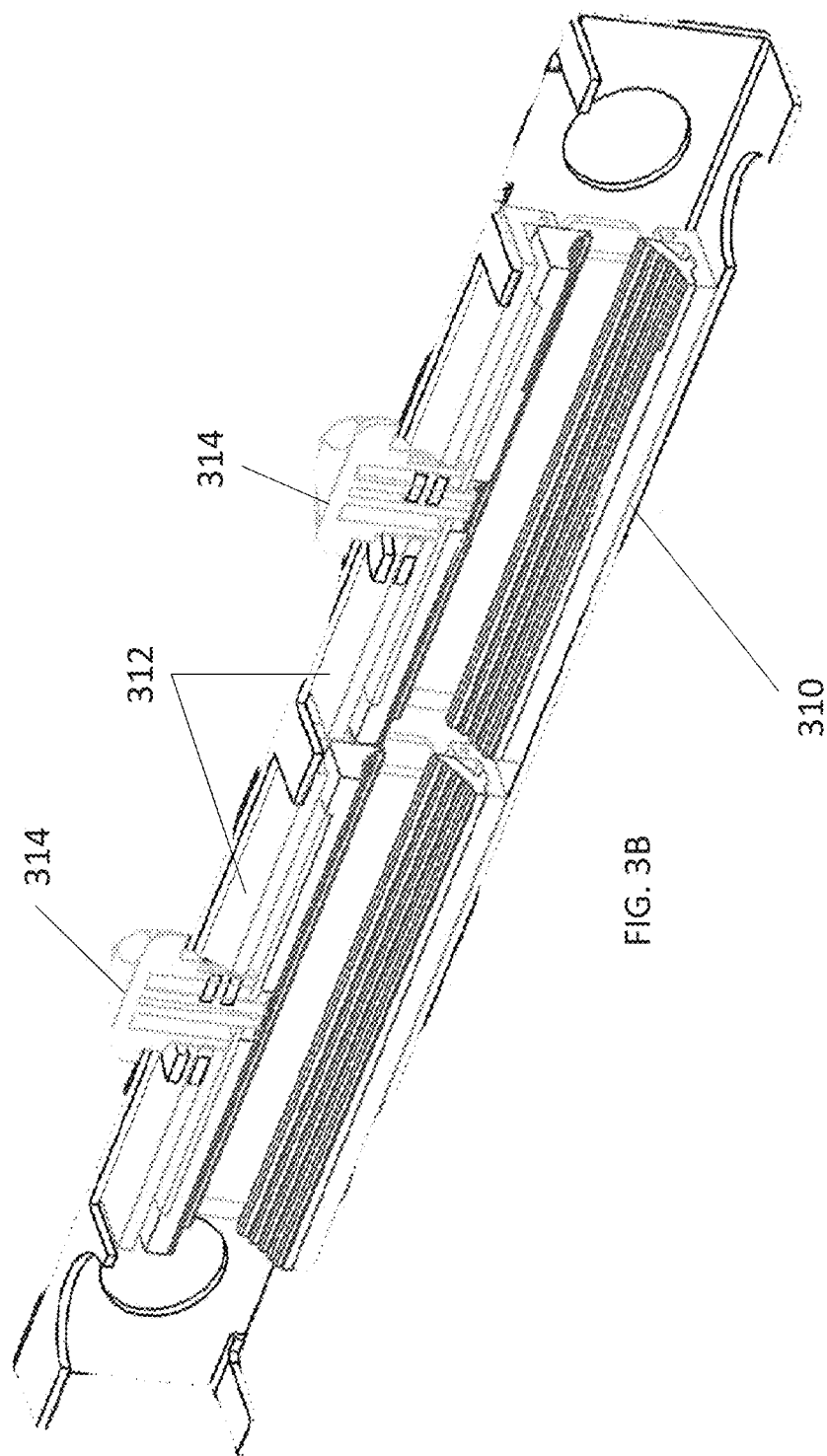
FIG. 3B shows a perspective cross sectional view of a support bar with nesting cradles with securing screw mechanisms in accordance with the present invention.

FIG. 3B shows an example embodiment of a perspective cross sectional view of a support bar 310 with nesting cradles 312 with securing screw mechanisms 314 in accordance with the present invention.

Figure 4A:
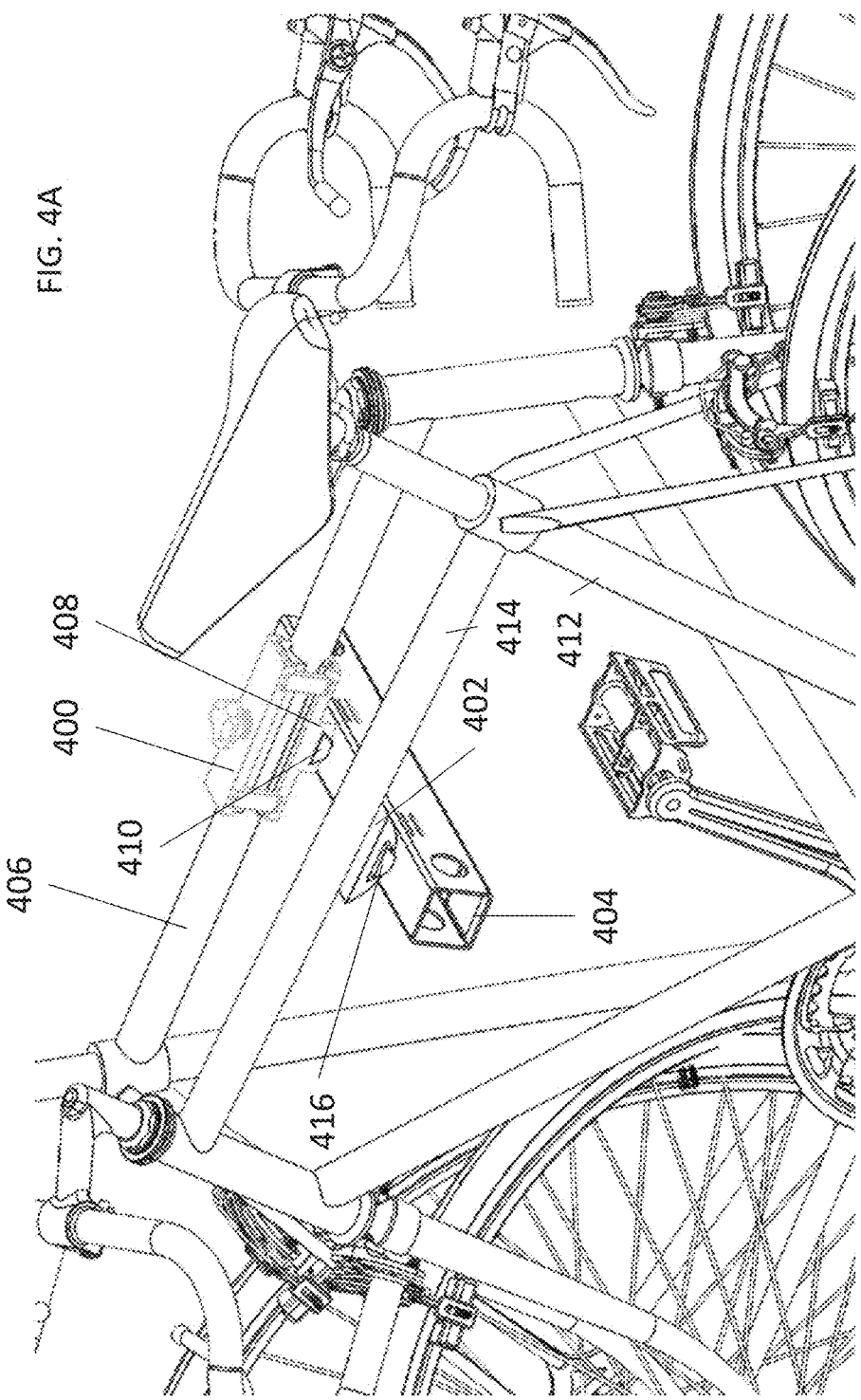
FIG. 4A shows a support bar with a center of gravity cradle attachment and a center of gravity bicycle attachment in accordance with the present invention.

FIG. 4A shows an example embodiment of a perspective view of a support bar 404 with a center of gravity cradle 400 attached and a center of gravity bicycle attachment 402 attached in accordance with the present invention. In the example embodiment the bicycle 406 is locked into a cradle 400 which has a slide-and-secure female attachment 408 that has a trapezoidal cross-sectional profile. This female attachment has been slid over a first male attachment 410 that is attached to a carrier bar 404. The bicycle 412 has a female attachment 402 attached to a horizontal bar 414 of the bicycle 412. The attachment 402 has been slid over a second male attachment 416 that is attached to the carrier bar 404. The figure shows the convenience of the system in that both bicycles 406, 412 with and without female attachments 402 can be supported by carrier bars 404 with proper components.

FIG. 4B shows an example embodiment of a support bar with two center of gravity cradle attachments in accordance with the present invention, as described above with respect to FIG. 1B. In the example embodiment the cradle attachments have been secured to a carrier bar and one of the cradles is supporting a horizontal bar of a bicycle.

FIG. 4C shows an example embodiment of a support bar 404 with a male center of gravity cradle attachment 410 and a bicycle 414 with a female center of gravity bicycle attachment 402 in accordance with the present invention. In the example embodiment, one side 418 of the male portion on the carrier bar impedes the female portion 402 from sliding completely across the male portion 416. The male portion can have an attached peg 420 which operates to secure the female portion and impede its movement once the female portion 402 and male portion 416 have been engaged and the bicycle 414 is in place for transport or storage.

FIG. 4D shows an example embodiment of a perspective view of a peg locking cradle 422 with a securing screw mechanism 424 and closed side hinge 426 in accordance with the present invention.

FIG. 4E shows an example embodiment of a side view of a cradle device 428 in accordance with the present invention. In the example embodiment a plunger device 430 is shown which can block lateral movement or rotation of the cradle device 428 in various embodiments. The plunger device 430 is further described below with respect to FIGS. 10A-B and can be adapted for various uses in accordance with the present invention.

FIG. 4F shows an example embodiment of a male center of gravity device 432 attached to a bicycle bar 434 in accordance with the present invention. In the example embodiment the male center of gravity piece 432 can be attached to the horizontal bicycle bar 434 in various ways. In some embodiments the male piece 432 can be screwed into place while in others can be held by adhesive, soldered, welded, clipped, clasped, manufactured in place, as well as many others. In some embodiments the bar 434 may not be horizontal such that it is parallel with the ground when the bicycle is in the upright position. In such embodiments the male center of gravity piece 432 can be manufactured to compensate for an angle of the bar 434 or can be adjusted with additional mechanisms to provide for upright or otherwise secure and stable support during transportation and storage.

FIG. 4G shows an example embodiment of a male center of gravity device 432 attached to a bicycle bar 434 in accordance with the present invention. While the example embodiment shows the male center of gravity device 432 as having a flat upper surface nearest the bicycle bar, it should be understood that the upper surface may be curved such that it matches the curve of the bar. In some embodiments the male piece 432 is a trapezoid or hourglass shape which prevents rocking, swaying and rotation, in part due to the fact that seven surfaces are abutting each other when coupled to a female portion (not shown in FIG. 4G). In some embodiments female portions or mounts can be recessed inside a carrier bar such that the upper surface is flush with the upper surface of the carrier bar and the male trapezoid 432 can be secured.

FIG. 4H shows an example embodiment of a male center of gravity device 432 attached to a bicycle bar 434 in position to slide into a female device attached to a support bar in accordance with the present invention. In the example embodiment a female device 436 is securely attached to a carrier bar 438 and the male device 432 is placed in alignment with the female device 436 such that they can be coupled. This alignment allows the pieces to slide and engage each other. In other embodiments the female portion 436 can be snapped, ratcheted, or otherwise moved into place where the devices are dynamic and not static in their position and orientation.

FIG. 4I shows an example embodiment of a male center of gravity device 432 engaged with a female device 436 attached to a support bar 438 in accordance with the present invention. In the example embodiment the male piece 432 has been slid into place with respect to the female piece 436 in a channel 440 and the two are securely engaged.

FIG. 5A shows an example embodiment of a carrier bar 500 with cargo carrying box 502 in accordance with the present invention. In the example embodiment the carrier bar 500 can secure to the rear of the cargo carrying box 502 with an appropriate male or female receiver section and securing means such as a pin.

FIG. 5B shows an example embodiment of a carrier bar 504 with cargo carrying box 506 unattached in accordance with the present invention. In the example embodiment a top collar portion 508 is shown with support spine 510 attached to the rear of a cargo carrying box 506. The carrier bar 504 has a vertical carrier bar 512 attached to a horizontal carrier bar 514. The vertical spine 510 has a length such that when upper collar 508 is secured to the top of vertical carrier bar 512 a lower surface 516 of the vertical spine 510 engages an upper surface 518 of a horizontal section 514 adjacent to the vertical carrier bar 512.

FIG. 5C shows an example embodiment of a carrier bar 504 with cargo carrying box 506 attached in accordance with the present invention. The example embodiment shown is an attached view of the unattached view shown in FIG. 5B.

FIG. 5D shows an example embodiment of a carrier bar 504 with cargo carrying box 506 unattached and additional securing collar 516 in accordance with the present invention. In the example embodiment, similar elements are shown and numbered respectively as in FIG. 5C with an additional securing collar 516 attached to vertical spine 510 is shown in addition to a top securing collar 508. This additional securing collar 516 can provide added stability.

FIG. 5E shows an example embodiment of a carrier bar 504 with cargo carrying box 506 attached and additional securing collar 516 in accordance with the present invention. The example embodiment shown is an attached view of the unattached view shown in FIG. 5D. Additionally, shown here are a top peg or protrusion 518 on an upper surface of vertical carrier bar 512 fitting into a complementary sized hole 520 of a top surface of top securing collar 508.

FIG. 5F shows an example embodiment of a cargo carrying box 506 in accordance with the present invention.

FIG. 5G shows an example embodiment of a cargo carrying box 506 in accordance with the present invention.

FIG. 6A shows an example embodiment of a push button spring mechanism 600 in accordance with the present invention. In the example embodiment a first button 602 and opposing second button 604 of push button mechanism 600 are pushed outward by a spring 606 housed in a channel 608 between first and second buttons 602 and 604 respectively. The spring 606 can be compressed by pushing one or both buttons 602, 604 on each side of the spring 606 together, thus sliding the button(s) 602, 604 into holes 610, 612 respectively in the side of a carrier bar 614 or, in some embodiments, carrier bars. When the spring 606 is pushing outward, the edges outer edges 616, 618 of the buttons 602 and 604 can fit through holes 610, 612 respectively in the carrier bar 614 and are designed to hold one carrier bar to another or one section of a carrier bar to another.

FIG. 6B shows an example embodiment of a carrier bar 620 with attached second carrier bar 622 in accordance with the present invention. In the example embodiment a short, vertical connecting piece 624 is shown connecting two horizontal carrier bars 620, 622 which each have two cradles 626 attached. In some embodiments, push button mechanisms (such as those in FIG. 6A) can be provided to provide simple connection and disconnection of carrier bars or other segments for users at locations such as 628.

FIG. 7A shows an example embodiment of a locking attachment mechanism 700 in accordance with the present invention. In the example embodiment a locking mechanism 700 in the interior of a first carrier bar 702 can be turned from the exterior using a key 704. When the key 704 is inserted into a keyhole 706 of locking mechanism 700 and turned, a hook mechanism 708 can engage an appropriate mechanism (not shown) in a second carrier bar 710 through a slot or other hole (not shown) and secure the first bar 702 to the second bar 710. Notches or channels 712 are provided near the end of the first carrier bar 702 on each side of its upper surface 714 and extending to a midpoint of the first bar 702 into which a matching or otherwise complementary sized peg 716 on opposing sides 718, 720 of the second carrier bar 710 slides into to provide stabilization. The notches 712 are flared outward toward the exterior side surfaces 722, 724 of the first bar 702 in the example embodiment. In some embodiments another member (not shown) can be secured into place in the open channels 712 after the bars 702, 710 have been joined to improve the security of the engaged portions such that they are held in place with respect to each other.

FIG. 7B shows an example embodiment of two locking attachment mechanisms 700a, 700b and an attached center of gravity joining piece 730 in accordance with the present invention. In the example embodiment a first locking attachment mechanism 700a is provided to lock a vertical support bar 734 to a first bar 732. One or more slots or notches 734 are provided on the side(s) 738 of the first bar 732 that correspond with peg(s) 736 on the vertical support bar 734 to provide additional support, as described with respect to FIG. 7A. A second locking mechanism 700b is provided to secure a carrier bar 740 to the vertical support bar 732. One or more slots or notches 742 are provided on the sides 744 of the second carrier bar 740 that correspond with peg(s) 746 on the vertical support bar 734 to provide additional support, as described with respect to FIG. 7A. Cutouts on one or more of the first bar 732 and second carrier bar 740 can receive complementary sized structures or protrusions 750 on the ends of vertical bar 734 and provide additional support and prevent undesirable movement. A center of gravity joining piece 730, also called a male attachment plate is shown attached to the carrier bar. This plate 730 includes a male attachment piece 752 which can be used to secure cargo fitted with a female attachment piece (not shown). In some embodiments plate 730 is removable or detachable while in other embodiments it is affixed to second carrier bar 740.

FIG. 7C shows an example embodiment of two locking attachment mechanisms 700a, 700b and a removed attached center of gravity joining piece (as was shown as attached in FIG. 7B) in accordance with the present invention. In some embodiments the vertical secondary bar 734 can have a hinge or telescoping feature such that it can fold or be reconfigured into a compact size when not in use.

FIG. 8A shows a side view of a male center of gravity joining piece 802a with engaged female center of gravity attachment 800a and release clasp 804a in locked position in accordance with the present invention. In the example embodiment the release clasp 804a is shown from the side cross section where an engaging piece 806a is located on the interior of the female center of gravity attachment 800a. The clasp 804a rotates about a pin 808a and a piece 806a on the interior engages a complementary piece of the male structure 810a.

FIG. 8B shows an example embodiment of a side view of a male center of gravity joining piece 802b with attached female center of gravity attachment 800b and release clasp 804b in unlocked position in accordance with the present invention. In the example embodiment the clasp 804b is lifted to secure it in place. In other embodiments the clasp 804b may be pushed down to secure it in place.

Figure 8C:
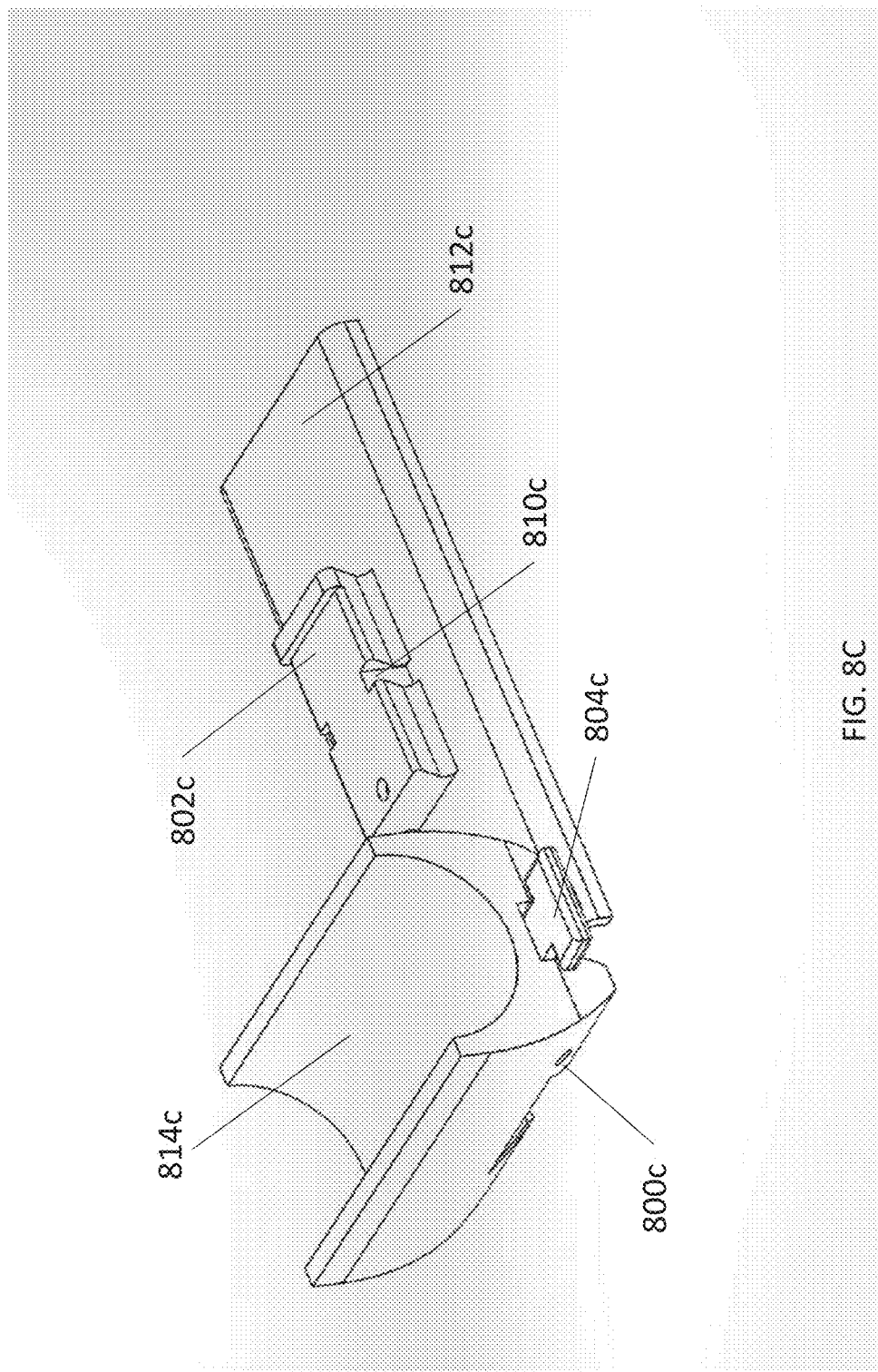
FIG. 8C shows a perspective view of a center of gravity joining piece with detached center of gravity attachment and release clasp in accordance with the present invention.

FIG. 8C shows an example embodiment of a perspective view of a male center of gravity joining piece 802c on a plate 812c with detached female center of gravity attachment 800c affixed to a cradle 814c and having a release clasp 804c in accordance with the present invention. In the example embodiment the male piece 802c is shown as having a notch or groove in its center 810c which can be engaged by the clasp 804c.

Figure 8E:
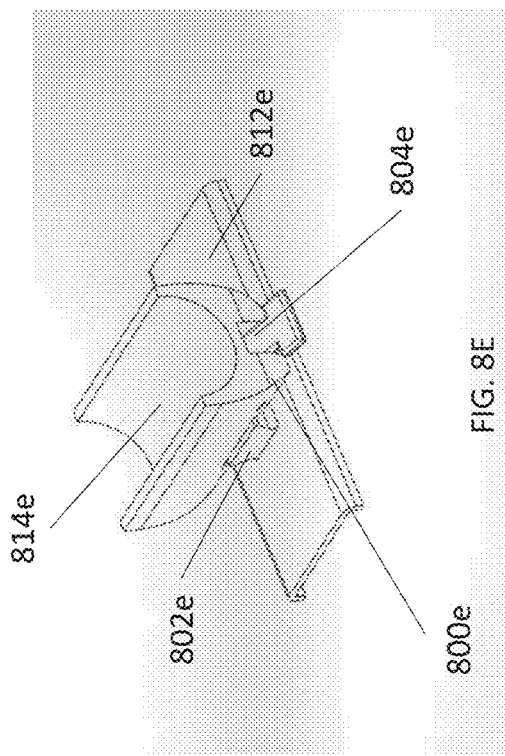
FIG. 8E shows a perspective view of a center of gravity joining piece with attached center of gravity attachment and release clasp in unlocked position in accordance with the present invention.
Figure 8D:
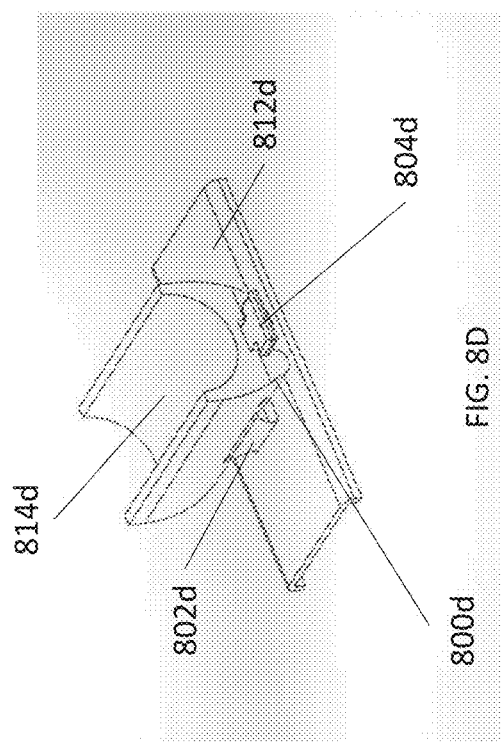
FIG. 8D shows a perspective view of a center of gravity joining piece with attached center of gravity attachment and release clasp in locked position in accordance with the present invention.

FIG. 8D shows an example embodiment of a perspective view of a center of gravity joining piece 802d with attached center of gravity attachment 800d affixed to cradle 814d and release clasp 804d in unlocked position in accordance with the present invention. In the example embodiment the clasp 804d is shown in an unsecured position.

FIG. 8E shows an example embodiment of a perspective view of a center of gravity joining piece 802e with attached center of gravity attachment 800e affixed to cradle 814e and release clasp 804e in locked position in accordance with the present invention. In the example embodiment the clasp 804e is shown in the secured position.

FIG. 8F shows an example embodiment of a perspective view of a center of gravity joining piece 802f with attached center of gravity attachment 800f and release clasp 804f in locked position in accordance with the present invention. In the example embodiment the clasp 804f extends such that it impedes the male 802f and female 800f portions of the center of gravity system from sliding with respect to each other by blocking in channel 810f.

FIG. 8G shows an example embodiment of a perspective view of a center of gravity joining piece 802g with attached center of gravity attachment 800g and release clasp 804g in unlocked position in accordance with the present invention. In the example embodiment the clasp 804g is lifted from the position shown in FIG. 8F such that the male 802g and female 804g portions of the center of gravity system can slide with respect to each other and therefore be disengaged.

FIG. 9 shows an example embodiment of a perspective view of a transitional carrier bar 900 with two female device supports 902 for engaging male center of gravity devices (not shown) in accordance with the present invention. In the example embodiment the female device supports 902 are attached permanently to the carrier bar 900. In other embodiments they can be removable.

FIG. 10A shows an example embodiment of a view of a plunger stop 1000a in accordance with the present invention. In the example embodiment a screw 1002a with threads can be inserted into a complementary threaded hole 1004a in a male center of gravity piece. The upper surface of the screw can have a depressible plunger 1006a which in a first position extends upward such that it blocks lateral movement of a female portion 1008a of the center of gravity holder with respect to a male portion 1010a. In a second position where the plunger 1006a is depressed into the body of the screw 1002a, the female portion 1008a of the center of gravity holder can be free to move in a lateral direction with respect to a male portion 1010a.

FIG. 10B shows an example embodiment of a side view of a plunger stop 1000b in accordance with the present invention. In the example embodiment, the plunger 1006b is shown in a first position as described above.

FIG. 10C shows an example embodiment of locking mechanism 1020. In the example embodiment, when a screw 1022 is tightened, an arm 1024 is pushed downward at a first end 1026 causing a pivot around a central location 1028, whereby an opposing tip 1030 with a lip 1034 pivots upward and secures mechanism 1034.

FIG. 11A shows an example embodiment of a cargo carrier 1100a with ski mounting. In the example embodiment male portions 1102a on a cargo carrier box 1100a couple to female connectors 1104a on skis 1106a.

FIG. 11B shows an example embodiment of a cargo carrier 1100b with ski mounting. In the example embodiment male portions 1102b on a cargo carrier box 1100b are shown as coupled to female connectors 1104b on skis 1106b. In the example embodiment the female portions 1104b can be situated on the skis 1106b such that they do not interfere with the normally intended function of the skis 1106b.

FIG. 11C shows an example embodiment of a perspective view of a cargo carrier 1100c with ski mounting. In the example embodiment skis 1106c are shown as attached to a cargo box 1100c using coupling mechanisms described herein. A cargo carrier bar 1108c supporting cargo box 1100c can be set or adjusted such that it provides sufficient ground clearance for the skis 1106c when attached to a vehicle.

FIG. 11D shows an example embodiment of a side view of a ski mounting carrier 1110. In the example embodiment the ski mounting carrier 1110 has securing bars 1112d which can be closed on skis 1106d in some embodiments in order to support and secure the skis 1106d for transport and storage. In some embodiments appropriate male or female attachments are provided on ski mounting carrier 1110 in order to support and secure the skis 1106d. A cargo carrier bar (not shown) supporting the ski mounting carrier 1110 can be set or adjusted such that it provides sufficient ground clearance for the skis 1106d when attached to a vehicle. Ski mounting carrier 1110 can maintain skis 1106d in a variety of orientations based on specific embodiments and it should be understood that it can be connected to cargo carrier bars as described herein in various fashions using male and compatible female connectors.

FIG. 11E shows an example embodiment of a ski mounting carrier 1110. In the example embodiment the ski mounting carrier 1110 is shown from an end view and skis 1106e are shown as supported and secured at an angle and kept in place with securing bars 1112e.

FIG. 11F shows an example embodiment of a ski mounting cargo box carrier 1100f. In the example embodiment skis 1106f are shown as supported and secured at an angle to a cargo box carrier 1100f using coupling mechanisms described herein which are attached to two ski mounting carrier securing bars 1112f. The cargo carrier bar 1108f supporting cargo box 1100f can be set or adjusted such that it provides sufficient ground clearance for the skis 1106f when attached to a vehicle.

FIG. 11G shows an example embodiment of a ski mounting carrier 1112g connected to a cargo box 1100g. In the example embodiment skis 1106g are shown as attached to cargo box 1100g using ski mounting carrier securing bars 1112g that can be attached to cargo box 1100g via connection or coupling of corresponding male 1114g and female 1116g trapezoid locking mounts.

FIG. 12A shows an example embodiment of a surf mounting carrier cargo carrier 1200a with a surfboard 1206a in an uncoupled orientation. In the example embodiment two male type connectors 1202a are attached on each side of a cargo carrier box 1200a and angled such that support of surfboard 1206a is angled when attached or coupled using one or more built in or removable female connector 1204a rather than vertical with respect to the ground.

FIG. 12B shows an example embodiment of a surf mounting carrier cargo carrier 1200b with two male mounting pegs 1202b per opposing side. The male mounting pegs 1202b couple to compatible female type connectors attached to the surfboard 1206b or in the face of the surfboard. The carrier bar 1208b can be attached or coupled to a tow hitch in some embodiments, as shown in the example embodiment.

FIG. 12C shows an example embodiment of a surf mounting carrier cargo carrier 1200c. In the example embodiment two surfboards 1206c can be supported, one on either side of the cargo carrier box 1200c.

FIG. 12D shows an example embodiment of a surf mounting carrier cargo carrier 1200d with four male mounting pegs 1202d per side. In the example embodiment four mounting pegs 1202d can be used to support a single surfboard 1206d. In other embodiments different numbers of a mounting pegs 1202d with can be used.

FIG. 12E shows an example embodiment of a surf mounting carrier cargo carrier 1200e. In the example embodiment two surfboards 1206e are shown as supported.

FIG. 12F shows an example embodiment of a surfboard 1206f with female mounting carrier slots 1204f. In the example embodiment the surfboard 1206f can be mounted using the slots which have a narrowed neck portion. In some embodiments a surfboard 1206f with female mounting carrier slots 1204f can be easily attached to a roof rack of a vehicle which has complementary male pieces attached. In some embodiments a surfboard 1206f with mounting carrier slots 1204f can be attached to a roof rack using a link securing mechanism as shown in FIG. 20E where the link securing mechanism has male pieces and is attached to a roof rack before securing the male/female connection with the surfboard 1206f.

As described in the previous paragraph, roof racks for vehicles can be fitted with male or female pieces or slots in order to create accommodating areas for bars, boxes or other items to be carried or transported.

FIG. 13A shows an example embodiment of a wheeled carrier box 1300a which can couple with a carrier bar. In the example embodiment a cargo carrier box is shown which has a handle 1306a and two wheels 1304a such that it can be dragged by a user. In other embodiments additional wheels can be used and pegs or other legs can be used to create an even platform with the ground as a base and a lower surface of the box 1302a parallel with the plane of the ground. The handle 1306a shown is coupled or part of a plate 1308a which can be ratcheted up and down using appropriate grooves or holes 1310a on the plate 1308a and a gear 1312a attached to a ratcheting mechanism 1314a that can be operated using a hand crank or automatically with appropriate electro-mechanical mechanism. Some embodiments can have wheels oriented to allow for easier transport up and down stairs.

In various embodiments, one or more adjustable length legs can be included with various cargo boxes that fold outward from a surface of the box and rest on or couple with such as by being inserted into complementary holes in a rear area of a transport vehicle. This configuration can provide extra support for heavier cargo.

FIG. 13B shows an example embodiment of a wheeled carrier box 1300b which can couple with a carrier bar. In the example embodiment the handle 1306b and plate 1308ab have been raised using the ratcheting mechanism 1314b. This can allow the handle 1306b to be raised to an appropriate height for coupling with a cargo carrier bar or for use by operators who are taller. The handle 1306b can have a secondary handle in some embodiments which can swing up from a retractable handle mechanism and lock on to the primary handle and couple with the carrier bar. Plate 1308b has been raised with respect to a backplate 1316b and the two can be coupled in one or more locations by one or more locking mechanical connector such that their positions can be fixed with respect to each other.

FIG. 13C shows an example embodiment of a wheeled carrier box 1300c and a coupled carrier bar 1318c. In the example embodiment the cargo carrier bar 1318c is coupled to the handle 1306c using appropriate mechanical locking connection at its distal end and can be locked in place. One example use of a cargo carrier of this design is for groceries. The cargo carrier box can be used to place grocery bags in for vehicles with limited in-vehicle carrying capacity. The ratcheting mechanism 1314c can provide ease of use for operators with limited strength to easily raise and lower the cargo carrying box 1302c. In some embodiments the ratcheting mechanism 1314c can be removed and attached to other units such as suitcases, cargo boxes, ice chests, barbeques and others with appropriate connections. In other embodiments plate 1316c can be coupled using appropriate means to these secondary objects. In embodiments where the ratcheting mechanism 1314c is motorized the motor can be single or dual and can run on a spindle in the center of the handle or in a non-central location. It should be understood that the motor can have varying speeds and other functions in addition to on and off functionality. It also may run on an internal power source such as a battery which could be rechargeable or charged by solar power or on external power with appropriate wiring.

FIG. 13D shows an example embodiment of a wheeled carrier box 1300d and a coupled carrier bar 1318d. In the example embodiment the cargo carrying box 1302d has been raised off of the ground by operating the ratcheting mechanism 1314d and raising the cargo carrying box 1302d to an appropriate height to provide ground clearance for transportation.

FIG. 14A shows a female trapezoid mechanism 1400*a* with a fixed stop wall 1402*a* on its front side and a lever 1404*a* for a live spring on its front side which can be depressed, for example with a finger, to either engage a male trapezoid 1406*a* or to disengage it from the male trapezoid 1406*a*.

Figure 14B:
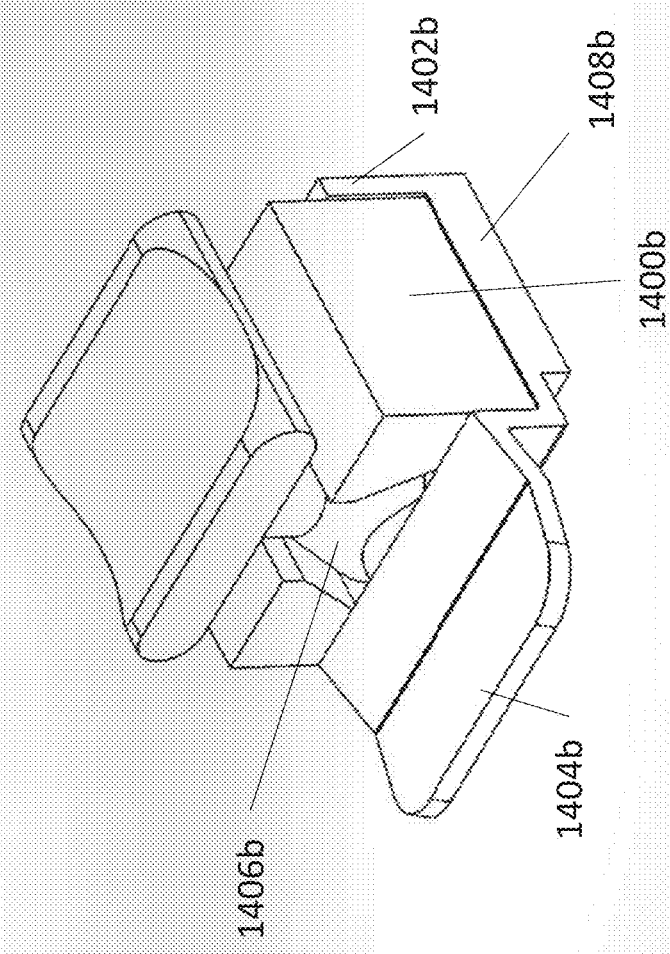
FIG. 14B shows an example embodiment of a perspective view of a securing mechanism.

FIG. 14B shows an example embodiment of a perspective view of a coupled male portion 1406*b*, female portion 1400*b* and installation section 1408*b*. In the example embodiment an installation section 1408*b* can be installed in a position to permanently or removably couple a female portion 1400*b*. The female portion 1400*b* can be secured to the installation section 1408*b* by appropriate means such as adhesives, screws, and others. A male portion 1406*b* can then be slid into position in the female portion 1400*b* for securing items that are attached to the male portion 1406*b* (items not shown). Front stop 1402*b* can prevent male portion 1406*b* from sliding out the front of female portion 1400*b* while a lever arm 1404*b* can be pushed downward with respect to female portion 1400*b* in order to provide clearance for male portion 1406*b*.

FIG. 14C shows an example embodiment of a side view of a coupled male portion 1406*c*, female portion 1400*c* and installation section 1408*c*. In the example embodiment shown the installation section 1400*c* is shown with complementary shaped female portion secured 1400*c*. The female portion 1400*c* can be secured for example using adhesives, screws, or other appropriate means.

FIG. 14D shows an example embodiment of a perspective view of a decoupled male portion 1406*d* and female portion 1400*d* coupled with an installation section 1408*d*. In the example embodiment the male portion 1406*d* has been slid out of position with the female portion 1400*d*. In some embodiments the male portion 1406*d* can include multiple pieces which are attached by various means such as adhesives, screws, nuts, bolts, or others as appropriate. In such instances, one or more of the pieces can be interchangeable such that they can be removed and replaced. As such, different materials can be used and interchanged in order to accommodate different user needs based on what the user desires to carry or transport. For instance, softer materials or materials with a coating such as a foam coating can attach to more delicate materials to be carried while metal or hard plastic can be used in instances where these needs may be less important.

FIG. 14E shows an example embodiment of a perspective cross-sectional view of a coupled male portion 1406*e*, female portion 1400*e* and installation section 1408*e*. In the example embodiment holes 1410*e* are shown in the female section for instance where screws can secure the female portion 1400*e* to the installation section 1408*e*.

Figure 15:
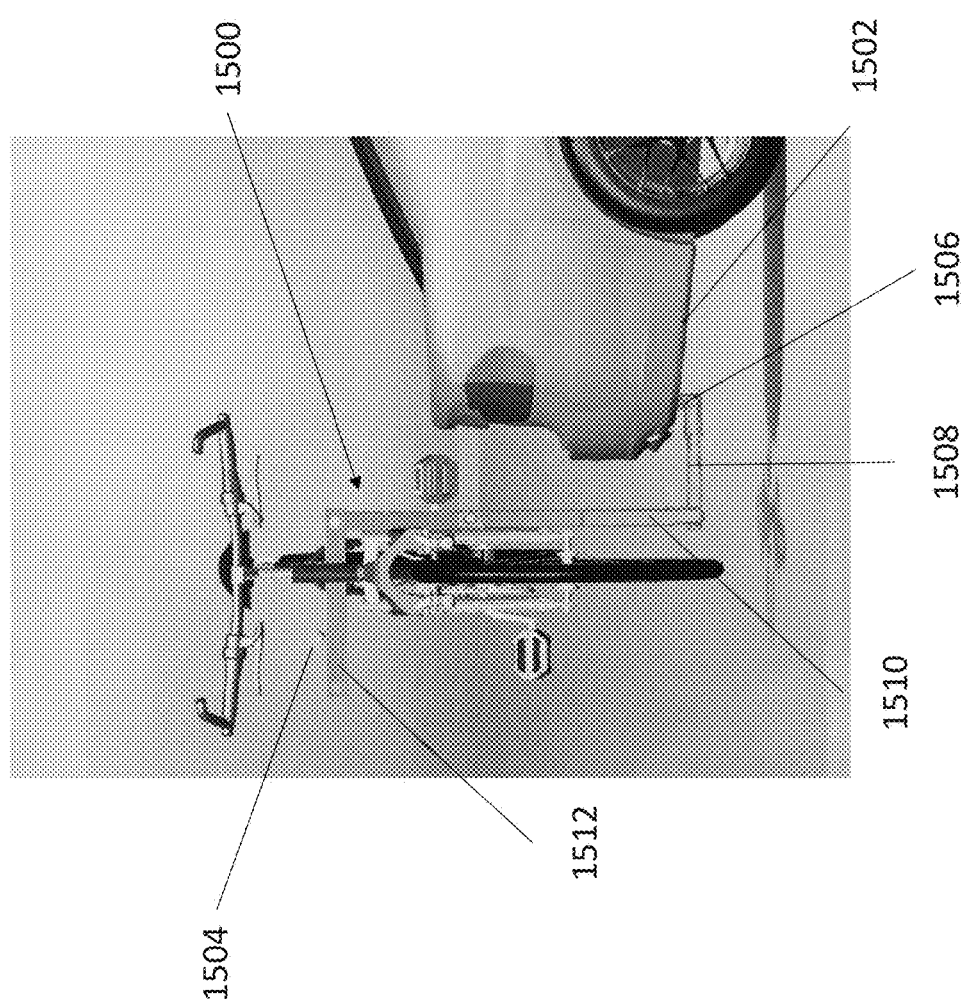
FIG. 15 shows an example embodiment of a cargo carrier bar attached to a vehicle undercarriage via a classic tow hitch and via a hitch receiver integrated into the trunk lid.

FIG. 15 shows an example embodiment of a cargo carrier bar 1500 attached to a vehicle undercarriage 1502. Various existing third party receiver hitches 1506 can be attached to a vehicle can be retrofitted in some embodiments by coupling a compatible receiver unit bar and a tethered cover. In some embodiments, cargo carrier bar 1500 can be attached or coupled to various other third party carrier systems using compatible adaptors. A bicycle locking mechanism comprising the trapezoidal system described herein can be used in some embodiments. The female trapezoidal bike lock (obscured) can have a flexible, cut resistant cable in which one end can be a loop of cable and the other end can be a female trapezoid unit. When needed, the female trapezoid mount on the bicycle can be separated from the male trapezoid 1504 and the cable can be looped around a stationary bar (to which the bike can be locked). The female trapezoid unit of the cable can be brought through the other looped end of the cable and then female trapezoid engaged with the male trapezoid. A bike lock utilizing the trapezoid mounts can involve a multitude of connections. There can be adaptors made between current bike locks and the trapezoid mount so that they can utilize the trapezoid system. There can be a couple (or more) male trapezoid mounts on bike between which a cable or folding bars can be securely spanned and then, when needed to lock the bike, they can be removed from the trapezoids, wrapped around a stationary bike rack and then connected back to both trapezoids. One of the female trapezoids on the locking cable or bar can also have a make trapezoid on the back side of the female trapezoid onto which the female trapezoid on the other side of the cable or bar can be locked.

In some embodiments, where a cargo carrier bar 1500 has a primary transportation bar 1508 mounted directly into the car, such as in a car trunk area or otherwise, a button can be pressed that electromechanically or mechanically automatically extends the primary bar from a nested location within the body of the vehicle into a transport configuration where it extends out of the vehicle. In some embodiments this can be performed manually. It should be noted that additional components are required in many these embodiments including wiring, power, and others. Remaining secondary bars 1510 and tertiary bars 1512 may be designed to also automatically unfold, telescope or otherwise extend into a transportation configuration or be manually coupled to primary bar 1508 by a user once it has been extended and as such, be stored separately.

In some embodiments primary transport bar 1508 can be permanently or removably incorporated into the outer fascia or other surface of a rear of an automobile and then manually or automatically rotated or unfolded outward into the transportation configuration before being locked into position using a locking mechanism.

In various embodiments, attachments can be custom developed for specific cargo that attaches either to male trapezoids 1504, female attachments (not shown), or directly to one or more carrier bars such as 1508, 1510, 1512, or others. A non-exhaustive list of examples includes walkers; baby strollers; gardening bins; toolboxes; television or other video monitor screen for parties, tailgating or advertising or numerous others.

Specific attachments can be used to connect or couple primary transport bar 1508 to receiver units or other tow hitches mounted in various locations around a car including roof racks, roof toboggan type cargo bins, and others. As such, secondary bar 1510 may extend vertically downward in some embodiments.

In embodiments where receiver units are integrated into the rear of a vehicle, a mechanism to secure a primary transport bar such as 1508 can automatically engage or lock when the primary transport bar 1508 is inserted so a user does not wonder if bar is locked. This mechanism can be a simple spring latch that is moved out of position when the primary transport bar 1508 is inserted and which springs through a hole or other opening in a wall of primary transport bar 1508. This can function similarly to the latch mechanism in many vehicle doors. The spring latch can be unlatched automatically with a remote controlled press of a communicatively coupled button with proper circuitry or manually by opening a trunk lid and disengaging the latch.

Although the vehicle in the example embodiment is a motorized automobile, it should be understood that the systems, apparatuses and methods disclosed herein can be applied equally effectively to non-motorized vehicles.

FIG. 16A shows an example embodiment of a perspective view of a female receiver 1600 for installation in a flat surface. In the example embodiment the female receiver 1600 can be installed such that the uppermost surface 1602 is flush with an upper surface of an item to be carried, such as a surfboard. In some embodiments the female receiver 1600 can be installed in a carrier bar with telescoping function to move upward and downward. This can allow bars to move without being blocked by the female receiver in order to nest bars inside one another for storage and easy carrying. In some embodiments the bars can telescope directly out of a complementary hole in the trunk or other location in a vehicle. The female receiver 1600 can have a narrow channel 1604 for securing a male portion. Additionally, the female receiver 1600 can have a wider opening section 1606 such that a male portion can be inserted and slid into position in the narrow channel 1604. Thus the sloped inner walls 1608 of the narrow channel 1604 of female receiver 1600 match the sloped walls of the male section. Additionally, a sloped section 1610 in the wider opening area 1606 across from the narrow channel 1604 can guide the male portion toward the narrow channel 1604. When this recessed female trapezoid mount 1600 is utilized in the main carrier bar, it can be oriented so that the wider section is closer to the rear of the vehicle. This can help keep the engaged male trapezoid and attached cargo abutted in the narrow channel when the vehicle is moving and also not require a separate vertical stop at end of carrier bar as a further safety mechanism.

FIG. 16B shows an example embodiment of a side cutaway view of a female receiver 1600 for installation in a flat surface. In the example embodiment the sloped section 1610 across from the narrow channel 1604 can be seen at the left of the figure. A small lip 1612 is shown which can help hold the male portion in place in the narrow channel 1604.

FIG. 16C shows an example embodiment of top-down view of a female receiver 1600 for installation in a flat surface. In the example embodiment the wider section 1606 is shown in the bottom half of the figure while the narrow channel 1604 is the upper half of the figure.

FIG. 16D shows an example embodiment of a perspective view of a female receiver 1600d for installation in a flat surface. In the example embodiment a deep channel 1614 is shown which can accommodate a different style of male section. In the example embodiment a male with extension can slide into the deep channel 1614.

FIG. 17A shows an example embodiment of a two bicycle carrier system 1700 with link securing mechanisms 1702. In the example embodiment a carrier bar setup 1700 can be attached to the rear of a vehicle (not shown) in order to support items such as the two bicycles shown. Two link securing mechanisms 1702 are provided in order to secure a cross bar of each bicycle or a horizontal bar of other cargo.

FIG. 17B shows an example embodiment of a two bicycle carrier system 1700 with link securing mechanisms 1702. In the example embodiment link securing mechanism are in the form of a chain with links 1704. This setup allows for flexibility and in some embodiments can allow diverse shapes of horizontal bars to be securely supported such as square, rectangular, triangular, or other cross sectional profile bars. Links 1704 can be held together by appropriate members including rods, screws, elastic bands, and others. In some embodiments clasping mechanisms can be used to secure opposing or disconnected sides of the chain to each other. Clasping mechanisms can be mechanical in nature, magnetic, electromagnetic, electromechanical, adhesive, or others.

FIG. 17C shows an example embodiment of a link securing mechanism 1702 attached to a carrier bar 1700. The linked band with the link securing mechanism is shown without a crossbar running through this band. In the example embodiment the link securing mechanism 1702 has been inserted into the female counterpart 1706 (e.g. 1600 of FIG. 16A) of the carrier bar 1700. A screw 1708 can be seen protruding out the top of the solid link securing mechanism. When a cross bar is placed within the linked band, this screw can be tightened (prior to inserting link securing mechanism into carrier bar) and thus secure the band to the bar. Other securing means can also be used including adhesives, nuts, bolts, solders, welds, and others. The male securing piece (obscured below the link securing mechanism) can then be slid into and out of a securing position with a complementary shaped female piece.

FIG. 17D shows an example embodiment of two link securing mechanisms 1702 attached to a carrier bar 1700. In some embodiments the link securing mechanism can be lowered into a recessed portion of the carrier bar for compact carrying. In some embodiments the base support section of the link securing mechanisms can be attached directly to a carrier bar. In some embodiments link securing mechanisms can be rotated about an axis running perpendicular to the openings on either side of the link securing mechanism. Link securing mechanisms can be folded or rolled into a compact position or a combination of folding and rolling.

Figure 18A:
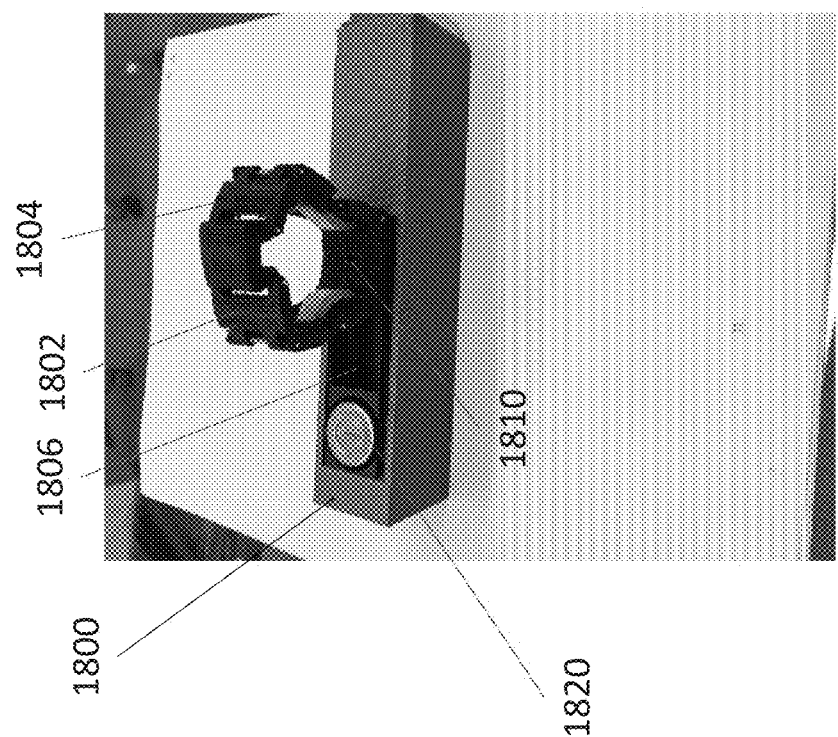
FIG. 18A shows an example embodiment of a link securing mechanism installed in a carrier bar.

FIG. 18A shows an example embodiment of a link securing mechanism 1802 installed in a female portion 1806 coupled with a carrier bar 1800 with several attached links 1804 forming a band and attached at a base 1810 a male securing mechanism (obscured) inserted into the female 1806 counterpart. This figure also shows a locking mechanism 1820 that locks a spring latch in a position in order to maintain the male part engaged in position with the female 1806 counterpart.

Figure 18B:
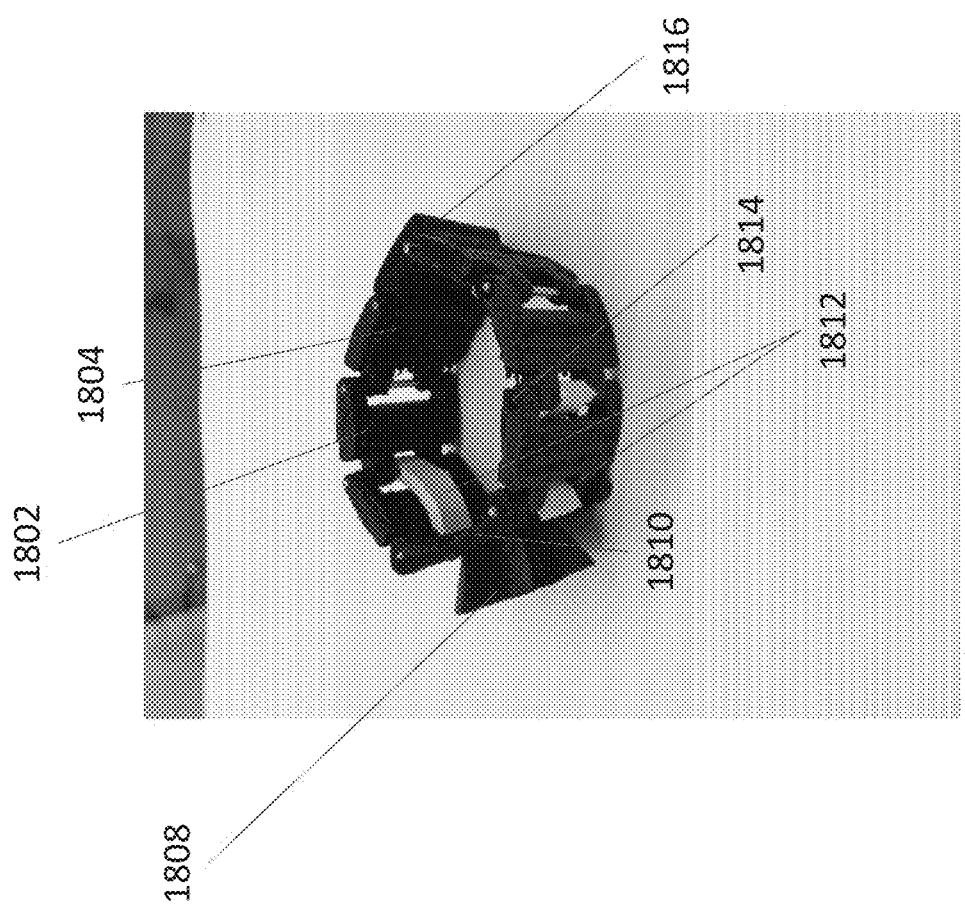
FIG. 18B shows an example embodiment of a link securing mechanism.

FIG. 18B shows an example embodiment of a link securing mechanism 1802. In the example embodiment two securing pieces 1812 are shown on the interior of the link securing mechanism 1802. These pieces can span across a link 1804 or between links 1804 and can be held in place by pins 1814 used to secure links 1804 to each other or extensions of the securing pieces 1812 being able to be inserted between the links 1804. Securing pieces 1812 can be rubber, foam or other material pieces can be soft such that they form around a bicycle crossbar and the material can have a high frictional coefficient such that the chance of the crossbar slipping is reduced. These pieces can also have enough firmness and depth to allow brake and gear shifting cables to run freely underneath the link securing mechanism 1802. Also shown is a male piece 1808 coupled with a base link 1810.

Figure 18C:
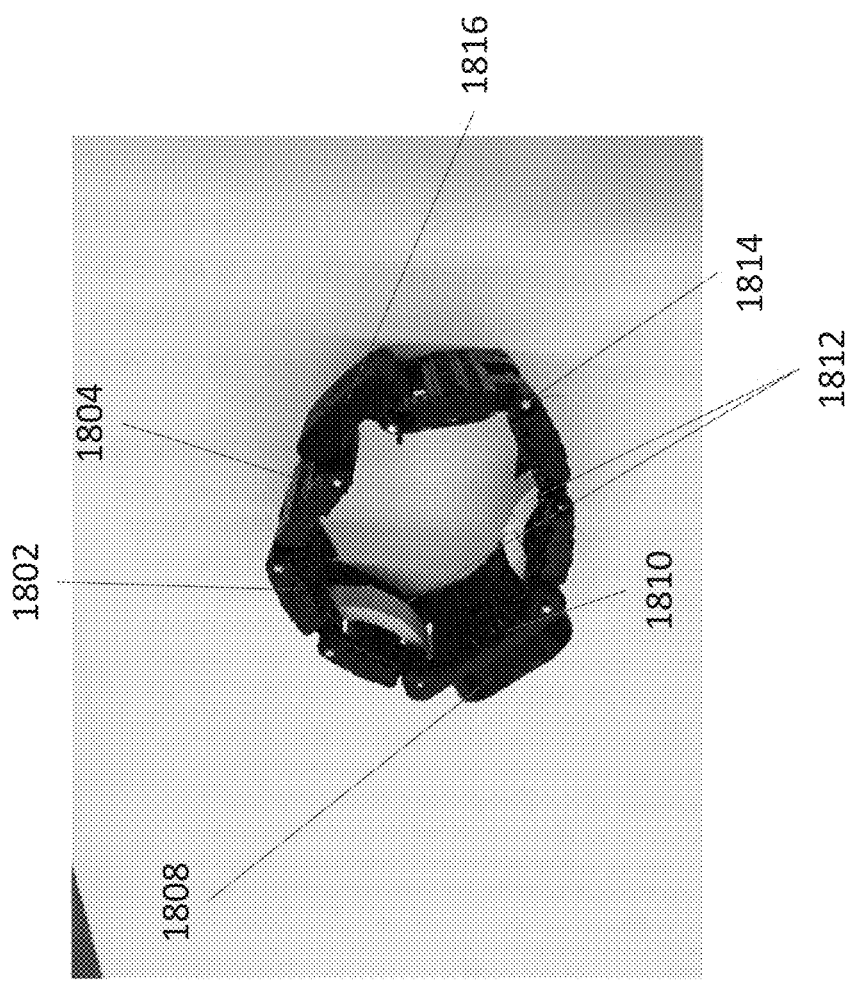
FIG. 18C shows an example embodiment of a link securing mechanism.

FIG. 18C shows an example embodiment of a link securing mechanism 1802. The example embodiment shows two securing pieces 1812 which can have holes through their ends such that bars or pins 1814 securing the links 1804 of the link securing mechanism 1802 fit through each end and the two securing pieces 1812 are held in place. Additionally, in some embodiments a clasp 1816 can be opened or closed in order to secure, unsecure or adjust link securing mechanism 1802 with an object to be held.

Figure 19A:
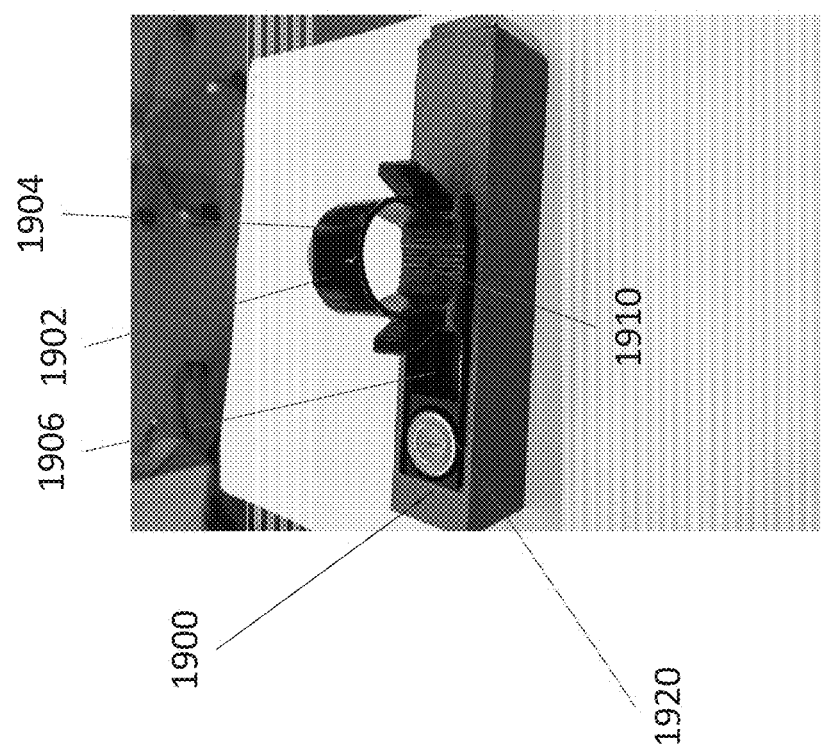
FIG. 19A shows an example embodiment of a strap securing mechanism installed in a carrier bar.

FIG. 19A shows an example embodiment of a strap securing mechanism 1902 installed in a carrier bar 1900. In some embodiments a strap 1904 of the strap securing mechanism 1902 can be affixed at one end of the strap securing mechanism 1902 with a free end which can be slipped into a complementary sized channel or channels to secure the strap 1904 in place. In some embodiments the strap 1904 is not affixed at either end to the strap securing mechanism 1902. This mechanism 1902 can also have a second U-shaped piece or other baseplate 1910 that sits on an inner surface of a male trapezoid unit with the ends that insert into a female trapezoid unit. The ends of this U-shaped body piece 1910 can have triangular pieces that engage the strap 1904 when a central screw in the male trapezoid unit is tightened. This configuration can prevent anyone from disconnecting the strap 1904 or band from the male trapezoid unit when this band 1904 is engaged on the carrier bar 1900 or when, a bike lock is engaged on to the trapezoid unit. Also shown is a locking mechanism 1920 for security purposes.

Figure 19B:
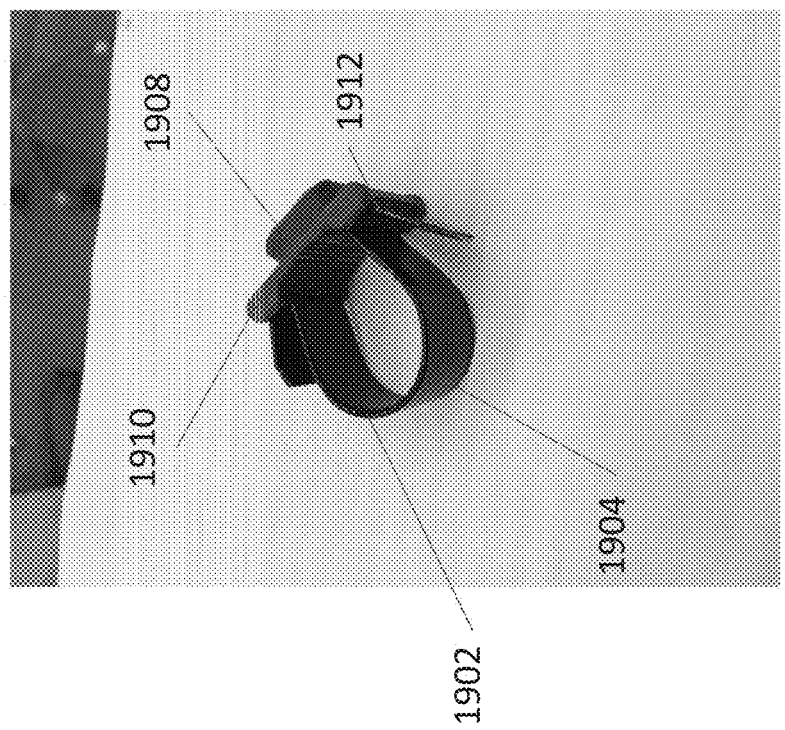
FIG. 19B shows an example embodiment of a strap securing mechanism.

FIG. 19B shows an example embodiment of a strap securing mechanism 1902. In the example embodiment each end of the strap fits through a "U" shaped channel 1912 in the body piece 1910. In some embodiments a first end of the strap can be inserted into a slot which runs through the body of the strap securing mechanism and exits near the second end of the strap. The strap can be a cut-resistant wire (or other material) and mesh (with or without a rubber like coating) that is strong and versatile and will not break or tear.

Figure 19C:
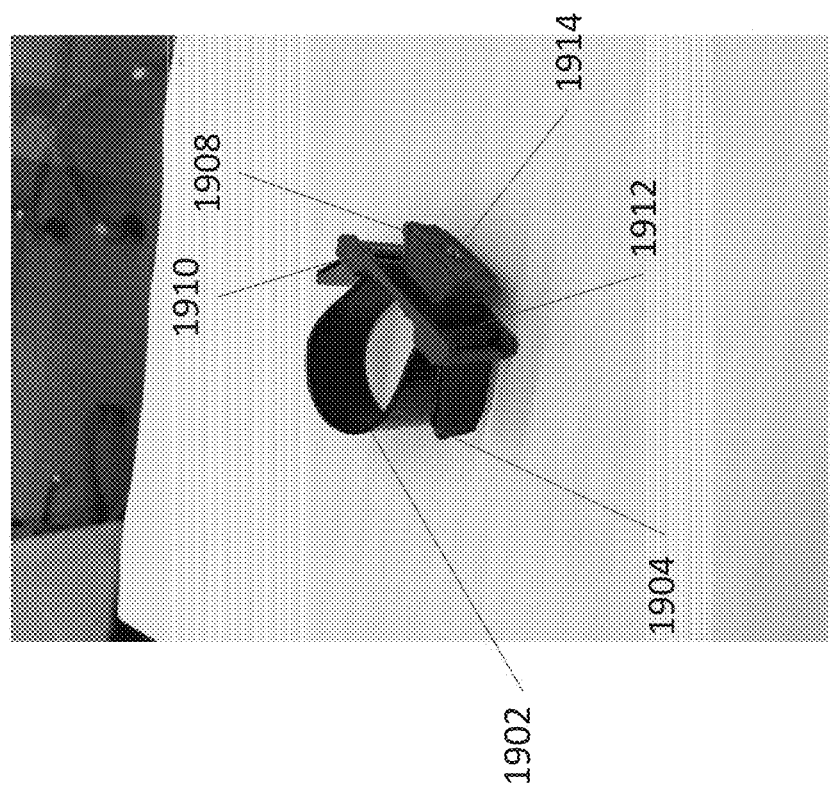
FIG. 19C shows an example embodiment of a strap securing mechanism.

FIG. 19C shows an example embodiment of a strap securing mechanism 1902. In the example embodiment a male piece 1912 is attached to a body 1910 of the strap securing mechanism using a screw 1914. In other embodiments the structure can be monolithic. In some embodiments the body portion 1910 of the strap securing mechanism 1902 can rotate with respect to the male portion 1908 such that different orientations of the device can be achieved. The male portion 1908 and complementary channel in a female receiver have a trapezoidal cross section but can have any number of other cross sectional profiles including and not limited to an hourglass shape.

Figure 20A:
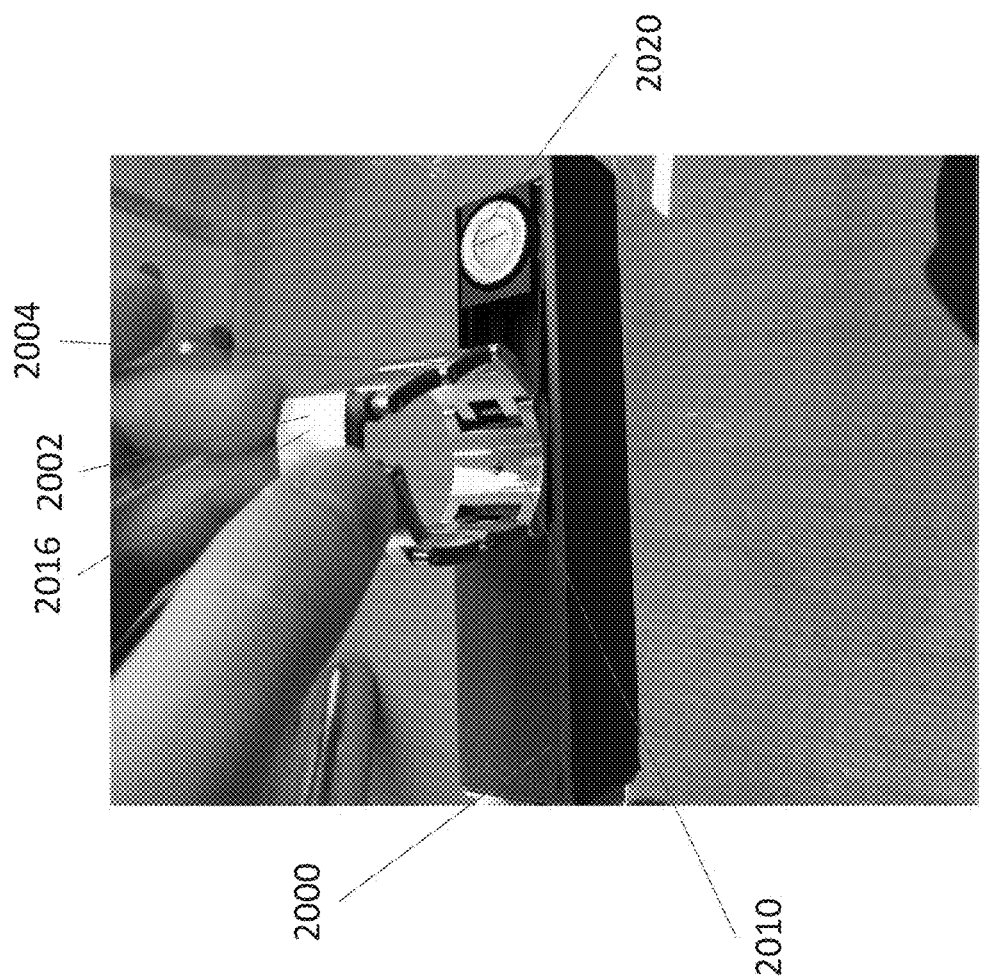
FIG. 20A shows an example embodiment of a link securing mechanism installed in a carrier bar.

FIG. 20A shows an example embodiment of a link securing mechanism 2002 with links 2004, clasp 2016 and base piece 2010 installed in a carrier bar 2000 with a locking mechanism 2020 in place.

Figure 20B:
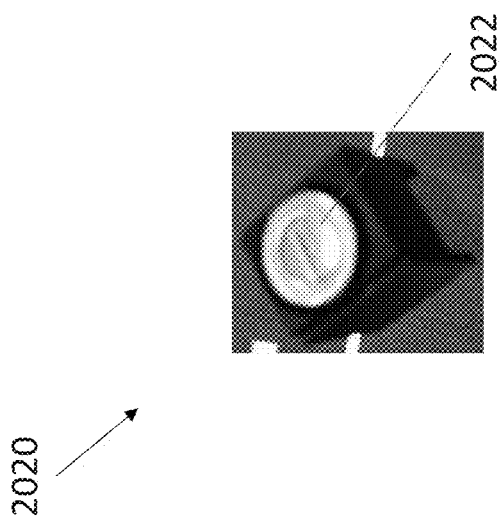
FIG. 20B shows an example embodiment of a securing lock.

FIG. 20B shows an example embodiment of a securing lock 2020. In the example embodiment the lock can be a standalone piece which is inserted into a carrier bar after a female receiver as shown in FIG. 20A. The lock keyhole 2022 can be engaged by inserting an appropriate key which turns one or more clasps and secures a male trapezoid unit to a female receiver in the carrier bar. In other embodiments the lock can be part of a larger structure which includes the female receiver piece.

Figure 20C:
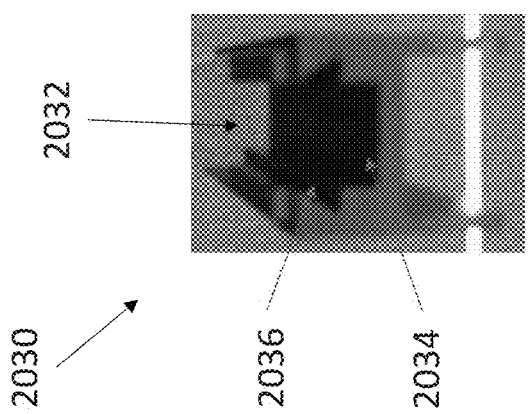
FIG. 20C shows an example embodiment of a female receiver.

FIG. 20C shows an example embodiment of a female receiver 2030. In the example embodiment a channel 2032 is shown which is complementary in size to male securing pieces. The channel 2032 shown has a rectangular bottom section 2034 and a trapezoidal upper section 2036.

Figure 20D:
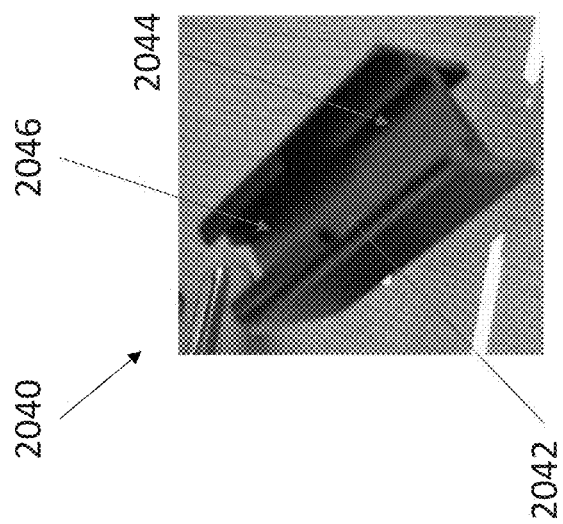
FIG. 20D shows an example embodiment of a female receiver.

FIG. 20D shows an example embodiment of a female receiver 2040. In the example embodiment a channel 2042 is shown with a wider section 2044 at one end where a male receiver can be put in alignment with a narrower complementary section 2046 before sliding into the narrower section 2046 to securely couple the female receiver 2040 and male section.

FIG. 20E shows an example embodiment of a link securing mechanism 2002 with a male piece 2008. As shown, the link securing mechanism 2002 can be an independent structure which is removable from a larger carrier system. The link securing mechanism 2002 can be used to secure items with the male/female connection to any bar which the link securing mechanism 2002 is attached to. In some embodiments the link securing mechanism 2002 can have a locking mechanism which prevents removal by unauthorized individuals. As shown, a base piece 2010 is permanently coupled with the male piece 2008 in a monolithic structure in some embodiments. Numerous links 2004 are coupled using pins or bars 2014 with each other, base piece 2010 and clasp 2016. The interior surfaces of links 2004, base piece 2010 and clasp 2016 can be coated, coupled or otherwise covered with softer material than a primary metal or hard plastic in some embodiments in order to preserve whatever cargo bar they are carrying in optimal condition, such that it is not scratched or otherwise affected by friction between it and the link securing mechanism during transport.

It should be understood that various other mechanisms can be coupled with male or female pieces such as clasps or others using various coupling mechanisms. In some embodiments this can be a clamp with one or more screws, such as two to four, or a variably hinged clamp that has a traditional style bicycle cam-lock mechanism that mounts to a bicycle bar with a protective rubber-like scratch-less layer. Clamps with male trapezoids or pieces can be assembled for a wide variety of different types and styles of bicycle bars and with attached, permanently coupled or otherwise incorporated angular pieces for bicycle bars with angular bars, in order for the male trapezoid mount to be horizontal and parallel with the ground.

Figure 21A:
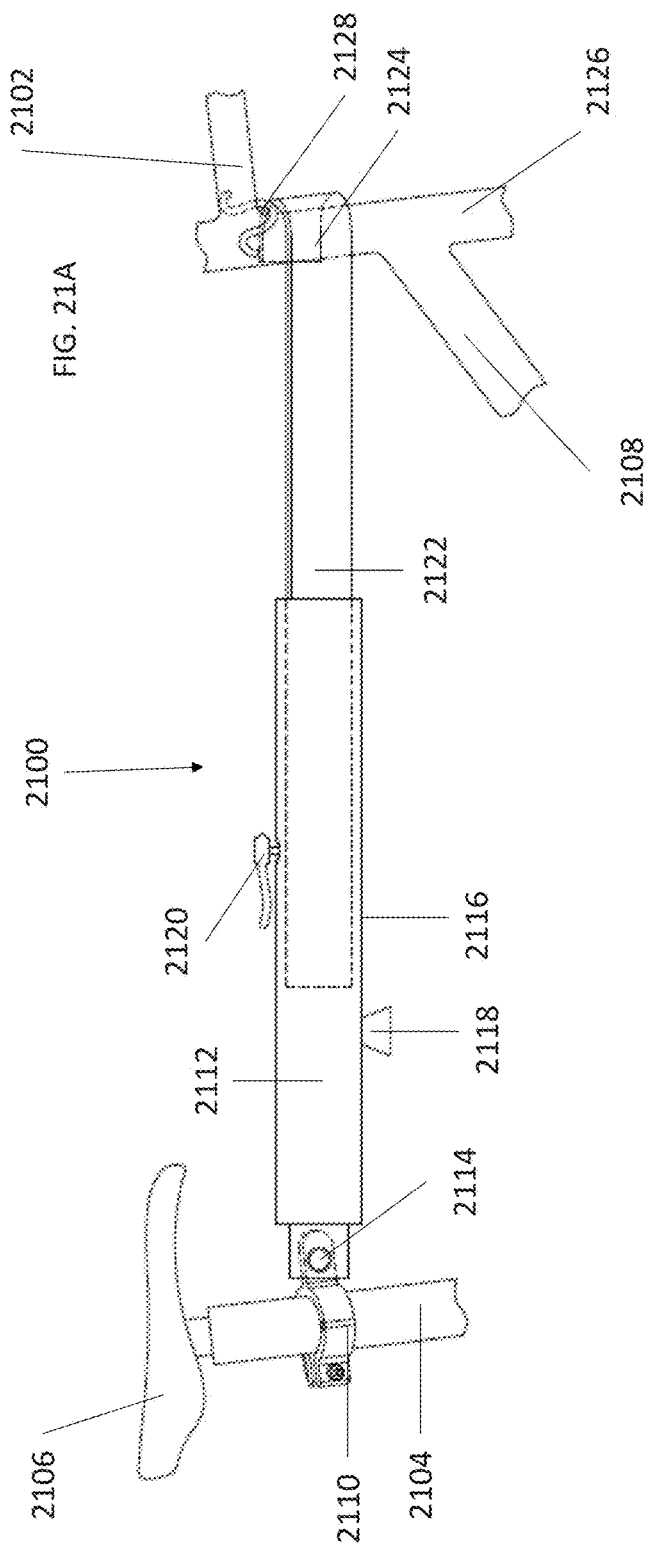
FIG. 21A shows an example embodiment of a side view of a removable, adjustable horizontal support adaptor bar.

FIG. 21A shows an example embodiment of a side view of a removable, adjustable horizontal support adaptor bar 2100. In the example embodiment a removable, extendable horizontal support adaptor bar 2100 is shown. Some modern bicycles are constructed in a fashion such that they do not have a horizontal bar between the user's legs extending from below the handlebar area 2102 to a vertical bar 2104 underneath the bicycle seat 2106. As shown in the example embodiment these types of bicycles can have other configurations with a bar such as angled bar 2108 extending downward and not directly horizontal. The removable, adjustable horizontal support adaptor bar 2100 can be used for such bicycles to provide a location for carrying the bicycle on a carrier bar as described herein using a male/female connection system, also described herein. In the example embodiment a clasp 2110 is shown at one end of the support bar 2100 which can be placed around the vertical bicycle seat support bar 2104. This clasp 2110 can be tightened using ratcheting mechanisms, screwing mechanisms, or various other appropriate tightening and securing components. Additionally, an interior surface of the clasp 2110 can include rubber or other pliable material which will not cause harm to the vertical bicycle seat support bar 2104 and provide a tight seal between the clasp 2110 and the vertical support bar 2104. The clasp 2110 can be coupled with a first bar sleeve 2112 by a hinge 1214 which allows for rotation about the hinge in a vertical plane. This hinge can be useful in instances where the vertical bicycle seat support bar 2104 is not perpendicular with a flat ground surface and allows the removable, adjustable horizontal support adaptor bar 2100 to be configured such that it is parallel with a flat ground surface or other desired angle. A lower surface 2116 of the first bar sleeve 2112 can include a male component 2118 as shown in the example embodiment or with a female component in alternate embodiments. Additionally, the first bar sleeve 2112 can include a securing mechanism 2120, shown in the example embodiment on an upper surface of the first bar sleeve. This securing mechanism 2120 can be used to secure the first bar sleeve 2112 with a male interior bar 2122. In the example embodiment the securing mechanism 2120 is a rotatable screw which can be twisted into place through mated grooves in a screw hole in the first bar sleeve 2112. In the example embodiment the male interior bar 2122 is shown with dotted lines to show it extending inside the first bar sleeve 2112. The male interior bar 2122 can have a hook 2124 at one end which can be wrapped around a vertical handlebar support post 2126. In various embodiments a rubber surface can also be provided on the inner surface of the hook 2124. A hook looping mechanism 2128 can be provided on an upper surface of the hook 2124 and can have the shape of a Texas Longhorn horns or simple vertical extensions that engage the anteriorly projecting handlebar post 2102. The hook looping mechanism 2128 can provide two locations (one on either side of a handlebar support bar) at which a rubber strap, thread or other securing component (not shown) can be wrapped in order to hold the hook 2124 in place.

FIG. 21B shows an example embodiment of a top view of a removable, adjustable horizontal support adaptor bar 2100. In the example embodiment the male support piece 2118 is shown with dotted lines to indicate it is located on the bottom surface of the first bar sleeve 2112. Although removable, adjustable horizontal support adaptor bar 2100 is shown as having rectangular sleeve 2112 and male interior bar 2122 components with a square cross section, it should be understood that these could also have circular, triangular, or other cross sections in various embodiments. Additionally, in some embodiments the removable, adjustable horizontal support adaptor bar 2100 can be installed in an opposite orientation with the hook 2124 coupled to the vertical bicycle support bar 2104 and the clasp 2110 coupled to the vertical handlebar support bar 2126.

Figure 21C:
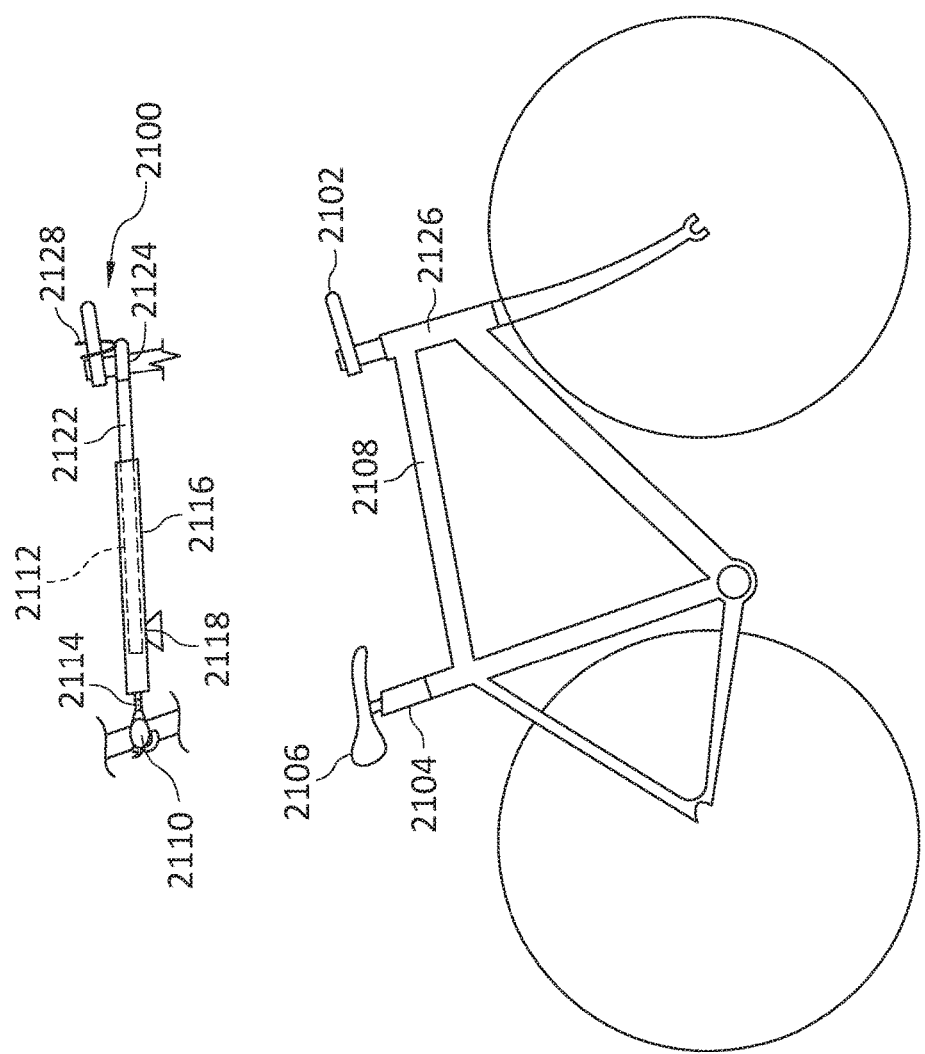
FIG. 21C shows an example an example embodiment of a top view of a removable, adjustable horizontal support adaptor bar.

FIG. 21C shows an example embodiment of a top view of a removable, adjustable horizontal support adaptor bar 2100. In the example embodiment, clasp 2110 can be a quick release mechanism. Hinge 2114 can be dick and allow pivoting in only one plane thus allowing hook 2124 to move up and down to engage handlebars. Male piece 2118 can be located in a most likely center of gravity or mass zone such as nearer to a seat 2106. Male interior bar 2122 can include a slat of metal or other material behind hook 2124 in order to maintain it in position against vertical bar 2126.

In some embodiments, clasps such as clasp 2110 can be used on both ends of the removable, adjustable horizontal adaptor bar 2100. Likewise, in some embodiments hooks 2124 with securing mechanisms 2128 can be used on both ends of the removable, adjustable horizontal adaptor bar 2100.

FIG. 22A shows an example embodiment of a top view of a female receiver 2200 with a lock 2202. In the example embodiment a female receiver 2200 is shown with a larger input area 2204 that also includes an extended arm portion 2206 of a lock component 2202 and this larger input area 2204 can receive a male trapezoidal component. In use, a user can insert a key into the lock 2202 and twist (for instance ninety degrees) before pushing the lock 2202 down (compressing a spring) which in turn pushes down the extended arm 2206 down. The male trapezoidal component can then be inserted into the larger input area 2204 and slid into a narrower channel 2208. The user can then turn the key back to its original position which decompresses the spring and in turn pushes the lock 2202 and arm portion 2206 back to their original positions. The arm portion 2206 is then in a position to block the male portion from sliding out of the narrower channel 2208 and subsequently out of the input area 2204. In order to remove the male trapezoidal component, the user engages the lock 2202 and spring as described above, slides the male trapezoidal component from narrower channel 2208 into the input area 2204 and removes. In an alternate version, the key could be in an unlocked position that allows the arm 2206 to be pushed down by the male trapezoid. Once the male trapezoid is then slid into the female trapezoid channel 2208, then the bar or arm 2206 would automatically be pushed back upwards by a spring in the key lock mechanism 2202, thus securing the male trapezoid in the female trapezoid narrow channel 2208. The key could then be turned to lock the bar 2206 in the up position.

FIG. 22B shows an example embodiment of a side view of a female receiver 2200 with a lock 2202. The example embodiment shows how the lock 2202 can be moved up and down within a lock channel 2210 to compress and decompress a spring 2212. As lock 2202 and arm portion 2206 can be a monolithic structure, arm portion 2206 can move up and down in an appropriately sized channel.

FIG. 23A shows an example embodiment of a perspective view of a female receiver clip 2300*a*. In the example embodiment the female receiver clip 2300*a* can be attached to an object to be carried and coupled to a male trapezoidal component on a bicycle for carrying the item. In the example embodiment various holes 2302*a* are provided in a mounting wall for mounting to an item. For items with hard surfaces, screws or nails can be mounted directly into the surface of the item through holes 2302*a*. For example, hard plastic suitcases. For items with soft surfaces, a backing plate (not shown) can be arranged on the inner side of the mounting location and screws or nails can be inserted through holes 2302*a*, through the soft surface and mounted to the backing plate. For example, a soft suitcase such as a fabric suitcase. Other mountings are contemplated as well. A blocking wall 2304*a* is provided at one end of a channel 2306 of the female receiver clip 2300*a* to prevent a male component from sliding completely through the female receiver 2300*a*. An oval shaped opening area 2308 is created above channel 2306 where a portion of a male trapezoidal portion can extend through. The oval shaped area 2308 includes rounded points 2310 which create a "clip" area to prevent a male portion from sliding back out an input channel opening 2312. It should be understood that oval shaped area 2308 can be different shapes in different embodiments including rounded, square, rectangular, or others. Shown in the example embodiment is an end stop 2314 which can be pushed down and which can be biased to return to a normal configuration as shown. The end stop 2314 can hold a male portion in place by fitting snugly against an end surface of the male portion.

FIG. 23B shows an example embodiment of a cross sectional view of a female receiver 2300*b*. In the example embodiment the trapezoidal female section channel 2306 is shown which receives a complementary male piece. The trapezoidal female section channel 2306 has overhangs 23 which create a channel for securing the male portion in place and preventing it from rocking or swaying. Also shown are screw hole channels 2302 with flared top sections such that the top of the screw heads can lie flush with an upper surface 2316 of the bottom section 2318 of the female receiver 2300*b*.

FIG. 23C shows an example embodiment of a top view of a female receiver 2300*c*. In the example embodiment four main screw holes 2302*c* are shown as well as four minor screw holes 2320 with different diameters and features. All eight holes 2302*c* and 2320 can be used in some embodiments where a more secure hold is desired. Any combination of holes might be used in various embodiments, with different numbers of holes as well. In some embodiments, small grooves between the holes could be placed to allow the passage of thread or wire to secure objects to these female trapezoid clips 2300c.

Figure 24:
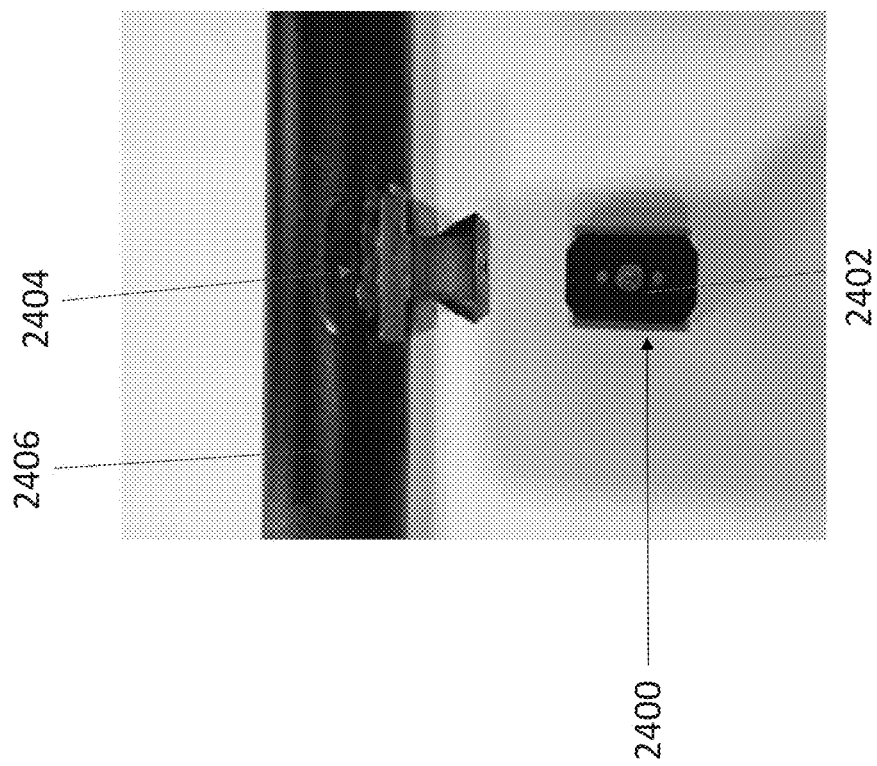
FIG. 24 shows an example embodiment of a female receiver clip view from above the receiver area and a side view of a male linking unit mounted on a bar.

FIG. 24 shows an example embodiment of a female receiver clip 2400 view from above the receiver area 2402 and a side view of a male linking unit 2404 mounted on a bar 2406. In some embodiments an attachment for a male trapezoid 2404 mounted, for instance by welding to a bar 2406 can create a smooth, contoured or otherwise ergonomic surface by coupling it with the male trapezoid so that a user can carry at the welding location easily.

Figure 25:
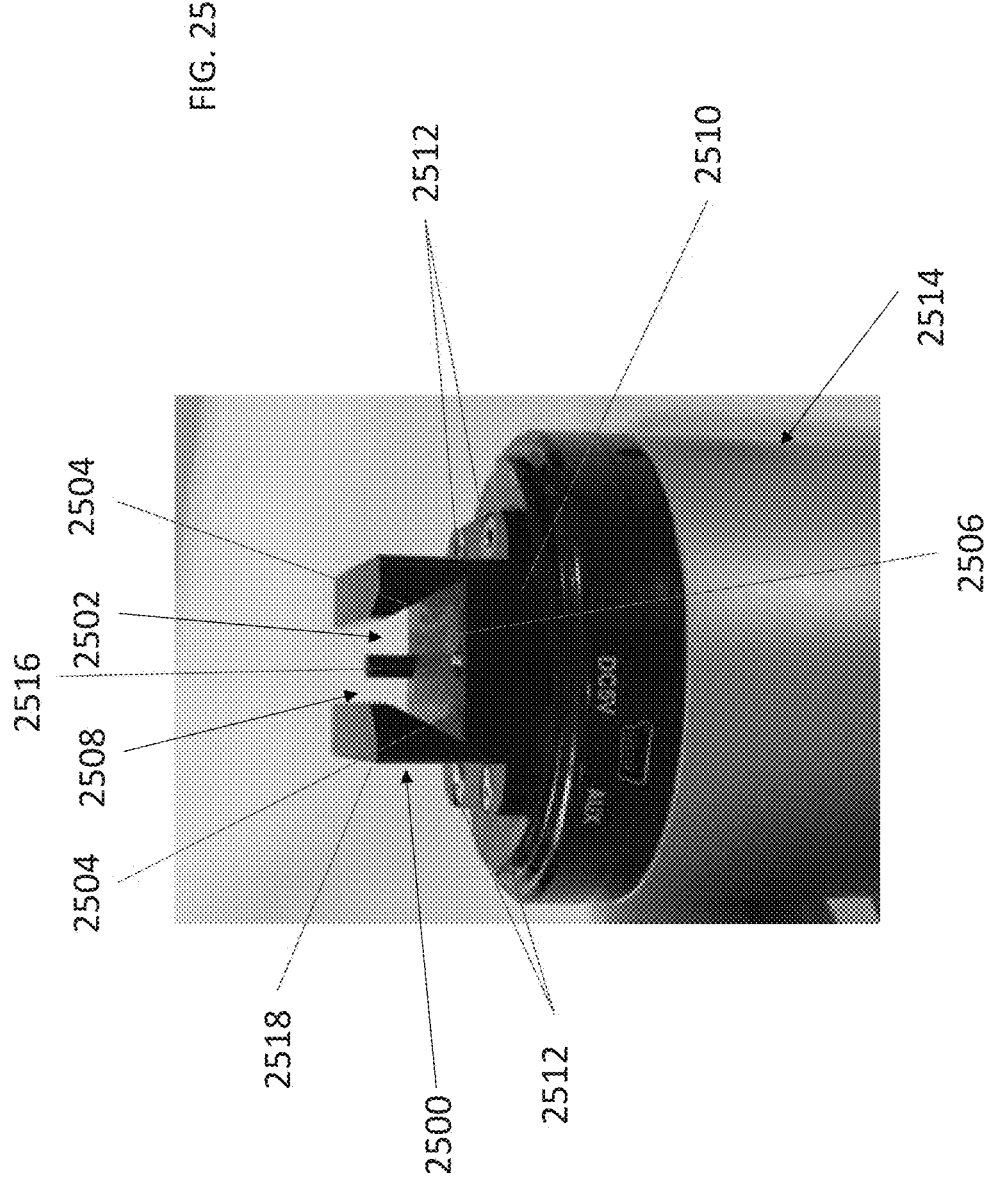
FIG. 25 shows an example embodiment of a female receiver clip viewed from a side perspective down a receiving channel with mounting screws.

FIG. 25 shows an example embodiment of a female receiver clip 2500 viewed from a side perspective down a receiving channel 2502 defined by sloped walls 2504, surface 2506, backstop 2516 and open top 2508. A mounting plate 2510 of female receiver clip 2500 allows for screws 2512 to be used to mount female receiver clip 2500 to object 2514.

Figure 26:
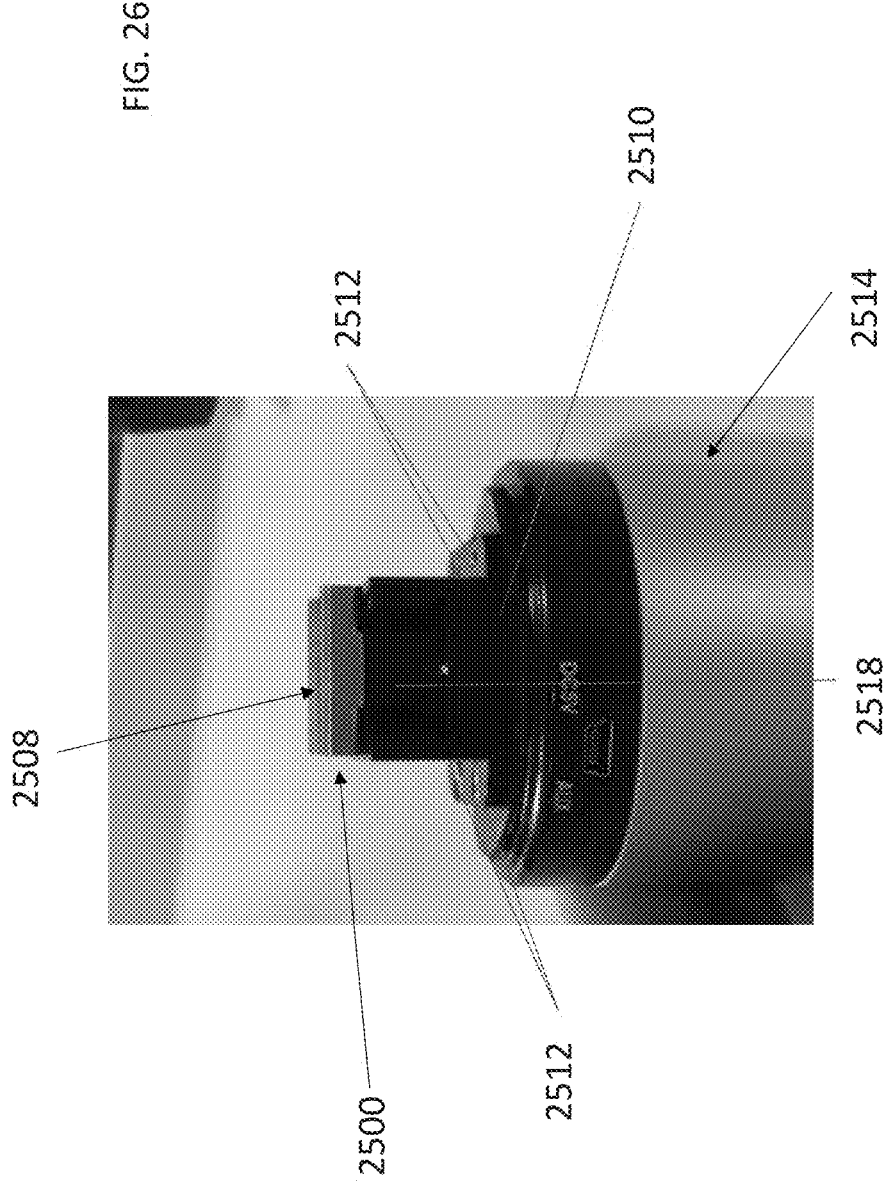
FIG. 26 shows an example embodiment of a female receiver clip viewed from a side perspective along a wall of a receiving channel with mounting screws.

FIG. 26 shows an example embodiment of a female receiver clip 2500 viewed from a side perspective along an outer wall 2518 of a receiving channel (obscured) with mounting screws 2512.

Figure 27:
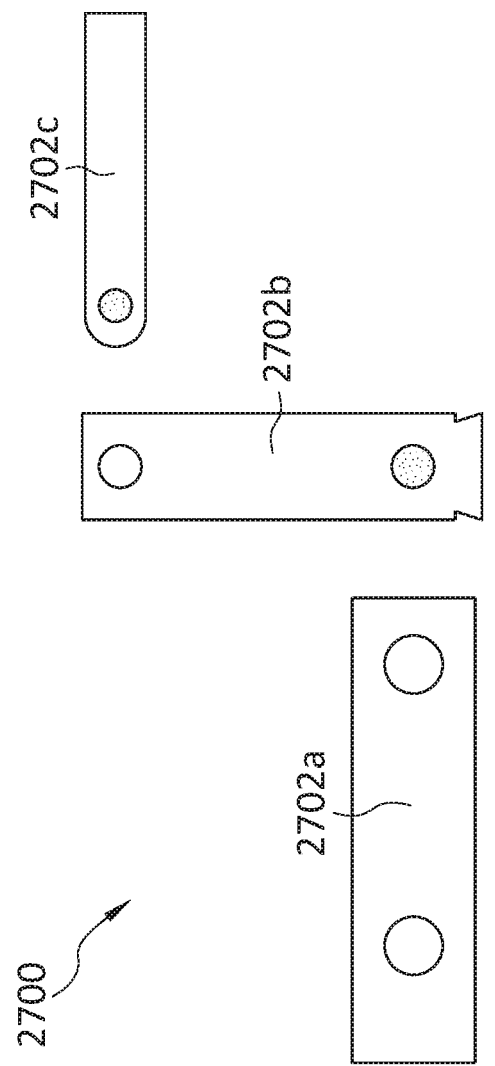
FIG. 27 shows an example embodiment of various transitional carrier bars in a deconstructed form.

FIG. 27 shows an example embodiment of various transitional carrier bars 2702a-c in a deconstructed form. A primary bar 2702a, a secondary bar 2702b and a tertiary or main carrier bar 2703c can be assembled in the example embodiment. Main carrier bar 2703c can house female trapezoid mounts in some embodiments. Tertiary bar 2703c can be inserted into a hole in a side of secondary bar 2703b and secondary bar 2703b can be inserted into primary bar 2703a which can be inserted into an upper carrier hitch in a vehicle for full assembly.

Transitional carrier bars can include transportation bars and storage bars in some embodiments. Transportation bars can be telescopic, modular, lockable ones that attach to the transporting vehicle. Storage bars can be less expensive and therefore simpler in design with an attached end on the bar that allows bar to be attached directly to the wall with screws or other connectors or simply directly to a slatted wall with complementary sized slats, holes or other locations (e.g. see FIG. 29). Storage bars may have an inexpensive female trapezoid slot in them to help keep cargo from swaying on a wall when stored and maintain their connected objects location. In some embodiments, storage bars can include a secondary removable or fixed vertical storage bar that can be attached to a bar connected to a wall that can hold cargo bins or other pods, such as those shown in FIG. 11F.

Figure 28:
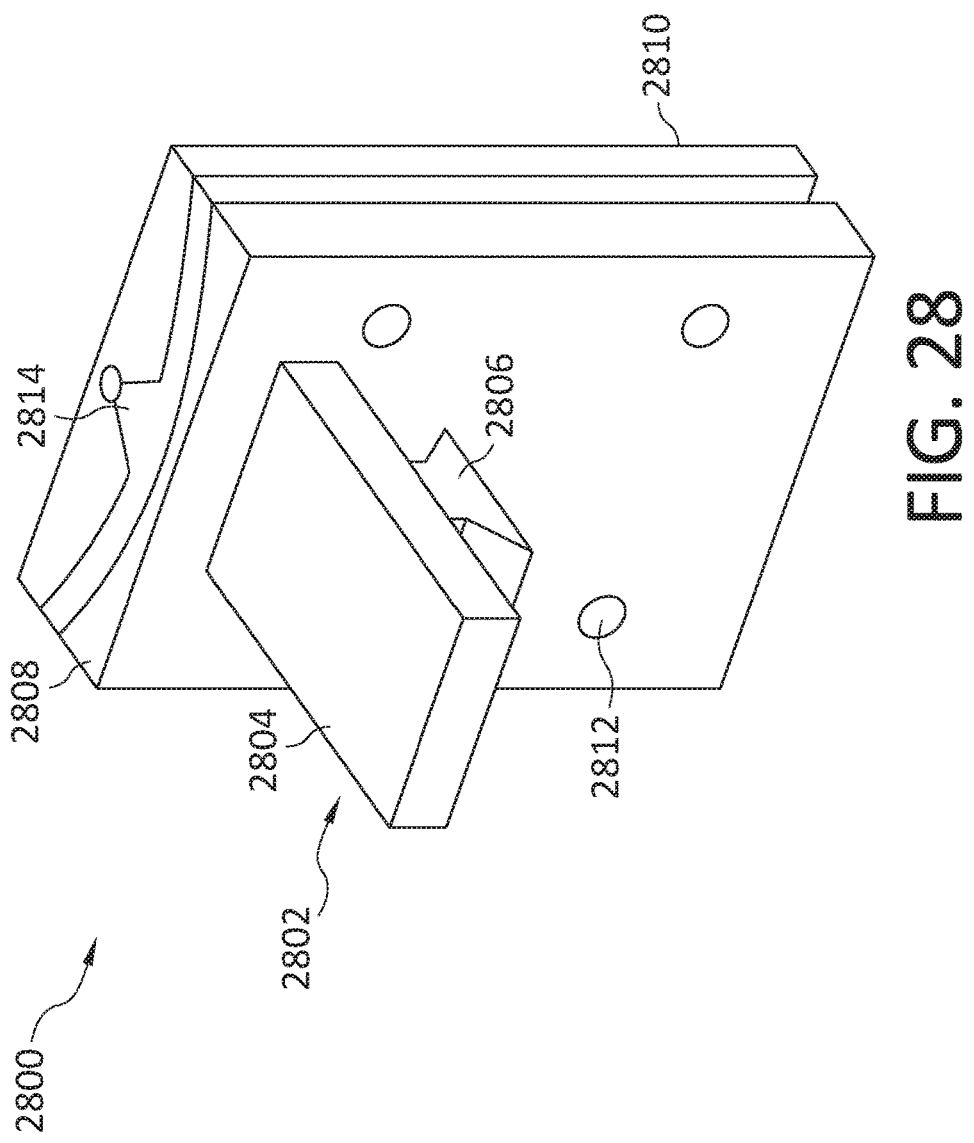
FIG. 28 shows an example embodiment of a golf bag attachment 2800 with a male attachment piece.

FIG. 28 shows an example embodiment of a golf bag attachment 2800 with a male attachment piece 2802. The male attachment piece 2802 can include a base 2804 and a coupled male trapezoidal piece 2806. In the example embodiment the base 2804 is oriented in a horizontal fashion such that the male trapezoidal piece 2806 is below the base 2804 but this can be oriented differently in different embodiments such as vertically or with the male trapezoidal piece 2806 above the base 2804. Male attachment piece 2802 can be removably or permanently coupled with a mounting outer panel 2808 that can be coupled with a mounting inner panel 2810 by a variety of fashions. As shown, screws 2812 are used but clips, nails and others are also possible. Outer panel 2808 can be coupled with inner panel 2810, where outer panel 2808 can be placed outside a top collar region 2814 of a golf bag while inner panel 2810 can be placed inside the top collar 2814 before coupling. As such, the two panels 2808 can be secured to each other with golf bag collar 2814 sandwiched between them.

FIG. 29 shows an example embodiment of a storage bar 2900 with a wall mounting 2902 for coupling with a slatted wall 2904. In the example embodiment wall mounting 2902 can have a complementary size and configuration for fitting into channel 2906 of slatted wall 2904.

Figure 30A:
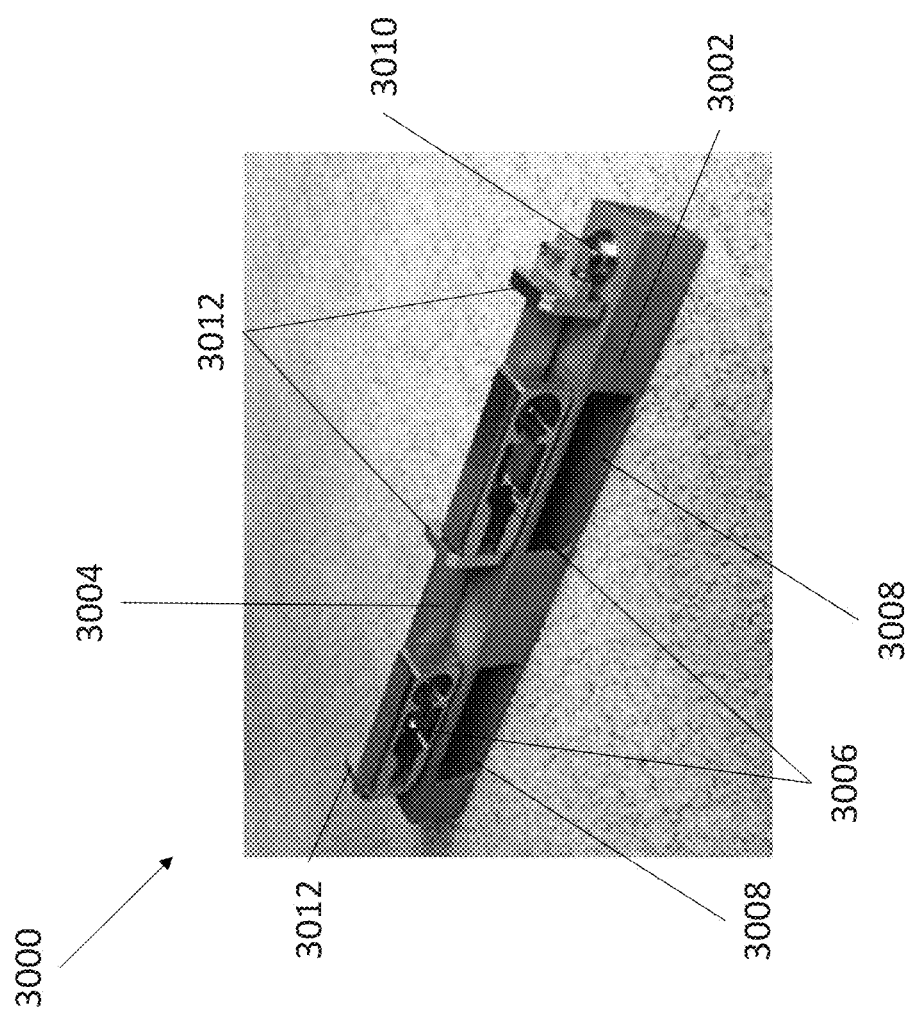
FIGS. 30A-30B show example embodiments of a tertiary transportation bar with a removable torsion bar resting on top of an outer shell.
Figure 30B:
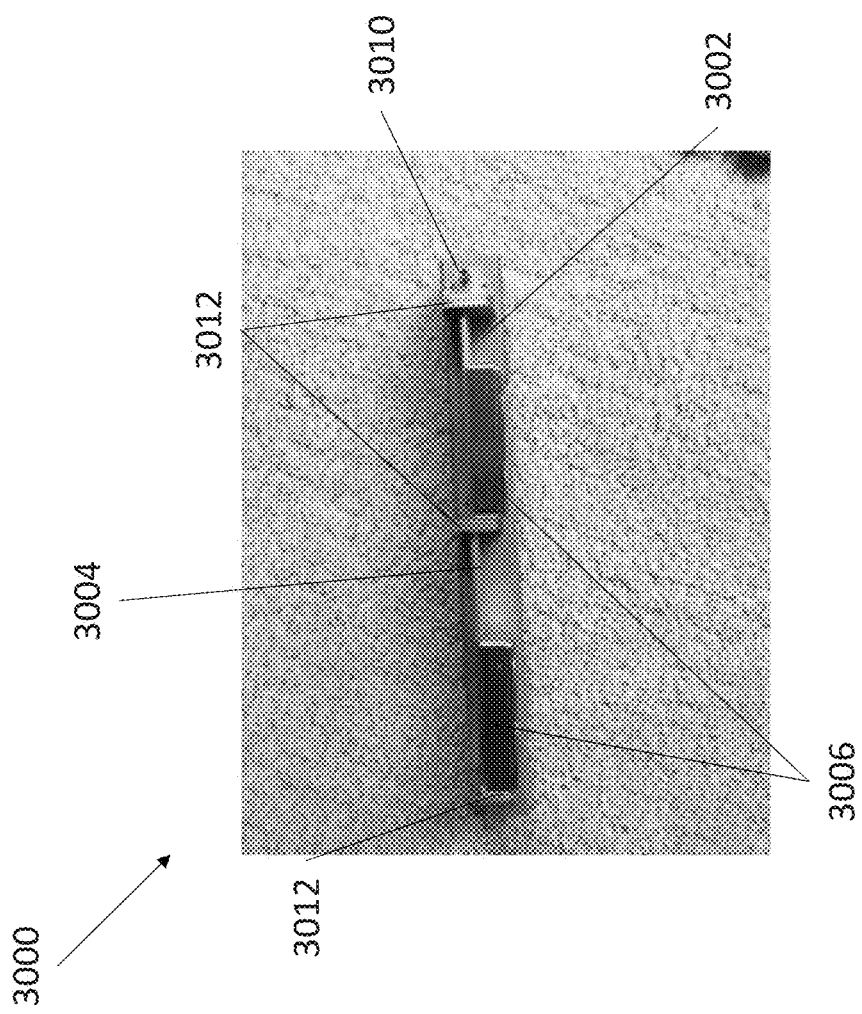

FIGS. 30A-30B show example embodiments of a tertiary transportation bar 3000 with a removable torsion bar 3004 resting on top of an outer shell 3002. In example embodiments, torsion bar 3004 can have various configurations such as flat, I-beam, H-beam or others and can be slid inside outer shell 3002 of tertiary bar 3000 to minimize torsion stresses. As shown, outer shell 3002 has openings 3008 of a size complementary to female sections 3006 that are permanently or removably coupled with torsion bar 3004. As such, when torsion bar 3004 is inserted into outer shell 3002 female sections 3006 can be aligned with openings 3008 before torsion bar is locked into place, for instance with a locking mechanism 3010. Numerous bolsters 3012 can be located at predetermined locations with an outer size and configuration matching or nearly matching an inner walls size and configuration of outer shell 3008 such that they are substantially fixed in place and coupled.

Figure 31:
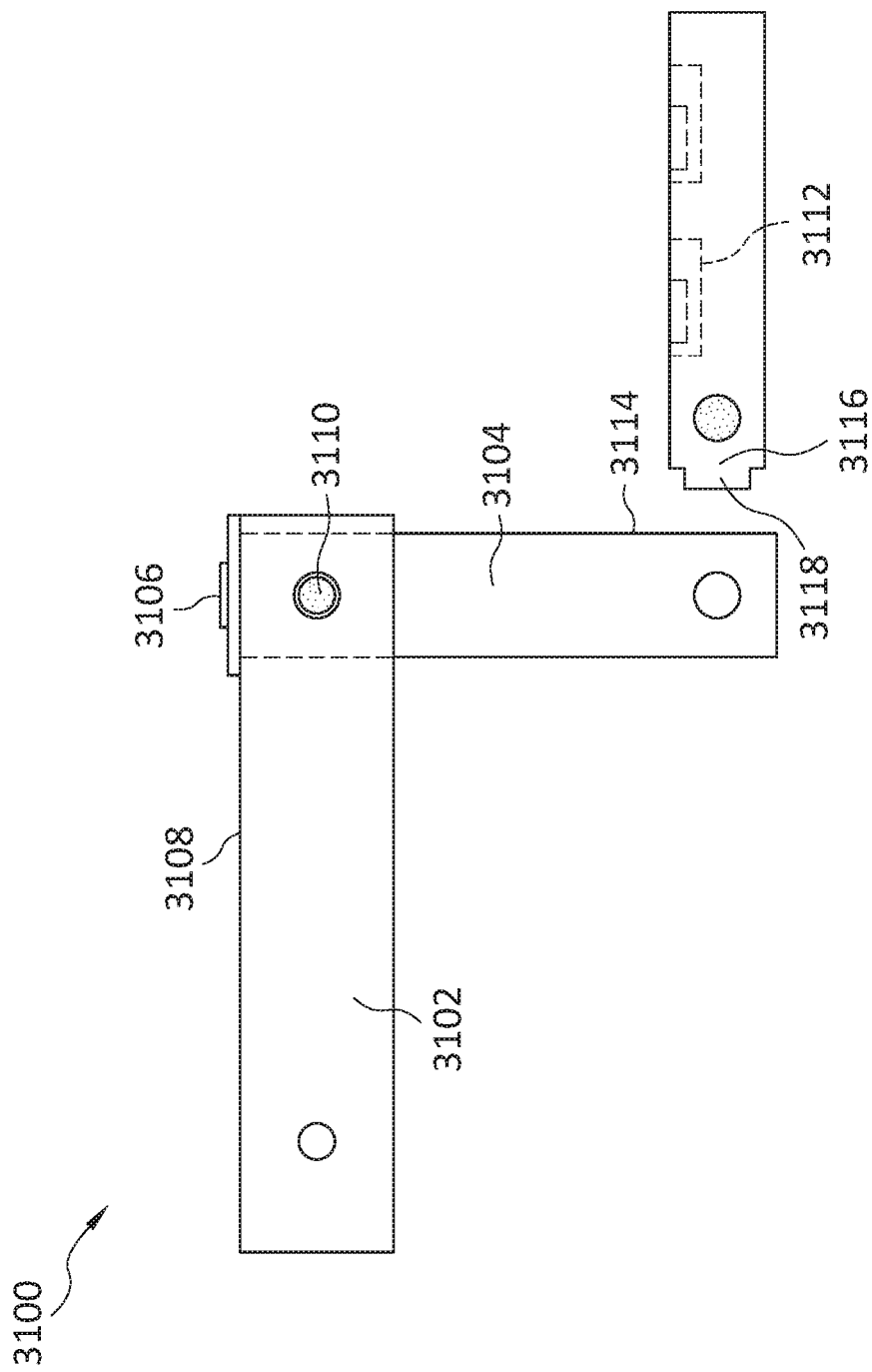
FIG. 31 shows an example embodiment of a roof carrier bar apparatus.

FIG. 31 shows an example embodiment of a roof carrier bar apparatus 3100. In the example embodiment, a primary bar 3102 can also have extended bar attachments to a roof rack or the roof toboggan type cargo bins. Secondary carrier bar 3104 can extend vertically downward from a coupled primary bar 3102 that extends outward from a roof coupling. A connection between primary bar 3102 and secondary bar 3104 can include secondary bar dropping through a distal hole in an upper and lower surface of primary bar with a top of secondary bar having a shoulder 3106 that engages an upper surface 3108 of primary bar 3102 and is larger than the hole in surface 3108. Button 3110 can be used to secure the engagement. Tertiary bar 3112 can be inserted into a hole in a side 3114 of secondary bar 3104 near its lower end. Tertiary bar 3112 can be produced similarly to other embodiments of tertiary bars but can have a cap (not shown) that is welded or otherwise affixed to a nipple 3116 on an insertable male end 3118 that couples with a complementary structure within secondary bar 3104.

Figure 32:
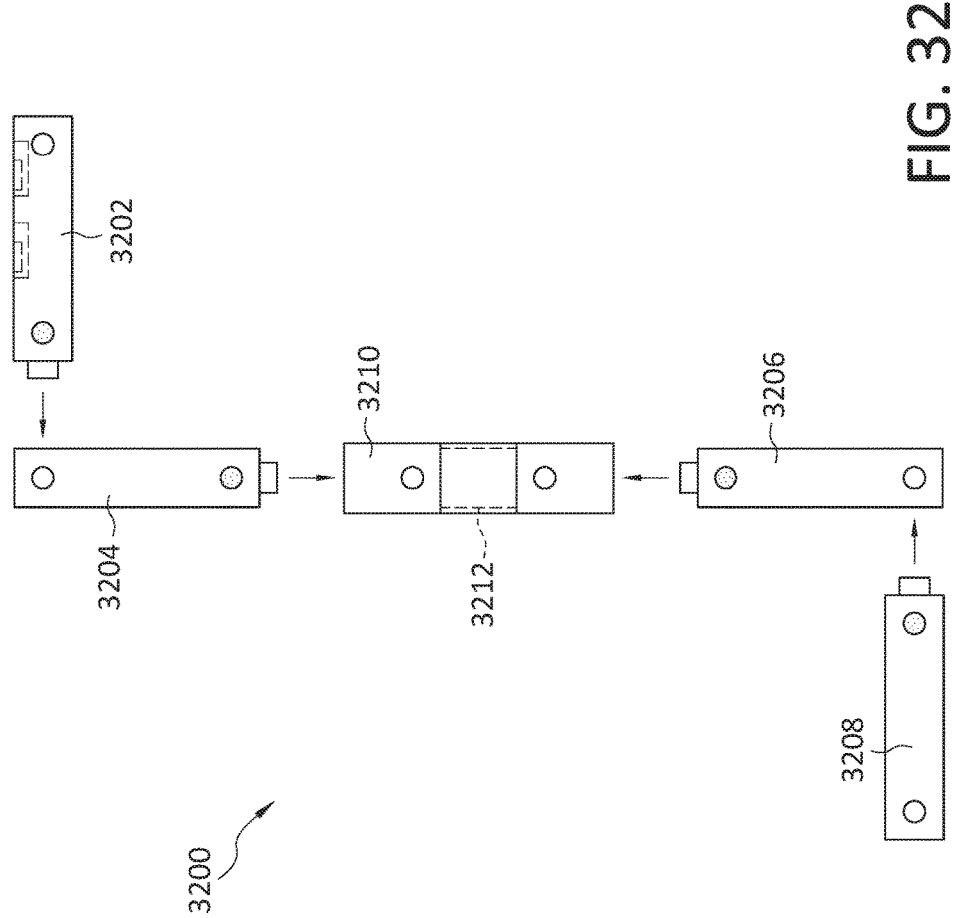
FIG. 32 shows an example embodiment of an extended carrier bar apparatus.

FIG. 32 shows an example embodiment of an extended carrier bar apparatus 3200. In the example embodiment, a tertiary bar 3202 and first secondary bar 3204 can be similar to those described previously with respect to FIG. 31. A second secondary bar 3206 can be similarly configured to the first secondary bar. An insertion bar 3108 can have similar or the same dimensions as tertiary bar 3102 and in some embodiments this can be a size operable to fit into and couple with a tow hitch such as a traditional 1.25-inch tow hitch. A connecter bar 3110 can have a diameter similar to the primary bar described previously with respect to FIG. 31 but can be longer and can have a secondary bar diameter piece 3212 welded or otherwise affixed its interior, which secondary bars 3206 and 3204 abut.

In various embodiments link securing mechanisms can attach to female (or male) pieces. Female (or male) pieces can be installed in various locations on (or in) a variety of vehicles including and not limited to boats, all-terrain vehicles (ATVs), motorcycles, cars, planes, bicycles, tricycles, trains, and numerous others.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A unified, adjustable carrier cargo rack system for storage and secure transportation of cargo by a vehicle comprising:
   a modular carrier rack, comprising:
      a transitional carrier bar having distal and proximal ends, wherein the proximal end is operable to engage a rack receiving unit and provide immobilization for cargo and the distal end is operable to engage a secondary bar or a cargo carrier bar, wherein a distal end of the secondary bar engages the cargo carrier bar at a height sufficient to provide clearance from the ground for cargo;
      a cargo carrier bar operable to engage the secondary bar or the transitional carrier bar, wherein the cargo carrier bar is further operable to engage and immobilize cargo; and
      a mount receiver unit, comprising:
         an opening; and
         a channel having a trapezoidal cross-section that is operable to receive and secure a complementary sized and shaped trapezoidal mount that is coupled to a piece of cargo when the mount is inserted into the opening,
      wherein the mount receiver unit is operable to be removably coupled to the cargo carrier bar, and
      wherein the carrier rack is lightweight and compactable such that the transitional carrier bar, secondary bar, and cargo carrier bar can be folded into a secure, telescopic arrangement.

2. The unified, adjustable cargo carrier rack and storage system of claim 1, wherein a portion of the modular carrier rack is operable to be inserted into the rack receiving unit, which is supported by a support structure within the rear of the vehicle, such that the support structure provides support for both the rack receiving unit and the modular carrier rack.

3. The unified, adjustable cargo carrier rack and storage system of claim 1, further comprising:
   a remote operated lock and key system operable to secure the rack receiving unit to the transitional carrier bar when engaged.

4. The unified, adjustable cargo carrier rack and storage system of claim 1, wherein cargo further comprises:
   a storage pod for storing items, the storage pod operable to keep the items together after transportation using the cargo carrier bar; and
   a trapezoidal mount coupled to the storage pod and operable to be received by the mount receiver unit.

5. A unified cargo carrier rack and storage device for a vehicle comprising:
   a modular carrier rack, comprising:
      a transitional carrier bar, having distal and proximal ends, wherein the proximal end is operable to engage a rack receiver unit installed in the rear of a vehicle and provide immobilization for cargo and the distal end is operable to engage a secondary bar or a cargo carrier bar, wherein a distal end of the secondary bar engages the cargo carrier bar and at a height sufficient to provide clearance from the ground for cargo;
      a carrier bar operable to engage the secondary bar or the transitional carrier bar; and
      a mount receiver unit, comprising:
         an opening; and
         a channel having a trapezoidal cross-section that is operable to receive and secure a complementary sized and shaped trapezoidal mount that is coupled to a piece of cargo when the mount is inserted into the opening and slid into the channel,
      wherein the mount receiver unit is operable to be removably coupled to the carrier bar, and
      wherein the carrier rack is lightweight and compactable such that the transitional carrier bar, secondary bar, and cargo carrier bar can be folded into a secure, telescopic arrangement.

6. The unified cargo carrier rack and storage device of claim 5, further comprising:
   a remote operated lock and key device operable to secure the rack receiver unit to the transitional carrier bar when engaged.

7. The unified cargo carrier rack and storage device of claim 5, further comprising:
- a storage pod for storing items, the storage pod operable to keep the items together after transportation using the cargo carrier bar; and
- a trapezoidal mount coupled to the storage pod and operable to be received by the mount receiver unit.

8. The unified cargo carrier rack and storage device of claim 5, further comprising:
- a wired or wireless brake-light.

9. A unified cargo carrier rack and storage device for a vehicle comprising:
- a modular carrier rack, comprising:
    - a cargo carrier bar, having distal and proximal ends; and
    - a mount receiver unit comprising:
        - a primary coupling mechanism operable to secure cargo by removably coupling with a secondary cargo coupling mechanism of a cargo item that is complementary and has a trapezoidal shaped cross-section.

10. The unified cargo carrier rack and storage device of claim 9, wherein the proximal end of the cargo carrier bar is operable to engage a rack receiver unit installed in the rear of a vehicle and provide immobilization for cargo by securing it at a height sufficient to provide clearance from the ground for cargo.

11. The unified cargo carrier rack and storage device of claim 9, further comprising:
- a secondary bar, having distal and proximal ends,
- wherein the proximal end of the secondary bar is operable to engage with a rack receiver unit installed in the rear of a vehicle, and wherein the proximal end of the cargo carrier bar is operable to engage with the secondary bar to provide immobilization for cargo by securing it at a height sufficient to provide clearance from the ground for cargo.

12. The unified cargo carrier rack and storage device of claim 9, further comprising:
- a secondary bar, having distal and proximal ends; and
- a transitional carrier bar having distal and proximal ends,
- wherein the proximal end of the transitional carrier bar is operable to engage with a rack receiver unit installed in the rear of a vehicle,
- wherein the secondary bar is coupled to the transitional carrier bar and the cargo carrier bar, and
- wherein the proximal end of the cargo carrier bar is operable to engage with the secondary bar to provide immobilization for cargo by securing it at a height sufficient to provide clearance from the ground for cargo.

13. The unified cargo carrier rack and storage device of claim 9, wherein the primary coupling mechanism further comprises: a mount, and
- wherein the secondary coupling mechanism further comprises:
    - a channel; and
    - an opening.

14. The unified cargo carrier rack and storage device of claim 9, wherein the primary coupling mechanism further comprises:
- an opening; and
- a channel,
- wherein the secondary coupling mechanism further comprises a mount.

* * * * *